United States Patent
Fanous et al.

(10) Patent No.: US 10,177,381 B2
(45) Date of Patent: Jan. 8, 2019

(54) CATHODE MATERIAL FOR A LITHIUM/SULFUR CELL

(71) Applicant: Robert Bosch GmbH, Stuttgart (DE)

(72) Inventors: Jean Fanous, Pfullingen (DE); Joerg Thielen, Stuttgart (DE); Bernd Schumann, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 252 days.

(21) Appl. No.: 15/168,788

(22) Filed: May 31, 2016

(65) Prior Publication Data

US 2017/0117547 A1  Apr. 27, 2017

(30) Foreign Application Priority Data

Jun. 5, 2015 (DE) .................. 10 2015 210 402

(51) Int. Cl.
| | |
|---|---|
| H01M 4/36 | (2006.01) |
| H01M 4/58 | (2010.01) |
| H01M 4/60 | (2006.01) |
| H01M 4/136 | (2010.01) |
| H01M 4/38 | (2006.01) |
| H01M 4/62 | (2006.01) |
| H01M 10/0562 | (2010.01) |
| H01M 10/0525 | (2010.01) |
| H01M 10/0565 | (2010.01) |
| H01M 10/052 | (2010.01) |

(52) U.S. Cl.
CPC .......... *H01M 4/602* (2013.01); *H01M 4/136* (2013.01); *H01M 4/364* (2013.01); *H01M 4/38* (2013.01); *H01M 4/58* (2013.01); *H01M 4/5815* (2013.01); *H01M 4/622* (2013.01); *H01M 4/624* (2013.01); *H01M 10/0525* (2013.01); *H01M 10/0562* (2013.01); *H01M 10/0565* (2013.01); *H01M 10/052* (2013.01); *H01M 2300/0068* (2013.01)

(58) Field of Classification Search
CPC .. H01M 4/602; H01M 4/364; H01M 10/0565; H01M 10/0525; H01M 4/58
See application file for complete search history.

(56) References Cited

U.S. PATENT DOCUMENTS

2002/0055040 A1* 5/2002 Mukherjee ............... H01B 1/12
429/218.1

OTHER PUBLICATIONS

Deiseroth, H.J., et al., Li6PS5X: A Class of Crystalline Li-rich Solids with an Unusually High Li+ Mobility, Angewandte Chemie International, 2008, 755-758, 47-4.
Kong, S.T., et al., Li6PO5Br and Li6PO5Cl: The first Lithium-Oxide-Argyrodites, Zeitschrift fur anorganische und allgemeine Chemie, 2010, 1920-1924, 636-11.

(Continued)

*Primary Examiner* — Stewart A Fraser
(74) *Attorney, Agent, or Firm* — Norton Rose Fulbright US LLP; Gerard Messina

(57) ABSTRACT

A cathode material for an alkali metal/sulfur cell, which encompasses at least one sulfur-containing cathode active material and at least one transition metal sulfide and/or at least one metal sulfide of at least one metal of the third, fourth, and/or fifth main group. Also described is a cell and a battery equipped therewith.

22 Claims, 1 Drawing Sheet

(56) References Cited

OTHER PUBLICATIONS

Kong, S.T., et al., Lithium Argyrodites with Phosphorus and Arsenic: Order and Disorder of Lithium Atoms, Crystal Chemistry, and Phase Transitions, Chemistry—A European Journal, 2010, 2198-2206, 16-7.
Kong, S.T., et al., Structural Characterisation of the Li Argyrodites Li7PS6 and Li7PSe6 and their Solid Solutions: Quantification of Site Preferences by MAS-NMR Spectroscopy, 2010, 5138-5147, 16-17.
Pecher, O., et al., Atomistic Characterisation of Li+ Mobility and Conductivity in Li7-xPS6-xIx Argyrodites from Molecular Dynamics Simulations, Solid-State NMR, and Impedance Spectroscopy, Chemistry—A European Journal, 2010, 8347-8354, 16-28.
Boulineau, S., et al., Mechanochemical synthesis of Li-argyrodite Li6PS5X (X=Cl, Br, I) as sulfur-based solid electrolytes for all solid state batteries application, Solid State Ionics, 2012, 1-5, 221.
Deiseroth, H.J., et al., Li7PS6 and Li6PS5X (X: Cl, Br, I): Possible Three-dimensional Diffusion Pathways for Lithium Ions and Temperature Dependence of the Ionic Conductivity by Impedance Measurements, Zeitschrift fur anorganische und allgemeine Chemie, 2011, 1287-1294, 637-10.
Boulineau, S., et al., Electrochemical properties of all-solid-state lithium secondary batteries using Li-argyrodite Li6PS5Cl as solid electrolyte, Solid State Ionics, 2013, 45-48, 242.

\* cited by examiner

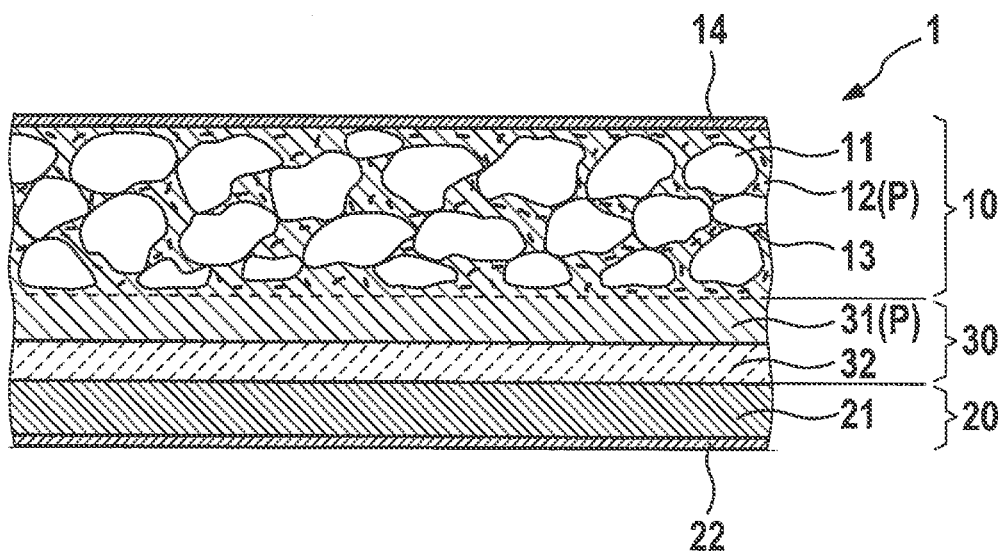

CATHODE MATERIAL FOR A LITHIUM/SULFUR CELL

FIELD OF THE INVENTION

The present invention relates to cathode materials for alkali metal/sulfur cells, in particular for lithium/sulfur cells, and to corresponding cells and batteries.

BACKGROUND INFORMATION

Lithium-ion batteries, also referred to as "rechargeable lithium-ion batteries," are used nowadays as energy reservoirs in a large number of products. Lithium/sulfur battery technology is being investigated so that batteries having a higher energy density can be manufactured.

Understood and/or available lithium/sulfur cells contain elemental sulfur, and in particular contain ether-based electrolyte solvents in order to ensure solubility of the sulfur.

SUMMARY OF THE INVENTION

The subject matter of the present invention is a cathode material for an electrochemical cell, for instance for an alkali metal cell, for example for a lithium cell and/or sodium cell, in particular for a lithium cell, for instance for an alkali metal/sulfur cell, for example for a lithium/sulfur cell and/or sodium/sulfur cell, in particular for a lithium/sulfur cell, which encompasses at least one, in particular sulfur-containing, cathode active material and at least one metal sulfide.

An "alkali metal cell" can be understood in particular as an electrochemical cell, for example a battery cell or rechargeable battery cell, in whose electrochemical reaction alkali ions, for example lithium ions, for example in the case of a lithium cell, or sodium ions, for example in the case of a sodium cell, participate. An alkali metal cell can be, for example, a lithium cell and/or a sodium cell.

An "alkali metal/sulfur cell" can be understood in particular as an electrochemical cell, for example a battery cell or rechargeable battery cell, in whose electrochemical reaction alkali ions, for instance lithium ions, for example in the case of a lithium cell, or sodium ions, for example in the case of a sodium cell, and sulfur participate. An alkali metal/sulfur cell can be, for example, a lithium/sulfur cell and/or a sodium/sulfur cell.

A "sulfide" can be understood, for example, as a chemical compound that encompasses negatively charged sulfur, in particular at least one sulfide anion ($S^{2-}$) and/or disulfide anion ($S_2^{2-}$) and/or polysulfide anion.

The at least one metal sulfide can encompass or be, for example, at least one transition metal sulfide and/or at least one metal sulfide of at least one metal of the third, fourth, and/or fifth main group, in particular of the periodic system. The at least one metal sulfide can in particular encompass or be at least one transition metal sulfide. The at least one metal sulfide can in particular be electrochemically active, in particular in the context of the electrochemical reaction of the cell for which the cathode material is configured. The at least one metal sulfide can in particular encompass at least one metal, for example at least one transition metal and/or at least one metal of the third, fourth, and/or fifth main group. The at least one metal sulfide can in particular have at least one metal (Mt), for example a transition metal and/or metal of the third, fourth, and/or fifth main group, which (Mt) has a standard electrode potential ($Mt^0/Mt^{x+}$) that is more positive or higher, for example ≥1 V more positive or higher, than the anode active material or alkali metal of the cell, for example lithium. For example, the at least one metal sulfide can have at least one metal (Mt), for example at least one transition metal and/or at least one metal of the third, fourth, and/or fifth main group, which (Mt) has a standard electrode potential ($Mt^0/Mt^{x+}$) of ≥−2 V, in particular with respect to a normal hydrogen electrode (NHE). For instance, niobium can have a standard electrode potential ($Nb^0/Nb^{3+}$) of −1.099 V and thus, compared with the standard electrode potential ($Li^0/Li^+$) of lithium of −3.0401 with respect to a normal hydrogen electrode (NHE), a potential that is 1.9411 V more positive or higher than a lithium anode. Molybdenum, for instance in the form of $MoS_3$ and/or $MoS_2$, can have, for instance, a potential up to 2.804 V more positive than a lithium anode.

The at least one metal sulfide can encompass, for example, at least one sulfide anion ($S^{2-}$) and/or at least one disulfide anion ($S_2^{2-}$) and/or at least one higher sulfide and/or at least one polysulfide anion and/or a hyperstoichiometric sulfur proportion, for example sulfur not directly bound to the metal and/or unbound sulfur and/or uncharged sulfur and/or sulfur having an oxidation number of zero, for example sulfur incorporated into its crystal structure.

The at least one metal sulfide can furthermore, for example, be a semiconductor, for example such as copper(II) sulfide (CuS).

Upon discharge of the cell, advantageously the at least one metal of the at least one metal sulfide can be reduced to the elemental or metallic form. In particular, the at least one cathode active material can, in the charged state, encompass the at least one metal sulfide. In the discharged state the at least one cathode active material can in particular encompass the at least one metal of the at least metal sulfide in metallic form. As a result of the reduction of the at least one metal sulfide to a subsulfide and/or to at least one metal upon discharge, advantageously on the one hand the at least one metal of the at least one metal sulfide can contribute to the capacity of the cathode material and thus to the performance of the cell. On the other hand the metal form, of the at least one metal of the at least one metal sulfide, which is constituted can contribute to improved electrical conductivity of the cathode material and thus to the performance of the cell. With the at least one metal of the at least one metal sulfide in the oxidized state, the at least one metal sulfide can, where applicable, enhance the electrical conductivity thanks to semiconducting properties.

Sulfur released from the at least one metal sulfide, in particular upon reduction of the at least one metal of the at least one metal sulfide, and where applicable sulfide anion(s) ($S^{2-}$) and/or polysulfides formed therefrom, can react and/or combine with anode material ions or alkali metal ions, for instance lithium ions and form, for example, lithium sulfide ($Li_2S$), lithium disulfide, and/or lithium polysulfide(s), so that only sulfides can be formed and secondary reactions can be avoided.

The at least one metal sulfide and/or the at least one metal of the at least one metal sulfide moreover can advantageously catalytically accelerate the electrochemical reaction, for example upon discharging and/or charging.

If the at least one metal sulfide encompasses electrochemically active sulfur, which in particular is electrochemically active in the context of the electrochemical reaction of the cell for which the cathode material is configured, for instance at least one disulfide anion ($S_2^{2-}$) and/or at least one polysulfide anion and/or a hyperstoichiometric sulfur proportion, for example sulfur not directly bound to metal and/or unbound sulfur and/or uncharged sulfur and/or sulfur having an oxidation number of zero, for example sulfur incorporated into its crystal structure, advantageously the electrochemically active sulfur of the at least one metal sulfide can also additionally contribute to the capacity of the cathode material or cell.

The at least one cathode active material can in particular be sulfur-containing. For instance, the at least one cathode active material can encompass, for example contain or be constituted from, a sulfur composite and/or elemental sulfur and/or a sulfur compound.

In the context of an embodiment, the at least one cathode active material encompasses or is a sulfur/carbon composite. A "sulfur/carbon composite" can be understood in particular as a composite that encompasses sulfur and carbon. In particular, in the sulfur/carbon composite sulfur can be, for example covalently and/or ionically, in particular covalently, bound to carbon and/or can be embedded therein. As a result of the respective attachment or embedding of the (as such neither ionically nor electrically conductive) sulfur to or into the carbon of the composite, improved electrical and/or ionic contacting of the sulfur, for example as compared with simple mixtures, can advantageously be achieved. In addition, (poly)sulfides $S_x^{2-}$ occurring upon discharge (reduction) of a cell can thus advantageously be better retained in the cathode, and sulfur utilization and cycle stability can thereby be improved. The at least one cathode active material can, for example, encompass a sulfur/carbon composite, for example in which sulfur is bound covalently in particular to carbon.

The at least one cathode active material can, for instance, [encompass] a sulfur/polymer composite and/or a sulfur/carbon allotrope composite. A "sulfur/polymer composite" can be understood in particular as a composite that encompasses or is constituted from sulfur and at least one polymer. A "sulfur/carbon allotrope composite" can be understood in particular as a composite that encompasses sulfur and a carbon allotrope, i.e. elemental carbon or carbon having an oxidation number of zero, for example carbon nanotubes and/or hollow carbon spheres and/or graphene and/or graphite and/or carbon black. Where applicable, the at least one cathode active material can be a sulfur/polymer composite and/or sulfur/carbon allotrope composite.

The at least one cathode active material can encompass, for example, a sulfur/polymer composite. The sulfur/polymer composite can encompass or be constituted from, for example, in particular besides sulfur, (at least) one, in particular electrically conductive, polymer, for example polyacrylonitrile, in particular cyclized polyacrylonitrile (cPAN), and/or polypyrrole and/or polythiophene and/or polyphenylene, for example, in particular cyclized, polyacrylonitrile and/or polyparaphenylene. In particular, sulfur can be bound, for example covalently and/or ionically, in particular covalently, to the, in particular electrically conductive, polymer and/or embedded into its matrix. Cyclized polyacrylonitrile (cPAN) can have in particular a structure made up of rings, in particular six-membered rings, connected, in particular fused, to one another, and/or a repeating unit that encompasses three carbon atoms and one nitrogen atom, adjacent rings having for example at least two shared carbon atoms. Advantageously, sulfur/polymer composites make it possible to achieve improved attachment and/or, in particular more finely distributed, embedding of the sulfur as well as improved mechanical properties, as compared with sulfur/carbon allotrope composites, with the result that electrical and/or ionic contacting, as well as sulfur utilization and thus energy density, can be improved.

For instance, the at least one cathode active material or the sulfur/polymer composite can encompass or be a polymer having sulfur that is, for instance, partly or completely, for example covalently and/or ionically, in particular covalently, bound.

In the context of a further embodiment the at least one cathode active material encompasses a polymer having, in particular covalently, bound sulfur. Thanks to the attachment of the (as such neither ionically nor electrically conductive) sulfur to the polymer of the composite, polysulfide formation can advantageously be suppressed and in particular improved electrical and/or ionic contacting of the sulfur, for example as compared with simple mixtures, can also be achieved, and sulfur can be even better retained in the cathode, and in this manner sulfur utilization, cycle stability, and energy density can be further improved. For instance, the polymer can be electrically conductive or conducting in this context. For example, the at least one cathode active material can encompass or be a polymer, for instance based on polyacrylonitrile (PAN), in particular cyclized polyacrylonitrile (cPAN), and/or polypyrrole and/or polythiophene and/or polyphenylene, in particular based on polyacrylonitrile (PAN) having, in particular covalently, bound sulfur, or a sulfur/polyacrylonitrile composite, in particular SPAN. In particular, the sulfur/polymer composite can be a sulfur/polyacrylonitrile composite, for example SPAN. In particular, the polymer can, with the cell in the charged state, encompass covalently bound sulfur. Alkali metal ions (Li$^+$), for example lithium ions and/or sodium ions, in particular lithium ions, can be bound, in particular ionically, to the sulfur by partial reduction of the sulfur bound, in particular covalently, to the polymer, and/or upon discharge. Upon discharge the covalent attachment of the sulfur to the polymer can be, in particular at least in part, released.

In the context of an embodiment the polymer having, in particular covalently, bound sulfur is manufactured by sulfidation of a polymer, for example of polyacrylonitrile and/or polypyrrole and/or polythiophene and/or polyphenylene, in particular of polyacrylonitrile. "Sulfidation" can be understood in particular as a chemical reaction of a sulfur/containing compound, for example elemental sulfur and/or a sulfur/containing compound, with an organic compound, for example a polymer. In particular, a covalent bond between sulfur and the organic compound, for example the polymer, can be formed by sulfidation. For instance, the polymer having, in particular covalently, bound sulfur can encompass sulfided, cyclized, and, for example, dehydrogenated polyacrylonitrile, for example SPAN. Sulfided, cyclized, and, for example, dehydrogenated polyacrylonitrile, for instance SPAN, can have in particular a structure made up of rings, in particular six-membered rings, connected, in particular fused, to one another, and/or a repeating unit that encompasses three carbon atoms and one nitrogen atom, adjacent rings for example having at least two shared carbon atoms.

In the context of a special embodiment the at least one cathode active material encompasses polyacrylonitrile having, for instance partly or completely, in particular completely, for example covalently and/or ionically, in particular covalently, bound sulfur, for example SPAN. The sulfur/polymer composite can in particular be a sulfur/polyacrylonitrile composite, for example SPAN. "SPAN" can be understood in particular as a composite or polymer based on polyacrylonitrile (PAN), in particular cyclized polyacrylonitrile (cPAN), having, in particular covalently, bound sulfur, which in particular is obtainable by thermal reaction and/or chemical reaction of polyacrylonitrile in the presence of sulfur. In particular, nitrile groups can react in this context to form a polymer, in particular having a conjugated π system, in which the nitrile groups are converted to mutually coupled nitrogen-containing rings, in particular six-membered rings, in particular having covalently bound sulfur. SPAN can be manufactured, for instance, by heating polyacrylonitrile (PAN) with an excess of elemental sulfur, in particular to a temperature ≥300° C., for example approximately ≥300° C. to ≤600° C. The sulfur can in particular on the one hand cyclize the polyacrylonitrile (PAN) with formation of hydrogen sulfide ($H_2S$), and on the other hand can be bound in finely divided fashion in the cyclized matrix, for example with formation of a covalent S—C bond, a cyclized polyacrylonitrile structure having covalent sulfur chains being, for example, formed. SPAN is described in Chem. Mater., 2011, 23, 5024 and J. Mater. Chem., 2012, 22, 23240, J. Electrochem. Soc., 2013, 160 (8) A1170, and in the document WO 2013/182360 A1.

Alternatively or in addition thereto, the at least one cathode active material can encompass a sulfur/carbon allotrope composite that encompasses or is constituted by, in particular besides sulfur, (at least) one carbon allotrope, for example carbon tubes, for instance carbon nanotubes, and/or hollow carbon spheres and/or graphene and/or graphite and/or carbon black, for instance in the form of carbon particles and/or carbon fibers. In particular, sulfur can be embedded into the matrix of the carbon allotrope, for example into the carbon tubes and/or hollow carbon spheres. Improved electrical and/or ionic contacting and sulfur utilization, for example as compared with simple mixtures, can thereby advantageously be achieved. Where applicable, the carbon allotrope can be surface-modified, in particular with a polysulfide-affine compound, for instance with titanium carbide and/or polyethylene glycol and/or polyethylene oxide and/or a polymer electrolyte explained later. Advantageously, outward diffusion of polysulfides can thereby also be counteracted, and polysulfides can be better retained in the cathode matrix.

Alternatively or in addition thereto, the at least one cathode active material can encompass a sulfur/metal compound composite that encompasses or is constituted from, in particular besides sulfur, at least one, in particular electrically conducting, metal compound, for example at least one, in particular electrically conducting, metal oxide, for instance an oxide of tin and/or indium and/or tantalum and/or niobium, for instance tin-doped indium oxide and/or tin oxide doped with tantalum, niobium, and/or with fluorine, and/or at least one, in particular electrically conductive, metal carbide, for instance titanium carbide, for instance in the form of wires and/or fibers and/or a network. Sulfur can in this context, for example, be embedded into the matrix of the metal compound, for example into and/or between fibers and/or wires and/or the network. Improved electrical and/or ionic contacting and sulfur utilization, for example as compared with simple mixtures, can thus likewise advantageously be achieved.

In the context of an embodiment the cathode material (furthermore) encompasses at least one, in particular lithium ion-conducting or lithium ion-conductive, polymer electrolyte and/or at least one inorganic ion conductor, in particular lithium ion conductor.

The ion conductivity and ionic attachment and thus ionic contacting of the cathode active material can advantageously be improved by way of the at least one polymer electrolyte and/or at least one inorganic ion conductor. As a result, elevated ion conduction for the ion of the alkali metal, in particular elevated lithium ion conduction, in the cathode, i.e. the positive electrode of the cell, can in turn advantageously be achieved, which allows the cathode material to be used advantageously in a high-current cell or a high-current battery. With such a cell or battery it is furthermore possible to dispense with the introduction of liquid electrolytes into the cathode and in particular to furnish the cell as a solid state cell. In addition to an improvement in ion conductivity and thus in ionic contacting, the at least one polymer electrolyte can advantageously serve as a binder.

A "polymer electrolyte" can be understood in particular as an ion-conductive or ion-conducting, for example lithium ion-conductive or lithium ion-conducting, polymer. An ion-conductive or ion-conducting, for example lithium ion-conductive or lithium ion-conducting, polymer can therefore also, for example, be referred to as a "polymer electrolyte." In the context of use in a cathode material, a polymer electrolyte can in particular also be referred to as a "cathode electrolyte" or "catholyte." For example, the polymer electrolyte can be lithium ion-conductive or lithium ion-conducting and/or sodium-ion-conductive or sodium-ion-conducting, in particular lithium ion-conductive or lithium ion-conducting. An "ion-conducting, for example lithium ion-conducting, electrolyte or polymer" can be understood in particular as an electrolyte or polymer that is intrinsically ion-conducting, for example lithium ion-conducting, and/or has lithium ions. An "ion-conductive, for example lithium ion-conductive, electrolyte or polymer" can be understood in particular as an electrolyte or polymer that is itself free of the ions to be conducted, for example lithium ions, but is configured to coordinate and/or solvate the ions to be conducted, for example lithium ions, or to coordinate counter-ions of the ions to be conducted, for example lithium conducting salt anions, and becomes ion-conducting, for example lithium ion-conducting, for example with addition of the ions to be conducted, for example lithium ions.

For example, the at least one metal sulfide, for example the at least one transition metal sulfide and/or the at least one metal sulfide of at least one metal of the third, fourth, and/or fifth main group, can be contained, for instance incorporated and/or embedded, in the at least one cathode active material and/or in an, in particular ionically and/or electrically conductive or conducting, polymer, for example in the at least one polymer electrolyte, and/or in another ion conductor, for example in the at least one inorganic ion conductor. In particular, the at least one metal sulfide, for example the at least one transition metal sulfide and/or the at least one metal sulfide of at least one metal of the third, fourth, and/or fifth main group, can be used in combination with a cathode active material.

In the context of a further embodiment the at least one metal sulfide, in particular the at least one transition metal sulfide and/or the at least one metal sulfide of at least one metal of the third, fourth, and/or fifth main group, is therefore contained, for instance incorporated and/or embedded, in the at least one cathode active material, in particular in the sulfur/carbon composite, for example in the sulfur/polymer composite, for instance in the polymer having, in particular covalently, bound sulfur, for instance SPAN. An, in particular shared, electrochemically active phase having improved electrical conductivity and/or a catalytically accelerated electrochemical reaction, for example upon charging and/or discharging, can thus advantageously be obtained.

For instance, the at least one cathode active material can therefore encompass a sulfur/carbon composite, for example a sulfur/polymer composite, for instance a polymer having, in particular covalently, bound sulfur, and at least one metal sulfide, for example in particular the at least one transition metal sulfide and/or the at least one metal sulfide of at least one metal of the third, fourth, and/or fifth main group. It is thereby advantageously possible to furnish a cathode material in which one portion of the sulfur is bound in and/or on the sulfur/carbon composite, for example the sulfur/polymer composite, for instance the polymer having, in particular covalently, bound sulfur, for instance SPAN, and another portion of the sulfur is bound in and/or on the metal sulfide.

In particular, the at least one cathode active material, in particular the sulfur/carbon composite, for example the sulfur/polymer composite, in particular the polymer having, in particular covalently, bound sulfur, for instance SPAN, and the at least one metal sulfide, for example the at least one transition metal sulfide and/or the at least one metal sulfide of at least one metal of the third, fourth, and/or fifth main group, in particular the at least one transition metal sulfide, can form a (shared) electrochemically active phase. The at least one polymer electrolyte and/or the at least one inorganic ionic conductor can form in this context an ion-conducting phase, for example which can be present alongside the electrochemically active phase.

In the context of an embodiment the at least one cathode active material, in particular the sulfur/carbon composite, for instance the sulfur/polymer composite, for example the polymer having, in particular, covalently bound sulfur, for instance SPAN, is interwoven and/or mixed with the at least one metal sulfide, in particular the at least one transition metal sulfide and/or the at least one metal sulfide of at least one metal of the third, fourth, and/or fifth main group. For example, the at least one metal sulfide, in particular the at least one transition metal sulfide and/or the at least one metal sulfide of at least one metal of the third, fourth, and/or fifth main group, can be mixed, for example in the form of an, in particular finely milled, powder, into a polymer precursor and/or polymer, for example polyacrylonitrile, from which the sulfur/carbon composite, for instance SPAN, is constituted, for example by sulfidation. For instance, the at least one cathode active material, in particular the sulfur/carbon composite, for example the sulfur/polymer composite, for example the polymer having, in particular covalently, bound sulfur, and the at least one metal sulfide, for example the at least one transition metal sulfide and/or the at least one metal sulfide of at least one metal of the third, fourth, and/or fifth main group, can be present in uniformly distributed fashion. Advantageously, both the sulfur/carbon composite, for example the sulfur/polymer composite, in particular the polymer having, in particular covalently, bound sulfur, for instance SPAN, and the at least one metal sulfide, in particular transition metal sulfide, contained therein, can uniformly contact the at least one polymer electrolyte and/or the at least one inorganic ion conductor at its interface.

In the context of another alternative or additional embodiment the at least one cathode active material, in particular the sulfur/carbon composite, for example the sulfur/polymer composite, for instance the polymer having, in particular covalently, bound sulfur, for example SPAN, can be surrounded by the at least one metal sulfide, for example the at least one transition metal sulfide and/or the at least one metal sulfide of at least one metal of the third, fourth, and/or fifth main group. For example, the at least one cathode active material, in particular the sulfur/carbon composite, for example the sulfur/polymer composite, for instance the polymer having, in particular covalently, bound sulfur, for example SPAN, can be coated with the at least one metal sulfide, for example the at least one transition metal sulfide and/or the at least one metal sulfide of at least one metal of the third, fourth, and/or fifth main group. Advantageously, surface conductivity can thereby be improved and, where applicable, outward diffusion of polysulfides can be counteracted.

In the context of a further embodiment the at least one metal sulfide, for example the at least one transition metal sulfide and/or the at least one metal sulfide of at least one metal of the third, fourth, and/or fifth main group accounts in total (in total) for ≥5 wt % to ≤90 wt %, for instance ≥25 wt % to ≤50 wt %, with reference to the weight of the at least one cathode active material, in particular sulfur/carbon composite, for example sulfur/polymer composite, for instance the polymer having, in particular covalently, bound sulfur, and of the at least one metal sulfide, for example the at least one transition metal sulfide and/or the at least one metal sulfide of at least one metal of the third, fourth, and/or fifth main group.

For instance, the at least one metal sulfide, for example the at least one transition metal sulfide and/or the at least one metal sulfide of at least one metal of the third, fourth, and/or fifth main group, in particular the at least one transition metal sulfide, can encompass or be a simple metal sulfide such as iron(II) sulfide (FeS) and/or copper(II) sulfide (CuS), for example having one sulfur atom per metal atom, for instance in which all bonds of the sulfur go to the metal atom, and/or a metal sulfide having a more complex structure, for example in which more than one sulfur atom per metal atom is bound, for instance copper disulfide ($CuS_2$) and/or patronite ($VS_4$, $V^{4+}(S_2^{2-})_2$), and in which where applicable the sulfur can be in part not directly bound to the metal but instead, for example, incorporated into the crystal structure, for instance a metal sulfide having a hyperstoichiometric sulfur proportion, and/or in which more metal atoms than sulfur atoms are contained, for instance copper(I) disulfide ($Cu_2S$) and/or a metal sulfide having a hyperstoichiometric metal proportion, such as $Ni_9S_8$ and/or $Ni_3S_2$.

In the context of an embodiment the at least one metal sulfide, for example the at least one transition metal sulfide and/or the at least one metal sulfide of at least one metal of the third, fourth, and/or fifth main group, in particular the at least one transition metal sulfide, encompasses electrochemically active sulfur, which in particular is electrochemically active in the context of the electrochemical reaction of the cell for which the cathode material is configured. For example, the at least one metal sulfide, for example the at least one transition metal sulfide and/or the at least one metal sulfide of at least one metal of the third, fourth, and/or fifth main group, in particular the at least one transition metal sulfide, can have at least one disulfide anion ($S_2^{2-}$) and/or at least one polysulfide anion and/or a hyperstoichiometric sulfur proportion, for instance having sulfur not bound directly to metal and/or unbound sulfur and/or uncharged sulfur and/or sulfur having an oxidation number of zero, for example having sulfur incorporated into its crystal structure. Advantageously, the electrochemically active sulfur of the at least one metal sulfide can thus also additionally contribute to the capacity of the cathode material or cell.

In the context of an alternative or additional embodiment the at least one metal sulfide, for example the at least one transition metal sulfide and/or the at least one metal sulfide of at least one metal of the third, fourth, and/or fifth main group, in particular the at least one transition metal sulfide, has more than one sulfur atom per metal atom. For instance, the at least one metal sulfide, for example the at least one transition metal sulfide and/or the at least one metal sulfide of at least one metal of the third, fourth, and/or fifth main group, in particular the at least one transition metal sulfide, can encompass or be a metal disulfide and/or a higher metal sulfide, for example a metal trisulfide and/or a metal tetrasulfide and/or a metal pentasulfide, and/or a metal sulfide having a hyperstoichiometric sulfur proportion, for example having sulfur incorporated into its crystal structure. Additional sulfur can thereby advantageously be made available for the electrochemical reaction and/or for catalysis by way of the at least one metal sulfide.

In the context of a further embodiment the at least one metal sulfide, for example the at least one transition metal sulfide and/or the at least one metal sulfide of at least one metal of the third, fourth, and/or fifth main group, has more than one metal atom per sulfur atom and/or a hyperstoichiometric metal proportion. Higher electrical conductivity and/or catalytic acceleration can thereby advantageously be achieved.

In the context of an embodiment the at least one metal sulfide encompasses or is at least one transition metal sulfide. In particular, the at least one transition metal sulfide can encompass or be a transition metal sulfide having electrochemically active sulfur and/or a transition metal sulfide having more than one sulfur atom per metal atom and/or a transition metal sulfide having more than one metal atom per sulfur atom and/or a transition metal sulfide having a hyperstoichiometric metal proportion. It is therefore advantageously possible, by way of transition metal sulfides, in particular to increase the capacity of the cathode material or of the cell by way of electrochemically active sulfur, and/or to furnish additional sulfur for the electrochemical reaction and/or for catalysis and/or to increase the electrical conductivity.

In the context of another embodiment the at least one metal sulfide encompasses or is at least one metal sulfide of at least one metal of the third, fourth, and/or fifth main group. The at least one metal sulfide of at least one metal of the third, fourth, and/or fifth main group can encompass or be in particular a metal sulfide of at least one metal of the third, fourth, and/or fifth main group having more than one sulfur atom per metal atom and/or a metal sulfide of at least one metal of the third, fourth, and/or fifth main group having more than one metal atom per sulfur atom and/or a metal sulfide of at least one metal of the third, fourth, and/or fifth main group having a hyperstoichiometric metal proportion. In particular, by way of metal sulfides of the third, fourth, and/or fifth main group it is therefore advantageously possible in particular to enhance electrical conductivity and/or achieve catalytic acceleration.

In the context of a further embodiment the at least one metal sulfide encompasses or is at least one transition metal sulfide and at least one metal sulfide of at least one metal of the third, fourth, and/or fifth main group.

In the context of a further embodiment the at least one metal sulfide or transition metal sulfide encompasses or is a sulfide of iron, copper, cobalt, nickel, vanadium, niobium, tantalum, chromium, molybdenum, tungsten, zinc, manganese, and/or titanium.

In the context of an embodiment the at least one metal sulfide, for example transition metal sulfide, encompasses or is (at least) one iron sulfide. For example, the at least one metal sulfide can encompass or be iron disulfide or, for example the mineral, pyrite and/or marcasite ($FeS_2$), in particular having the valence formula: $Fe^{2+}S_2^{2-}$, and/or iron(II) sulfide (FeS).

In the context of an alternative or additional embodiment the at least one metal sulfide, for example transition metal sulfide, encompasses or is (at least) one copper sulfide. For example, the at least one metal sulfide can encompass or be copper disulfide ($CuS_2$) and/or an, in particular nonstoichiometric, copper sulfide, in particular having a hyperstoichiometric metal proportion, for example $Cu_9S_8$ and/or $Cu_7S_4$, and/or copper(II) sulfide (CuS) and/or copper(I) sulfide ($Cu_2S$).

In the context of an alternative or additional embodiment the at least one metal sulfide, for example transition metal sulfide, encompasses or is (at least) one cobalt sulfide. For example, the at least one metal sulfide can encompass or be cobalt disulfide or, for example the mineral, cattierite ($CoS_2$), in particular having the valence formula: $Co^{2+}S_2^{2-}$, and/or an, in particular nonstoichometric, cobalt sulfide, in particular having a hyperstoichiometric sulfur proportion, for example $Co_3S_4$, and/or having a hyperstoichiometric metal proportion, for example $Co_9S_8$, and/or cobalt monosulfide (CoS).

In the context of an alternative or additional embodiment the at least one metal sulfide, for example transition metal sulfide, encompasses or is (at least) one nickel sulfide. For example, the at least one metal sulfide can encompass or be nickel disulfide or, for example the mineral, vesite ($NiS_2$) and/or an, in particular nonstoichiometric, nickel sulfide, in particular having a hyperstoichiometric metal proportion, for example $Ni_9S_8$ and/or $Ni_3S_2$ and/or nickel(I) sulfide (NiS).

In the context of an alternative or additional embodiment the at least one metal sulfide, for example transition metal sulfide, encompasses or is (at least) one vanadium sulfide. For example, the at least one metal sulfide can encompass or be vanadium disulfide ($VS_2$) and/or a higher vanadium sulfide, for example vanadium trisulfide ($VS_3$) and/or vanadium tetrasulfide or, for example the mineral, patronite ($VS_4$), for instance having the valence formula $V^{4+}(S_2^{2-})_2$, for example having one tetravalently positive vanadium and two doubly negatively charged $S_2^{2-}$ ions, and/or vanadium monosulfide (VS) and/or vanadium(III) sulfide ($V_2S_3$) and/or vanadium(IV) sulfide ($VS_2$) and/or vanadium(V) sulfide ($V_2S_5$).

In the context of an alternative or additional embodiment the at least one metal sulfide, for example transition metal sulfide, encompasses or is (at least) one niobium sulfide. For example, the at least one metal sulfide can encompass or be niobium disulfide ($NbS_2$) and/or a higher niobium sulfide, for example niobium trisulfide ($NbS_3$) and/or niobium tetrasulfide ($NbS_4$) and/or niobium pentasulfide ($NbS_5$) and/or niobium(III) sulfide ($Nb_2S_3$) and/or niobium(V) sulfide ($Nb_2S_5$).

In the context of an alternative or additional embodiment the at least one metal sulfide, for example transition metal sulfide, encompasses or is (at least) one tantalum sulfide. For example, the at least one metal sulfide can encompass or be tantalum disulfide ($TaS_2$) and/or a higher tantalum sulfide, for example tantalum trisulfide ($TaS_3$) and/or tantalum tetrasulfide ($TaS_4$) and/or tantalum pentasulfide ($TaS_5$) and/or tantalum(III) sulfide ($Ta_2S_3$) and/or tantalum(V) sulfide ($Ta_2S_5$).

In the context of an alternative or additional embodiment the at least one metal sulfide, for example transition metal sulfide, encompasses or is (at least) one chromium sulfide. For example, the at least one metal sulfide can encompass or be chromium trisulfide ($CrS_3$) and/or chromium(III) sulfide ($Cr_2S_3$).

In the context of an alternative or additional embodiment the at least one metal sulfide, for example transition metal sulfide, encompasses or is (at least) one molybdenum sulfide. For example, the at least one metal sulfide can encompass or be molybdenum disulfide ($MoS_2$) and/or a higher molybdenum sulfide, for example molybdenum trisulfide ($MoS_3$) and/or molybdenum tetrasulfide ($MoS_4$).

In the context of an alternative or additional embodiment the at least one metal sulfide, for example transition metal sulfide, encompasses or is (at least) one tungsten sulfide. For example, the at least one metal sulfide can encompass or be tungsten disulfide ($WS_2$) and/or a higher tungsten sulfide, for example tungsten pentasulfide ($WS_5$) and/or tungsten tetrasulfide ($WS_4$) and/or tungsten trisulfide ($WS_3$).

In the context of an alternative or additional embodiment the at least one metal sulfide, for example transition metal sulfide, encompasses or is (at least) one zinc sulfide. For example, the at least one metal sulfide can encompass or be zinc(II) sulfide (ZnS).

In the context of an alternative or additional embodiment the at least one metal sulfide, for example transition metal sulfide, encompasses or is (at least) one manganese sulfide. For example, the at least one metal sulfide can encompass or be manganese(II) sulfide (MnS) and/or manganese(III) sulfide ($Mn_2S_3$).

In the context of an alternative or additional embodiment the at least one metal sulfide, for example transition metal sulfide, encompasses or is (at least) one titanium sulfide. For example, the at least one metal sulfide can encompass or be titanium(IV) sulfide ($TiS_2$).

In the context of a further embodiment the at least one metal sulfide, for example transition metal sulfide, encompasses or is a mixed-metal sulfide. For example, the mixed-metal sulfide can encompass at least two metals selected from the group consisting of titanium, vanadium, chromium, manganese, iron, cobalt, nickel, copper, zinc, niobium, tantalum, molybdenum, and tungsten.

For example, the mixed-metal sulfide can [be] a mixed-metal sulfide of the general chemical formula: $AB_3S_6$ and/or $A_2BS_4$ and/or $A_4B_6S_8$, where A denotes nickel (Ni) and/or copper (Cu) and/or iron (Fe) and/or manganese (Mn) and/or cobalt (Co) and B denotes vanadium (V) and/or niobium (Nb) and/or tantalum (Ta) and/or molybdenum (Mo) and/or tungsten (W). For example, the at least one metal sulfide can encompass or be a mixed-metal sulfide of the general chemical formula: $AB_3S_6$, where A denotes nickel (Ni) and/or copper (Cu) and/or iron (Fe) and/or manganese (Mn) and/or cobalt (Co) and B denotes vanadium (V) and/or niobium (Nb) and/or tantalum (Ta), for instance $NiNb_3S_6$, and/or a mixed-metal sulfide of the general chemical formula: $A_2BS_4$ and/or $A_4B_6S_8$, where A denotes copper (Cu) and/or nickel (Ni) and/or iron (Fe) and B denotes molybdenum (Mo) and/or tungsten (W), for instance $Cu_2MoS_4$ and/or $Cu_4Mo_6S_8$.

For instance, the at least one metal sulfide, for example transition metal sulfide, can be selected from the group consisting of FeS, $FeS_2$, CuS, $Cu_2S$, $CuS_2$, $Cu_9S_8$, $Cu_7S_4$, CoS, $CoS_2$, $Co_3S_4$, $Co_9S_8$, NiS, $NiS_2$, $Ni_9S_8$, $Ni_3S_2$, VS, $VS_2$, $V_2S_3$, $V_2S_5$, $VS_4$, $NbS_2$, $NbS_3$, $NbS_4$, $NbS_5$, $Nb_2S_3$, $Nb_2S_5$, $TaS_2$, $TaS_3$, $TaS_4$, $TaS_5$, $Ta_2S_3$, $Ta_2S_5$, $Cr_2S_3$, $CrS_3$, $MoS_2$, $MoS_3$, $MoS_4$, $WS_2$, $WS_3$, $WS_4$, $WS_5$, MnS, $Mn_2S_3$, $TiS_2$, $NiNb_3S_6$, $Cu_2MoS_4$, and/or $Cu_4Mo_6S_8$. The at least one metal sulfide can be selected in particular from the group consisting of $FeS_2$, $Cu_2S$, $CoS_2$, $Co_3S_4$, $NiS_2$, $VS_2$, $VS_4$, $NbS_2$, $NbS_3$, $NbS_4$, $NbS_5$, $TaS_2$, $TaS_3$, $TaS_4$, $TaS_5$, $CrS_3$, $MoS_2$, $MoS_3$, $MoS_4$, $WS_2$, $WS_3$, $WS_4$, $WS_5$.

For instance, the at least one metal sulfide, in particular transition metal sulfide, can encompass or be a sulfide of iron, for example iron(II) sulfide (FeS) and/or iron disulfide ($FeS_2$) and/or copper, for example copper(II) sulfide (CuS) and/or copper disulfide ($CuS_2$), and/or chromium, for example chromium(III) sulfide ($Cr_2S_3$), and/or vanadium, for example vanadium(III) sulfide ($V_2S_3$) and/or vanadium (V) sulfide ($V_2S_5$) and/or patronite ($VS_4$), and/or molybdenum, for example molybdenum disulfide ($MoS_2$) and/or molybdenum(VI) sulfide ($MoS_3$).

In the context of a further embodiment the at least one metal sulfide or metal sulfide of the third, fourth, and/or fifth group respectively encompasses or is a sulfide of indium, gallium, aluminum, tin, germanium, antimony, and/or bismuth. In particular, the at least one metal sulfide or metal sulfide of the third, fourth, and/or fifth main group can encompass or be a sulfide of indium and/or tin and/or antimony.

In the context of a further embodiment the cathode material encompasses particles that encompass, in particular contain or where applicable are constituted from, the at least one cathode active material, for example the sulfur/carbon composite, for instance the sulfur/polymer composite, and the at least one metal sulfide, for example the at least one transition metal and/or the at least one metal of the third, fourth, and/or fifth main group. In particular, the cathode material can encompass particles that encompass, in particular contain or where applicable are constituted from, the polymer having, in particular covalently, bound sulfur, for instance SPAN, and the at least one metal sulfide, for example the at least one transition metal and/or the at least one metal of the third, fourth, and/or fifth main group. For instance, the at least one transition metal and/or the at least one metal of the third, fourth, and/or fifth main group can be embedded and/or incorporated in the interior of the particles.

In the context of a further embodiment the cathode material furthermore encompasses at least one electrically conducting metal compound. The at least one electrically conducting metal compound can encompass or be, for example, at least one electrically conducting metal oxide and/or at least one electrically conducting metal carbide. For instance, the at least one electrically conducting metal oxide can encompass or be an, in particular doped, oxide of tin and/or indium and/or tantalum and/or niobium, for example tin-doped indium oxide, and/or tin oxide doped with tantalum, niobium, and/or with fluorine. The at least one electrically conducting metal carbide can encompass or be, for example, a carbide of titanium, for example titanium carbide (TiC). The electrical conductivity can thereby advantageously be increased.

In the context of a further, alternative or additional embodiment the cathode material furthermore encompasses elemental sulfur. The capacity can thereby optionally be increased.

In the context of a further, alternative or additional embodiment the cathode material furthermore encompasses elemental carbon, for example carbon nanoparticles and/or carbon nanofibers and/or carbon nanotubes. The electrical conductivity can thereby advantageously be increased.

In the context of a further embodiment the at least one electrically conducting metal compound, for example the at least one electrically conducting metal oxide and/or the at least one electrically conducting metal carbide, and/or the elemental sulfur and/or the elemental carbon, is contained, for example incorporated and/or embedded, in the at least one cathode active material, in particular in the sulfur/carbon composite, for example in the sulfur/polymer composite, for instance in the polymer having, in particular covalently, bound sulfur, for instance SPAN, and/or in the particles.

Alternatively or in addition thereto, the at least one cathode active material, in particular in the sulfur/carbon composite, for example in the sulfur/polymer composite, for instance in the polymer having, in particular covalently, bound sulfur, for instance SPAN, can surround the particles of the at least one electrically conducting metal compound, for example of the at least one electrically conducting metal oxide and/or of the at least one electrically conducting metal carbide and/or of the elemental carbon, and/or for example they can be coated therewith.

The cathode material, in particular the at least one cathode active material, for example the sulfur/carbon composite, in particular the sulfur/polymer composite, and/or the particles can in particular be manufactured by way of a method in which the at least one metal sulfide, in particular the at least one transition metal sulfide and/or the at least one metal sulfide of at least one metal of the third, fourth, and/or fifth main group, and/or at least one electrically conducting metal compound, for example at least one electrically conducting metal oxide and/or at least one electrically conducting metal carbide, is mixed, for instance in the form of an, in particular finely milled, powder, into a polymer and/or into a polymer precursor, for example polyacrylonitrile, and the polymer is sulfided.

A further subject is therefore a method for manufacturing a cathode material, in particular a cathode active material, in particular a cathode material or cathode active material according to the present invention, for an electrochemical cell, for instance for an alkali metal cell, for example for a lithium cell and/or sodium cell, in particular for a lithium cell, for instance for an alkali metal/sulfur cell, for example for a lithium/sulfur cells and/or sodium/sulfur cells, in particular for a lithium/sulfur cell, in which at least one metal sulfide, in particular at least one transition metal sulfide and/or at least one metal sulfide of at least one metal of the third, fourth, and/or fifth main group, and/or at least one electrically conducting metal compound, for example at least one electrically conducting metal oxide and/or at least electrically conducting metal carbide, and/or elemental carbon and/or elemental sulfur, in particular at least one metal sulfide, for example at least one transition metal sulfide and/or at least one metal sulfide of at least one metal of the third, fourth, and/or fifth main group, and/or at least one electrically conducting metal compound, for example at least one electrically conducting metal oxide and/or at least one electrically conducting metal carbide, for instance in the form of an, in particular finely milled, powder, is mixed into at least one polymer and/or into at least one polymer precursor, for example polyacrylonitrile, and the at least one polymer and/or the at least one polymer precursor is sulfided, in particular after mixing.

"Sulfidation" can be understood in particular as a chemical reaction of a sulfur-containing compound, for example elemental sulfur and/or a sulfur-containing compound, with an organic compound, for example a polymer such as polyacrylonitrile. In particular, a covalent bond can be constituted between sulfur and the organic compound, for example the polymer, by sulfidation.

Advantageously, a sulfur/carbon composite, for instance sulfur/polymer composite, can be constituted by way of the method. A composite having elevated electrical conductivity can thereby advantageously be furnished. Metal sulfides, metal oxides, metal carbides, and elemental carbon can be durable under the conditions of the sulfidation reaction. Metal sulfides, however, can where applicable also enter into reactions with the sulfur; this can in fact be advantageous from other standpoints, for example in terms of specific energy density and/or capacity and/or catalytic acceleration.

The at least one polymer can [be] an intrinsically electrically conducting polymer, in particular polyaniline (PAni), and/or the at least one polymer precursor, in particular polyacrylonitrile (PAN), can be configured to constitute an intrinsically electrically conducting polymer, in particular cyclized and in particular dehydrogenated polyacrylonitrile (cPAN) and/or polyaniline (PAni). The cathode active material fibers can thereby advantageously be configured with additional electrical conductivity.

The polymer precursor can, for example, be converted into the corresponding polymer before, during, or after sulfidation. In particular, however, the polymer precursor can be converted into the corresponding polymer during sulfidation. For example, polyacrylonitrile (PAN) can be converted in the context of sulfidation into sulfided, cyclized, and in particular dehydrogenated polyacrylonitrile (SPAN).

Sulfidation can be accomplished, for example, by way of elemental sulfur and/or a sulfur-containing compound, in particular one configured for covalent attachment of sulfur to an organic compound, in particular to the at least one polymer and/or to the at least one polymer precursor. In particular, sulfidation can be accomplished by way of elemental sulfur. For instance, sulfidation can be accomplished by heating the at least one polymer and/or the at least one polymer precursor, for example to a temperature ≥300° C. For instance, sulfidation can be accomplished at a temperature in a range from ≥300° C. to ≤600° C., in particular from ≥400° C. to ≤500° C. In particular, sulfidation can be accomplished by heating the at least one polymer and/or the at least one polymer precursor in the presence of elemental sulfur to a temperature ≥300° C., for example to a temperature in a range from ≥300° C. to ≤600° C., in particular from ≥400° C. to ≤500° C.

The invention further relates respectively to a cathode material, for example cathode active material, manufactured by way of such a method, and to a sulfur/carbon composite, for instance sulfur/polymer composite, manufactured by way of such a method.

The particles can furthermore encompass, in particular contain, the at least one polymer electrolyte and/or the at least one inorganic ion conductor, in particular lithium ion conductor, Ionic contacting of the at least one cathode active material can thereby advantageously be improved. In addition, the quantity of polymer electrolyte serving as cathode material binder can thereby advantageously be considerably reduced, or a polymer electrolyte serving as a cathode material binder can in fact be omitted.

In the context of a further embodiment the particles are therefore directly connected to one another, for example compacted, and/or the cathode material is free of polymer electrolyte serving as a cathode material binder.

In the context of another embodiment, however, the particles are incorporated into at least one polymer electrolyte and/or inorganic ion conductor serving as a cathode material binder. The at least one polymer electrolyte and/or inorganic ion conductor, in particular the particle, and the at least one polymer electrolyte and/or inorganic ion conductor serving as a cathode material binder, can in this context be the same or different.

In the context of a special embodiment the at least one polymer electrolyte is electrically conductive. Electrical connection of the cathode active material can thereby advantageously also be further improved.

The at least one inorganic ion conductor can in particular be a crystalline ion conductor.

In the context of a further embodiment the at least one inorganic ion conductor encompasses or is a sulfidic ion conductor, in particular a lithium argyrodite and/or a sulfidic glass, and/or an ion conductor, in particular a lithium ion conductor, having a garnet-like structure, for example a lithium titanate and/or lithium zirconate, for instance lithium lanthanum zirconium garnet, and/or an ion conductor, in particular lithium ion conductor, of the LISICON type and/or the NASICON type, and/or lithium phosphorus oxynitride (LIPON).

An ionic conductor of the LISICON (Lithium Super Ionic CONductor) type and/or NASICON type can be, for example, an ion conductor derivable from the general formula: $Li_{4-x}M_{1-x}M'_xS_4$ (thio-LISICON type), where M denotes Si and/or Ge and/or P, and M' denotes P and/or Al and/or Zn and/or Ga and/or Sb, for instance $Li_{4-x}Ge_{1-x}P_xS_4$ and/or $Li_{4-x}Si_{1-x}P_xS_4$, where $0.5 \leq x \leq 0.85$, for example where x=0.75, and/or from the general chemical formula: $AB_2(PO_4)_3$ where A denotes Li and/or Na, and B denotes Ti and/or Al and/or Zr and/or Ge and/or Hf, for example lithium aluminum titanium phosphate (LATP), for instance $Li_{1+x}Al_xTi_{2-x}(PO_4)_3$.

An "ion conductor having a garnet-like crystal structure" can be understood in particular as an ion conductor whose crystal structure is derivable from the general garnet formula. The general garnet formula can be written as, for example, $A_3B_2[QO_4]_3$, where A, B, and Q denote different positions in the crystal lattice and can be occupied by one or more different ions or elements. For instance, A can denote the dodecahedral position, B the octahedral position, and Q the tetrahedral position.

For example, the at least one inorganic ion conductor can respectively encompass or be a sulfidic ion conductor, in particular for lithium ions. Sulfidic ion conductors can advantageously exhibit a high transference number and conductivity, as well as low contact resistance. The result is therefore that, advantageously, ionic contacting of the sulfur-containing cathode active material can be improved, and a low polarization overvoltage can be obtained, by way of sulfidic ion conductors. In addition, low polarization voltages, and thus high performance for a cell equipped therewith, can advantageously be achieved as a result of the high transference numbers, in particular in the case of high surface current densities upon charging/discharging. Furthermore, sulfidic ion conductors advantageously dissolve almost no sulfur and almost no polysulfides. This in turn has the advantage that (poly)sulfides $S_x^{2-}$ occurring upon discharge (reduction) of a cell, which where applicable could otherwise migrate to the anode, for example lithium anode, and could be reduced there and thus be withdrawn from the electrochemical reaction (also referred to as a "shuttle mechanism"), are retained better in the cathode, and sulfur utilization and cycle stability can thereby be improved.

In addition, sulfur-containing cathode materials can advantageously be chemically compatible with sulfidic ion conductors, with the result that degradation of the cathode material can be minimized and the service life of the cell can thereby be extended. Sulfidic ion conductors can moreover advantageously be manufactured in simple fashion.

Sulfidic ion conductors can be used particularly advantageously in combination with a sulfur/polymer composite having, for example covalently and/or ionically, in particular covalently, bound sulfur, since they exhibit almost no sulfur solubility and polysulfide solubility, so that solution of sulfur and polysulfides and diffusion thereof out of the polymer of the composite, which where applicable could occur in the case of low-molecular-weight ether components and/or conventional short-chain polyethers, such as pure polyethylene oxide, can be counteracted.

The at least one sulfidic ion conductor can be based, for example, on the general chemical formula: $(Li_2S)_x:(P_2S_5)_y$:

$D_z$, where $D_z$ denotes one or more additives, for example LiCl and/or LiBr and/or LiI and/or LiF and/or $Li_2Se$ and/or $Li_2O$ and/or $P_2Se_5$ and/or $P_2O_5$ and/or $Li_3PO_4$ and/or one or more sulfides of germanium, boron, aluminum, molybdenum, tungsten, silicon, arsenic, and/or niobium, in particular germanium. x, y, and z can in particular denote component ratios. Sulfidic ion conductors can be synthesized, for example, from the individual components $Li_2S$ and $P_2S_5$ and where applicable D. The synthesis can be carried out, where applicable, under inert gas.

In the context of an embodiment the at least one sulfidic ion conductor encompasses or is a lithium argyrodite and/or a sulfidic glass. These ion conductors have proven to be particularly advantageous because they can exhibit high ionic conductivity and low contact resistance values at the grain boundaries within the material and with further components, for instance with the cathode active material. The long-term stability and performance of a cell equipped with the cathode material can thereby advantageously be further improved.

"Lithium argyrodites" can be understood in particular as compounds that derive from the mineral argyrodite of the general chemical formula: $Ag_8GeS_6$, where silver (Ag) is replaced by lithium (Li) and where in particular germanium (Ge) and/or sulfur (S) can also be replaced by other elements, for instance of the main groups III, IV, V, VI, and/or VII.

Examples of lithium argyrodites are:
compounds of the general chemical formula:

$Li_7PCh_6$ where Ch denotes sulfur (S) and/or oxygen (O) and/or selenium (Se), for example sulfur (S) and/or selenium (Se), in particular sulfur (S);
compounds of the general chemical formula:

$Li_6PCh_5X$ where Ch denotes sulfur (S) and/or oxygen (O) and/or selenium (Se), for example sulfur (S) and/or selenium (Se), in particular sulfur (S), and X denotes chlorine (Cl) and/or bromine (Br) and/or iodine (I) and/or fluorine (F), for example X denotes chlorine (Cl) and/or bromine (Br) and/or iodine (I);
compounds of the general chemical formula:

$Li_{7-\delta}PCh_{6-\delta}X_\delta$ where Ch denotes sulfur (S) and/or oxygen (O) and/or selenium (Se), for example sulfur (S) and/or oxygen (O), in particular sulfur (S), B denotes phosphorus (P) and/or arsenic (As), X denotes chlorine (Cl) and/or bromine (Br) and/or iodine (I) and/or fluorine (F), for example X denotes chlorine (Cl) and/or bromine (Br) and/or iodine (I), and $0 \leq \delta \leq 1$.

For instance, the at least one sulfidic ion conductor can encompass at least one lithium argyrodite of the chemical formulas: $Li_7PS_6$, $Li_7PSe_6$, $Li_6PS_5Cl$, $Li_6PS_5Br$, $Li_6PS_5I$, $Li_{7-\delta}PS_{6-\delta}Cl_\delta$, $Li_{7-\delta}PS_{6-\delta}Br_\delta$, $Li_{7-\delta}PS_{6-\delta}I_\delta$, $Li_{7-\delta}PSe_{6-\delta}Cl_\delta$, $Li_{7-\delta}PSe_{6-\delta}Br_\delta$, $Li_{7-\delta}PSe_{6-\delta}I_\delta$, $Li_{7-\delta}AsS_{6-\delta}Br_\delta$, $Li_{7-\delta}AsS_{6-\delta}I_\delta$, $Li_6AsS_5I$, $Li_6AsSe_5I$, $Li_6PO_5Cl$, $Li_6PO_5Br$, and/or $Li_6PO_5I$. Lithium argyrodites are described, for example, in the documents: Angew. Chem. Int. Ed., 2008, 47, 755-758; Z. Anorg. Allg. Chem., 2010, 636, 1920-1924; Chem. Eur. J., 2010, 16, 2198-2206; Chem. Eur. J., 2010, 16, 5138-5147; Chem. Eur. J., 2010, 16, 8347-8354; Solid State Ionics, 2012, 221, 1-5; Z. Anorg. Allg. Chem., 2011, 637, 1287-1294; and Solid State Ionics, 2013, 243, 45-48.

The lithium argyrodite can in particular be a sulfidic lithium argyrodite, for instance in which Ch denotes sulfur (S).

Lithium argyrodites can be manufactured in particular by way of a mechanical/chemical reaction process, for instance in which starting materials such as lithium halides, for example LiCl, LiBr, and/or LiI, and/or lithium chalcogenides, for example $Li_2S$ and/or $Li_2Se$ and/or $Li_2O$, and/or chalcogenides of main group V, for example $P_2S_5$, $P_2Se_5$, $Li_3PO_4$, in particular in stoichiometric quantities, are milled together with one another. This can be accomplished, for example, in a ball mill, in particular in a high-energy ball mill, for instance at a rotation speed of 600 rpm. Milling can be accomplished in particular in an inert gas atmosphere.

For instance, the at least one sulfidic ion conductor can encompass at least one sulfidic glass of the chemical formula: $Li_{10}GeP_2S_{12}$, $Li_2S$—$(GeS_2)$—$P_2S_5$, and/or $Li_2S$—$P_2S_5$. For example, the at least one sulfidic ion conductor can encompass a germanium-containing sulfidic glass, for instance $Li_{10}GeP_2S_{12}$ and/or $Li_2S$—$(GeS_2)$—$P_2S_5$, in particular $Li_{10}GeP_2S_{12}$. Germanium-containing sulfidic lithium ion conductors can advantageously exhibit high lithium ion conductivity and chemical stability.

In the context of a special configuration of this embodiment the at least one sulfidic ion conductor encompasses or is a lithium argyrodite. Lithium argyrodites are advantageously notable for particularly low contact resistance values at the grain boundaries within the material and with further components, for example with the cathode active material. Particularly good ion conduction at and within the grain interfaces can thereby advantageously be achieved. Advantageously, lithium argyrodites can exhibit a low contact resistance between grains even without a sintering process. This advantageously allows the manufacture of the cathode material, and of a cell, to be simplified.

In the context of a combination of at least one polymer electrolyte and at least one inorganic ion conductor, the at least one inorganic ion conductor, for example sulfidic ion conductor, can in particular dissociate the ions to be conducted, for example lithium ions, and thereby furnish them, in which context ion mobility through the at least one polymer electrolyte can be increased, and ion conductivity can thereby be enhanced.

For example, the at least one polymer electrolyte can respectively encompass or be at least one polymer or polymer electrolyte that respectively encompasses at least one repeating unit of the general chemical formula:

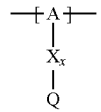

and/or at least one (singly or multiply) fluorinated, for example perfluorinated, and/or lithium sulfonate-substituted polymer, for example a perfluoropolyether and/or a lithium sulfonate-substituted, in particular fluorinated, for example perfluorinated, polyolefin, for example tetrafluoroethylene polymer, and/or a lithium sulfonate-substituted, in particular fluorinated, for example perfluorinated, polyether, for instance a lithium ion-containing, for example lithium ion-exchanged, Nafion, and/or a lithium sulfonate-substituted, in particular fluorinated, for example perfluorinated, polyphenylene.

The at least one polymer electrolyte or the at least one polymer can, for example, respectively encompass or be a homopolymer and/or a copolymer, for example a block copolymer, where applicable a multi-block copolymer, and/or an alternating copolymer and/or a statistical copolymer, and/or a polymer mixture, for example made up of one or more homopolymers and/or one or more copolymers, for instance a homopolymer/copolymer mixture.

In the context of a further embodiment the at least one polymer electrolyte or the at least one polymer respectively encompasses a polyalkylene oxide and/or a polymer having at least one alkylene oxide group, in particular oligoalkylene oxide group. Ion mobility, and thus ion conductivity, can advantageously be increased thanks to alkylene oxide units or groups. Such polymers are, however, only ion-conductive, in particular lithium ion-conductive, and should be used in combination, for example in a mixture, with at least one alkali metal salt, for example alkali metal conducting salt, in particular lithium salt, for example lithium conducting salt. For example, the at least one polymer electrolyte or the at least one polymer can respectively encompass a polyethylene oxide (PEO) and/or a propylene oxide and/or a polymer having at least one ethylene oxide group and/or propylene oxide group, for example oligoethylene oxide group and/or oligopropylene oxide group. In particular, the at least one polymer electrolyte can encompass a polyethylene oxide and/or a polymer having at least one ethylene oxide group, in particular oligoethylene oxide group.

In the context of a further, alternative or additional embodiment, the at least one polymer electrolyte or the at least one polymer respectively has at least one repeating unit of the general chemical formula:

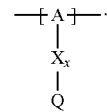

-[A]- denotes in this context a polymer-backbone-forming unit. X denotes a spacer, in particular a spacer bound, for example covalently, to the polymer-backbone-forming unit -[A]-. x denotes the quantity of spacer X, in particular the respective presence or absence thereof. In particular, x can be 1 or 0, for example 1. In the case where x=1, in particular, one spacer X can be present. In the case where x=0, in particular, no spacer can be present. Q here denotes a group that is attached, in particular covalently, to the spacer X (in the case where x=1) or to the polymer backbone -[A]- (in the case where x=0). In particular, the group Q can be attached via the spacer X to the polymer-backbone-forming unit -[A]-. In the case where x=1 (spacer is present) the group Q, for example the uncharged group Q or positively charged group $Q^+$ or negatively charged group $Q^-$ respectively explained below, can in particular be attached to the spacer X. In the case where x=0 (spacer is absent) the group Q, for example the uncharged group Q or positively charged group $Q^+$ or negatively charged group $Q^-$ respectively explained below, can be attached, in particular directly, to the polymer backbone -[A]-. Such polymers can advantageously exhibit an ion conductivity, for example lithium ion conductivity, in particular as a function of temperature, of $\geq 10^{-5}$ S/cm, where applicable even $\geq 10^{-4}$ S/cm, and advantageously can serve both as binders and as ion conductors, for example lithium ion conductors. Advantageously, increased mechanical stability can be achieved thanks to the binder properties. The polymer or the polymer electrolyte can in particular also be referred to respectively as a "cathode electrolyte" or "catholyte." Particularly advantageously, such polymers or polymer electrolytes can respectively be used or utilized in alkali metal/sulfur cells, for example lithium/sulfur cells and/or sodium/sulfur cells, in particular lithium/sulfur cells, for example having a sulfur/carbon composite, for instance a sulfur/polymer composite, in particular a polymer having, in particular covalently, bound sulfur, for example a sulfur/polyacrylonitrile composite, in particular SPAN, as a cathode active material. This is because, thanks to the attachment of the group Q, for example Q or $Q^+$ or $Q^-$, and where applicable of the spacer, to the polymer-forming unit -[A]-, and thus the localization of the group Q and where applicable of the spacer X—and in particular thanks to the elevated viscosity as compared with liquid electrolytes and/or in particular thanks to a reduced polysulfide solubility of the polymer or polymer electrolyte, in particular as compared with polyethylene oxide (PEO)—(poly)sulfides can advantageously be retained in the vicinity of the carbon of the composite and, for example, thereby counteract dissolution of polysulfides and, in particular, diffusion of polysulfides out of the carbon of the composite, which where applicable could occur in the case of low-molecular-weight ether compounds and/or conventional short-chain polyethers such as pure polyethylene oxide, and improved calendrical stability and/or improved energy density retention can thereby be achieved.

In the context of an implementation of this embodiment, Q denotes a negatively charged group $Q^-$, for example a negatively charged side group $Q^-$, and a counter ion $Z^+$. In particular, the negatively charged group $Q^-$ can be attached via the spacer X to the polymer-backbone-forming unit -[A]-.

The negatively charged group $Q^-$ can denote, for example, a group based on a conducting salt anion, in particular lithium conducting salt anion, for example a sulfonylimide group, for example a trifluoromethanesulfonylimide group (TFSI$^-$: $F_3C$—$SO_2$—$(N^-)$—$SO_2$—) and/or perfluoroethanesulfonylimide group (PFSI$^-$: $F_5C_2$—$SO_2$—$(N^-)$—$SO_2$—) and/or fluorosulfonylimide group (FSI: F—$SO_2$—$(N^-)$—$SO_2$—), and/or a group based on an anion of an ionic liquid, for example a pyrazolide group or an imidazolide group, and/or a sulfonate group, for example a (single) sulfonate group or a trifluoromethanesulfonate group (triflate, $^-SO_3CF_2$—), and/or a sulfate group and/or a carboxylate group and/or a group based on a phosphoric acid-based anion, in particular a phosphate group, and/or a group based on an anion of an imide, in particular a sulfonylimide group, for example a trifluoromethanesulfonylimide group (TFSI$^-$: $F_3C$—$SO_2$—$(N^-)$—$SO_2$—) and/or perfluoroethanesulfonylimide group (PFSI$^-$: $F_5C_2$—$SO_2$—$(N^-)$—$SO_2$—) and/or fluorosulfonylimide group (FSI: F—$SO_2$—$(N^-)$—$SO_2$—), and/or a group based on an anion of an amide, in particular a group based on an ion of a secondary amide (—R—NHR—), and/or a group based on an anion of a carboxylic acid amide, in particular a group based on an anion of a secondary carboxylic acid amide (—CO—NHR). A cation $Z^+$, in particular a metal cation, for example lithium ion and/or sodium ion, in particular lithium, can be contained, for example, as a counter ion of $Q^-$. A negatively charged group Q makes it possible in particular to coordinate or solvate alkali metal ions, for example lithium ions. A high transference number of close to 1 can be produced in this context, in particular thanks to the covalent attachment of the negatively charged group $Q^-$ to the polymer-backbone-forming unit -[A]-. Where applicable, elevated mobility of alkali ions, in particular lithium ions, can be obtained in this context. In addition, the dielectric constant can also thereby advantageously be increased, which can have a positive influence on polysulfide solubility (specifically such that polysulfide solubility is reduced); this can have a particularly advantageous effect especially in the context of sulfur/carbon composites, for example sulfur/polymer and/or sulfur/carbon allotrope composites, in particular sulfur/polymer composites having sulfur bound, for example covalently and/or ionically, in particular covalently, to the polymer of the composite, for instance sulfur/polyacrylonitrile composites, in particular SPAN. In addition, polymers that have a negatively charged group $Q^-$ and a counter ion $Z^+$, for example a lithium ion $Li^+$ and/or a sodium ion $Na^+$, in particular a lithium ion $Li^+$, can already exhibit sufficient ion conductivity, in particular lithium ion conductivity, thanks to the counter ion $Z^+$. Polymers that have a negatively charged group $Q^-$ and a counter ion $Z^+$, for example a lithium ion $Li^+$ and/or a sodium ion $Na^+$, in particular a lithium ion $Li^+$, can therefore be used, and can respectively be ion-conducting, in particular lithium ion-conducting, without the addition of an alkali metal conducting salt, for example lithium conducting salt. Where applicable, however, polymers that have a negatively charged group $Q^-$ and a counter ion $Z^+$, for example a lithium ion $L^+$, can nevertheless be used in combination, for example in a mixture, with at least one alkali metal salt, in particular lithium salt, for example lithium conducting salt, for example [in order to] reduce the glass transition temperature and/or increase ion mobility and/or ion conductivity, in particular lithium ion conductivity. The polymer-backbone-forming unit -[A]- and/or the spacer X can also, where applicable, be optimized in this context in terms of other properties.

In the context of an, in particular alternative or additional, implementation of this embodiment, Q denotes a positively charged group $Q^+$, for example a positively charged side group $Q^+$, and a counter ion $Z^-$. In particular, the positively charged group $Q^+$ can be attached via the spacer X to the polymer-backbone-forming unit -[A]-. The positively charged group $Q^+$ can denote, for example, a group based on a cation of an ionic liquid. A counter ion or anion $Z^-$ can in particular be contained as a counter ion to the positive charge of $Q^+$. For example, all usual counter ions of known conducting salts, for example for lithium cells, can be used, for instance, as a counter ion $Z^-$. $Z^-$ can therefore denote in particular an anion, in particular a conducting salt anion. Thanks to a positively charged group $Q^+$, in particular, anions of conducting salts, in particular lithium conducting salt anions, can be respectively coordinated or solvated and, in particular, dissociation of the conducting salt, in particular lithium conducting salt, can be increased. The result in turn is that, advantageously, the transference number can likewise be increased, in particular as a result of the covalent attachment of the positively charged group $Q^+$ to the polymer-backbone-forming unit -[A]-, as can, where applicable, the mobility of the alkali ions, in particular lithium ions, of the conducting salt and therefore the ion conductivity, in particular the lithium ion conductivity. The dielectric constant can moreover also advantageously thereby be increased, which has a positive influence on polysulfide solubility (specifically such that the polysulfide solubility is reduced); this can have a particularly advantageous effect especially in the context of sulfur/carbon composites, for example sulfur/polymer and/or sulfur/carbon allotrope composites, in particular sulfur/polymer composites having sulfur bound, for example covalently and/or ionically, in particular covalently, to the polymer of the composite, for instance sulfur/polyacrylonitrile composites, in particular SPAN. The polymer-backbone-forming unit -[A]- and/or the spacer X can also, where applicable, be optimized in terms of other properties. In particular, polymers that have a positively charged group $Q^+$ can be used in combination, for example in a mixture, with at least one alkali metal salt, for example alkali metal conducting salt, in particular lithium salt, for example lithium conducting salt.

In the context of an, in particular alternative or additional, implementation of this embodiment, Q denotes an uncharged group Q, for example an uncharged functional side group, which is capable of respectively coordinating or solvating alkali ions, in particular lithium ions ($Li^+$). In particular, the uncharged group Q can be attached in this context to the polymer-backbone-forming unit -[A]- via the spacer X. The uncharged group Q can denote, for example, a group derivable from an electrolyte solvent. An uncharged group Q can advantageously allow alkali metal ions, for example lithium ions, to be respectively coordinated or solvated. The mobility of the alkali ions, for example lithium ions, and thus the ion conductivity, in particular lithium ion conductivity, can thus advantageously be increased in particular by the introduction of the group derivable from an electrolyte solvent. The polymer-backbone-forming unit -[A]- and/or the spacer X can in this context, where applicable, be optimized in terms of other properties. Polymers that carry only uncharged groups Q, and in particular no bound charges, for example alkali ions, in particular lithium ions, can initially be only ion-conductive, for example lithium ion-conductive, and can become ion-conducting, for example lithium ion-conducting, for example by the addition of an alkali metal salt, for example alkali metal conducting salt, in particular lithium salt, for example by mixing with an alkali metal salt, for example alkali metal conducting salt, in particular lithium salt, and in particular solvation of the salt. In particular, polymers that have an uncharged group Q can therefore be used in particular in combination, for example in a mixture, with at least one alkali metal salt, for example alkali metal conducting salt, in particular lithium salt, for example lithium conducting salt.

All in all, advantageously, thanks to the group Q, for example respectively Q or $Q^-$ or $Q^+$, the dissociation of alkali metal ions, for example lithium ions, from the inorganic ion conductor and/or where applicable from a conducting salt can be promoted, and coordination between alkali ion, in particular lithium ion, and the inorganic ion conductor and/or where applicable a conducting salt can respectively be attenuated. Advantageously, the transference number and/or mobility of the ions, for example lithium ions, and thus the ion conductivity, in particular the lithium ion conductivity, can thereby be influenced and/or increased. In the case of $Q^-$, very high transference numbers can advantageously be achieved with the result that, in particular in the case of high surface current densities upon charging/discharging, low polarization voltages and thus high performance for a cell equipped therewith can be achieved. Because the group Q is directly or indirectly attached to the polymer backbone -[A]-, it is advantageously possible to obtain a localization respectively of the group Q or $Q^-$ or $Q^+$, as compared with mixtures of analogous polymers and analogous, but free or unbound, groups Q. Thanks to localization of the group Q, for example respectively Q or $Q^+$ or $Q^-$, it is in turn advantageously possible to prevent outward diffusion of the group Q and, for instance, secondary reactions that are otherwise associated therewith where applicable, for example swelling of the separator and/or of an anode protection layer and/or degradation of the anode, which could occur, for instance, in the case of low-molecular-weight ether compounds, and to improve the mechanical stability and, for example, binder function. In addition, such polymers can exhibit an extremely low vapor pressure as compared with liquid electrolytes, thus allowing a cell equipped therewith to be operated safely at higher operating temperatures. Advantageously, further properties, such as the glass transition temperature and/or other properties of the polymer or of the polymer electrolyte, can be adjusted by way of the spacer X, for example by way of the nature of the spacer and/or the length of the spacer, and/or by way of the polymer-backbone-forming unit -[A]-, for example by way of the nature of the polymer-backbone-forming unit -[A]- and its structure. In particular, the glass transition temperature and/or the mechanical properties of the polymer or polymer electrolyte can respectively be advantageously adjusted by way of the spacer X. The polymer-backbone-forming unit -[A]- can, where applicable, be optimized in this context in terms of other properties, for example mechanical properties.

All in all, the manufacture and construction of alkali metal/sulfur cells, for example lithium/sulfur cells and/or sodium/sulfur cells, specifically lithium/sulfur cells, for instance lithium/SPAN cells, can thereby advantageously be simplified, and their capacity retention or cycle stability, service life, and safety can respectively be enhanced.

In the context of an implementation of this embodiment the at least one polymer electrolyte or the at least one polymer respectively encompasses or is a copolymer, for example a block copolymer, for instance a multi-block copolymer, and/or an alternating copolymer and/or a statistical copolymer, and/or a polymer mixture and/or a homopolymer, having at least one repeating unit of the general chemical formula:

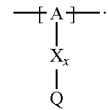

If Q encompasses a negatively charged group $Q^-$, the polymer or polymer electrolyte can have, for example, a repeating unit of the general chemical formula:

The counter ion $Z^+$ can denote in particular an alkali ion, for example a lithium ion and/or sodium ion, in particular a lithium ion ($Li^+$). Because of the negative charge of the group $Q^-$, for example sulfonate group, advantageously, for example, lithium ($Li^+$) can directly be the counter ion to the negative charge of the group $Q^-$, for example sulfonate group, and in particular can furnish ion conductivity. It is thus advantageously possible to dispense with the addition of conducting salt. In particular, $Z^+$ can therefore denote a lithium ion ($Li^+$).

The negatively charged group $Q^-$ can denote, for example, a group based on a conducting salt anion, in particular lithium conducting salt anion, for example a sulfonylimide group, for example a trifluoromethanesulfonylimide group ($TFSI^-$: $F_3C$—$SO_2$—$(N^+)$—$SO_2$—) and/or perfluoroethanesulfonylimide group ($PFSI^-$: $F_5C_2$—$SO_2$—$(N^-)$—$SO_2$—) and/or fluorosulfonylimide group (FSI:

F—$SO_2$—($N^+$)—$SO_2$—), and/or a group based on an anion of an ionic liquid, for example a pyrazolide group or an imidazolide group, and/or a sulfonate group, for example a (single) sulfonate group or a trifluoromethanesulfonate group (triflate, $^-SO_3CF_2$—), and/or a sulfate group and/or a carboxylate group and/or a group based on a phosphoric acid-based anion, in particular a phosphate group, and/or a group based on an anion of an imide, in particular a sulfonylimide group, for example a trifluoromethanesulfonylimide group (TFSI$^-$: $F_3C$—$SO_2$—($N^+$)—$SO_2$—) and/or perfluoroethanesulfonylimide group (PFSI$^-$: $F_5C_2$—$SO_2$—($N^-$)—$SO_2$—) and/or fluorosulfonylimide group (FSI: F—$SO_2$—($N^-$)—$SO_2$—), and/or a group based on an anion of an amide, in particular a group based on an anion of a secondary amide (—R—NHR—), and/or a group based on an anion of a carboxylic acid amide, in particular a group based on an anion of a secondary carboxylic acid amide (—CO—NHR). A negatively charged group $Q^-$ makes it possible in particular to respectively coordinate or solvate alkali metal ions, in particular lithium ions. A high transference number of close to 1 can be produced in this context, in particular thanks to the covalent attachment of the negatively charged group $Q^-$ to the polymer-backbone-forming unit -[A]-. In addition, the dielectric constant can also thereby advantageously be increased, which can have a positive influence on polysulfide solubility (specifically such that polysulfide solubility is reduced); as explained, this can have a particularly advantageous effect especially in the context of sulfur/carbon composites, for example sulfur/polymer and/or sulfur/carbon allotrope composites, in particular sulfur/polymer composites having sulfur bound, for example covalently and/or ionically, in particular covalently, to the polymer of the composite, for instance sulfur/polyacrylonitrile composites, in particular SPAN.

In the context of a special embodiment the negatively charged group $Q^-$ therefore denotes a group based on a lithium conducting salt anion, in particular lithium conducting salt anion, and/or a group based on an anion of an ionic liquid and/or a sulfonate group and/or a sulfate group and/or a carboxylate group and/or a group based on a phosphoric acid-based anion and/or a group based on an anion of an imide and/or a group based on an anion of an amide and/or a group based on an anion of a carboxylic acid amide.

In the context of an implementation of this embodiment the negatively charged group $Q^-$ denotes a sulfonylimide group, in particular a trifluoromethanesulfonylimide group ($F_3C$—$SO_2$—($N^-$)—$SO_2$—) and/or perfluoroethanesulfonylimide group ($F_5C_2$—$SO_2$—($N^-$)—$SO_2$—) and/or fluorosulfonylimide group (F—$SO_2$—($N^-$)—$SO_2$—), in particular trifluoromethanesulfonylimide group, and/or a sulfonate group, in particular a (single) sulfonate group and/or a trifluoromethanesulfonate group. For example, the negatively charged group $Q^-$ can denote a trifluoromethanesulfonylimide group or perfluoroethanesulfonylimide group or fluorosulfonylimide group or a sulfonate group or a trifluoromethanesulfonate group. In the context of a special embodiment the negatively charged group Q can denote a sulfonate group or a sulfonylimide group, in particular a sulfonate group. $Z^+$ in this context can denote in particular a lithium ion. By way of a sulfonylimide group or a sulfonate group, in particular a sulfonylimide group, it is advantageously possible to achieve a coordination of cations, in particular lithium ions, that is comparatively weak and thus increases ion mobility, in particular lithium ion mobility, and ion conductivity, in particular lithium ion conductivity. $Z^+$ can in particular denote a lithium ion.

The negatively charged group $Q^-$ can in particular denote a benzene group, which is substituted with at least one group based on a conducting salt anion, in particular on a lithium conducting salt anion, in particular with at least one sulfonylimide group (benzenesulfonylimide group, for example lithium benzenesulfonylimide group), and/or with at least one group based on an anion of an ionic liquid and/or with at least one sulfonate group (benzenesulfonate group, for example lithium benzenesulfonate group) and/or with at least one sulfate group and/or with at least one carboxylate group and/or with at least one group based on a phosphoric acid-based anion, in particular with at least one phosphate group, and/or with at least one group based on an anion of an imide and/or with at least one group based on an anion of an amide and/or with at least one group based on an anion of a carboxylic acid imide. For instance, the negatively charged group $Q^-$ can denote a benzene group that is substituted with at least one trifluoromethanesulfonylimide group and/or with at least one perfluoroethanesulfonylimide group and/or with at least one fluorosulfonylimide group, in particular with at least one trifluoromethanesulfonylimide group. In the context of an embodiment, $Q^-$ denotes a benzenesulfonate group or a benzenesulfonimide group, in particular a benzenesulfonate group. A benzene group advantageously makes it possible to attach a group, for example a sulfonate, in simple fashion to a very wide variety of polymer backbones. A benzene group furthermore offers the possibility of attaching, in simple fashion, further substituents that increase ion conductivity, such as multiple groups, for example sulfonate groups, and/or one or more alkylene oxide group(s). A polymer having a benzene group, in particular one functionalized in this manner, can advantageously be constituted in simple fashion by polymerizing the double bond of a styrene, in particular one functionalized in this manner, for example of 4-(styrenesulfonyl) (trifluoromethanesulfonyl)imide, or of one functionalized with anionic groups recited above. Coupling of the anionic function to a polymer backbone can also be accomplished, for example, via a functional group in the para-position with respect to the anionic group in the aromatic six-membered carbon ring. An aromatic six-membered carbon ring furthermore offers the capability for attaching, in simple fashion, further substituents that increase ion conductivity.

In the context of a special implementation of this embodiment the negatively charged group $Q^-$ therefore denotes a benzenesulfonylimide group, for instance a para- and/or ortho- and/or meta-benzenesulfonylimide group, for example a para-benzenesulfonylimide group, and/or a benzenesulfonate group, for example a benzenesulfonate group, for instance a para- and/or ortho- and/or meta-benzenesulfonate group, for example a para-benzenesulfonate group. Benzenesulfonylimide groups and/or benzenesulfonate groups, for example a para-, ortho-, and/or meta-benzenesulfonylimide group and/or para-, ortho-, and/or meta-benzenesulfonate group, in particular a para-benzenesulfonylimide group and/or a para-benzenesulfonate group, can be particularly advantageous as explained above.

Such polymers can be respectively used or utilized particularly advantageously, in particular as a lithium ion-conductive electrolyte, for example solid electrolyte, in a cathode material, for example having a sulfur/carbon composite, for instance having a composite of an, in particular electrically conductive, polymer and sulfur, in particular having a sulfur/polyacrylonitrile (PAN) composite, for instance SPAN, as a cathode active material, for example in a lithium/sulfur cell.

In the context of a special implementation of this embodiment Q denotes a sulfonylimide group, for example a benzenesulfonylimide group. A comparatively weak coordination of cations, in particular of lithium ions, which thus increases ion mobility, in particular lithium ion mobility, and ion conductivity, in particular lithium ion conductivity, can thus advantageously be achieved by way of the soft anion.

In the context of a further special implementation of this embodiment Q denotes a sulfonate group, for example a benzenesulfonate group.

If Q encompasses a positively charged group $Q^+$, the at least one polymer electrolyte or the at least one polymer can respectively have a repeating unit of the general chemical formula:

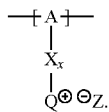

In the context of a further, special embodiment the positively charged group $Q^+$ denotes a group based on a cation of an ionic liquid, in particular a pyridinium group or an, in particular, quaternary, ammonium group or an imidazolium group or a piperidinium group or a pyrrolidinium group or an, in particular quaternary, phosphonium group or a guanidinium group or a morpholinium group or a uronium group or a thiouronium group. For example, all usual counter ions of known lithium salts, in particular lithium conducting salts, can be used as a counter ion $Z^-$. $Z^-$ can therefore denote in particular an anion, in particular a lithium conducting salt anion. Groups $Q^+$ that are based on a cation of an ionic liquid, in particular pyridinium groups, ammonium groups, imidazolium groups, piperidinium groups, pyrrolidinium groups, phosphonium groups, guanidinium groups, morpholinium groups, uronium groups, and/or thiouronium groups, can advantageously increase the dissociation of alkali ions, in particular lithium ions, for example of the conducting salt and/or inorganic ion conductor, and thereby in turn advantageously increase the transference number and where applicable the mobility of the alkali ions, in particular lithium ions, and thus the ion conductivity, in particular the lithium ion conductivity, as well as the dielectric constant, and thus reduce the polysulfide solubility.

A "pyridinium group" can be understood in particular as an, in particular substituted or unsubstituted, group derivable from pyridinium. An "ammonium group" can be understood in particular as a group derivable from ammonium, in particular a quaternary ammonium group. An "imidazolium group" can be understood in particular as an, in particular substituted or unsubstituted, group derivable from imidazolium. A "piperidinium group" can be understood in particular as an, in particular substituted or unsubstituted, group derivable from piperidinium. A "pyrrolidinium group" can be understood in particular as an, in particular substituted or unsubstituted, group derivable from pyrrolidinium. A "phosphonium group" can be understood in particular as a group derivable from phosphonium, in particular a quaternary phosphonium group. A "guanidinium group" can be understood in particular as an, in particular substituted or unsubstituted, group derivable from guanidinium. A "morpholinium group" can be understood in particular as an, in particular substituted or unsubstituted, group derivable from morpholinium. A "uronium group" can be understood in particular as an, in particular substituted or unsubstituted, group derivable from uronium. A "thiouronium group" can be understood in particular as an, in particular substituted or unsubstituted, group derivable from thiouronium.

For example, the positively charged group $Q^+$ can denote a pyridinium group or an, in particular quaternary, ammonium group or an imidazolium group or a piperidinium group or a pyrrolidinium group or an, in particular quaternary, phosphonium group or a guanidinium group or a morpholinium group or a uronium group or a thiouronium group, whose proton(s) are substituted with a substituent.

The positively charged group $Q^+$ can denote in particular a pyridinium group or an, in particular quaternary, ammonium group or an imidazolium group or a piperidinium group or a pyrrolidinium group or an, in particular quaternary, phosphonium group. For example, $Q^+$ can denote an, in particular quaternary, ammonium group or an imidazolium group or a pyridinium group. The ion conductivity and dielectric constant can thereby advantageously be increased in comparatively simple fashion.

In the context of an implementation of this embodiment $Z^-$ denotes a lithium conducting salt anion. Dissociation of a lithium conducting salt can thus advantageously be increased, and the mobility of the lithium ions of the lithium conducting salts, and thus the lithium ion conductivity, can thereby also be increased.

$Z^-$ can denote, for example, perchlorate ($ClO_4^-$), tetrafluoroborate ($BF_4^-$), trifluoromethanesulfonate (triflate$^-$, $F_3CSO_3^-$), bisoxalatoborate

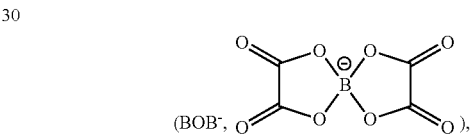

hexafluorophosphate ($PF_6^-$), bromide ($Br^-$) or iodide ($I^-$) or chloride ($Cl^-$), (bis)trifluoromethanesulfonylimide (TFSI$^-$: $F_3C$—$SO_2$—($N^-$)—$SO_2$—$CF_3$), or difluorooxalatoborate

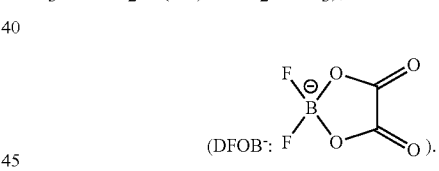

These anions are often used as lithium conducting salt anions. These anions can therefore be used particularly advantageously to solvate lithium conducting salts.

In the context of an implementation of this embodiment $Z^-$ therefore denotes perchlorate and/or trifluoromethanesulfonate and/or tetrafluoroborate and/or bisoxalatoborate and/or hexafluorophosphate, and/or bis(trifluoromethanesulfonyl)imide and/or bis(perfluoroethanesulfonyl)imide and/or bis(fluorosulfonyl)imide, in particular bis(trifluoromethanesulfonyl)imide, and/or difluorooxalatoborate (DFOB) and/or bromide and/or iodide and/or chloride. $Z^-$ can in particular denote bis(trifluoromethanesulfonyl)imide and/or bis(perfluoroethanesulfonyl)imide and/or bis(fluorosulfonyl)imide, in particular bis(trifluoromethanesulfonyl)imide, trifluoromethanesulfonate and/or tetrafluoroborate and/or bisoxalatoborate and/or difluorooxalatoborate (DFOB) and/or bromide and/or iodide and/or chloride. Greater thermal stability can thereby advantageously be obtained.

In the context of a special embodiment $Z^-$ denotes bis(trifluoromethanesulfonyl)imide (TFSI$^-$: $F_3C$—$SO_2$—

(N⁻)—SO₂—CF₃) and/or bis(perfluoroethanesulfonyl)imide (BETI⁻: F₅C₂—SO₂—(N⁻)—SO₂—C₂F₅) and/or bis(fluorosulfonyl)imide (FSI: F—SO₂—(N⁻)—SO₂—F), in particular bis(trifluoromethanesulfonyl)imide, and/or trifluoromethanesulfonate (triflate, SO₃—CF₃). Thanks to large, soft anions [such as] bis(trifluoromethanesulfonyl)imide and/or bis(perfluoroethanesulfonyl)imide and/or bis(fluorosulfonyl)imide and/or trifluoromethanesulfonate, in particular bis(trifluoromethanesulfonyl)imide (TFSI⁻), a comparatively weak coordination of cations, in particular lithium ions, which thus increases ion mobility, in particular lithium ion mobility, and ion conductivity, in particular lithium ion conductivity, can advantageously be achieved and, for example, the solubility of conducting salts respectively in the polymer or polymer electrolyte, as well as thermal stability where applicable, can be improved.

Polymers or polymer electrolytes of this kind can respectively be particularly advantageously used or utilized, in particular as a lithium ion-conductive electrolyte, for example solid electrolyte, in a cathode material, for example having a sulfur/carbon composite, for instance having a composite of an, in particular electrically conductive, polymer and sulfur, in particular having a sulfur/polyacrylonitrile (PAN) composite, for instance SPAN, as a cathode active material, for instance in a lithium/sulfur cell.

If Q is a neutral group, the at least one polymer electrolyte or the at least one polymer can respectively have, for example, a repeating unit of the general chemical formula:

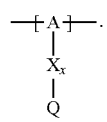

An uncharged group Q advantageously allows the alkali ions, in particular lithium ions, of conducting salts, for example alkali salts, in particular lithium conducting salts, to be respectively coordinated or solvated, and in this manner the mobility of the alkali ions, for example lithium ions, and thus the ion conductivity, in particular lithium ion conductivity, of the polymer or polymer electrolyte can respectively be increased. This can be promoted, for example, by selection of the spacer X.

In the context of a further, special embodiment the uncharged group Q denotes a group derivable in particular from an electrolyte solvent, for example a cyclic carbonate group or an, in particular cyclic, lactone group or a cyclic carbamate group or an acyclic carbonate group or an acyclic carboxylic acid ester group or an acyclic carbamate group or an alkylene oxide group, in particular oligoalkylene oxide group. A cyclic carbonate group or lactone group or cyclic carbamate group or acyclic carbonate group or acyclic carboxylic acid ester group or acyclic carbamate group or alkylene oxide group, for example oligoalkylene oxide group, can be advantageous in this context because the mobility of alkali ions, for example lithium ions, and thus the ion conductivity, in particular lithium ion conductivity, of the polymer or polymer electrolyte can respectively thereby advantageously be increased.

In the context of a special implementation of this embodiment Q denotes an alkylene oxide group, in particular an oligoalkylene oxide group. It is thereby advantageously possible to decrease the glass temperature and/or increase the lithium ion conductivity.

In the context of another implementation of this embodiment the uncharged group Q denotes a cyclic carbonate group or a lactone group or a cyclic carbamate group or an acyclic carbonate group or an acyclic carboxylic acid ester group or an acyclic carbamate group. Thanks to the high polarity of these groups, these groups can advantageously increase the ion dissociation and the dielectric constant respectively of the polymer or polymer electrolyte and thus advantageously reduce the polysulfide solubility, which can be particularly advantageous in particular with sulfur/polyacrylonitrile composites such as SPAN.

In the context of a further implementation of this embodiment the uncharged group Q denotes an, in particular cyclic or acyclic, carboxylic acid ester group, for example lactone group, or an, in particular cyclic or acyclic, carboxylic acid ester group. Thanks to the high polarity of these groups, these groups can advantageously increase the dielectric constant respectively of the polymer or polymer electrolyte and thus advantageously reduce the polysulfide solubility, which can be particularly advantageous in particular with sulfur/polyacrylonitrile composites such as SPAN.

In the context of another implementation of this embodiment the, in particular uncharged, group Q denotes a cyclic carbonate group or a lactone group or a carbamate group, in particular a cyclic carbamate group or an acyclic carbamate group. In particular, Q can denote in this context a cyclic carbonate group or an, in particular cyclic, lactone group or a cyclic carbamate group. Cyclic carbonate groups, lactone groups, and/or cyclic carbamate groups can be particularly advantageous for increasing the ion conductivity of the polymer as a whole.

In the context of a special implementation of this embodiment Q denotes a cyclic carbonate group, for example which forms a five-membered ring or a six-membered ring or a seven-membered ring, in particular a five-membered ring. In the context of a further special implementation of this embodiment Q denotes a lactone group, for example which forms a five-membered ring or a six-membered ring or a seven-membered ring, in particular a five-membered ring. In the context of a further special implementation of this embodiment Q denotes a cyclic carbamate group, for example which forms a five-membered ring or a six-membered ring or a seven-membered ring, in particular a five-membered ring. In the context of a further special implementation of this embodiment Q denotes an acyclic carbonate group. In the context of a further special implementation of this embodiment Q denotes an acyclic carboxylic acid ester group. In the context of a further special implementation of this embodiment Q denotes an acyclic carbamate group.

In the context of a further special embodiment Q denotes hydrogen or an alkyl group, in particular a methyl group or an ethyl group.

Such polymers or polymer electrolytes can respectively be respectively used or utilized particularly advantageously, in particular as a lithium ion-conductive electrolyte, for example solid electrolyte, in a cathode material, for example having a sulfur/carbon composite, for instance having a composite of an, in particular electrically conductive, polymer and sulfur, in particular having a sulfur/polyacrylonitrile (PAN) composite, for instance SPAN, as a cathode active material, for instance in a lithium/sulfur cell.

In the context of a further embodiment the cathode material or the at least one polymer electrolyte or the at least one polymer furthermore respectively encompasses a conducting salt, in particular lithium conducting salt. The ion conductivity, in particular lithium ion conductivity, can thereby, where applicable, be further increased. Depending on the polymer, despite a high transference number a small addition of a conducting salt, in particular lithium conducting salt, can be advantageous in order to lower the glass point of the polymer and thus increase the overall mobility of the lithium ions in the system, although this can come at the expense of a reduction in transference number. In this case a conducting salt, in particular lithium conducting salt, whose anion interacts well with the group Q, can ideally be used. For instance, lithium bis(trifluoromethanesulfonyl) imide (LiTFSI) can be used in the context of a sulfonylimide group.

The at least one conducting salt can be, for example, a lithium conducting salt or a sodium conducting salt, in particular a lithium conducting salt. Usual lithium conducting salts can be used as a lithium conducting salt. For example, the at least one lithium conducting salt can encompass or be lithium hexafluorophosphate ($LiPF_6$) and/or lithium bis(trifluoromethanesulfonyl)imide (LiTFSI) and/or lithium bisoxalatoborate (LiBOB) and/or trifluoromethanesulfonate (Li triflate) and/or lithium perchlorate ($LiClO_4$) and/or lithium difluorooxalatoborate (LiDFOB) and/or lithium tetrafluoroborate ($LiBF_4$) and/or lithium bromide (LiBr) and/or lithium iodide (LiI) and/or lithium chloride (LiCl). The anion $Z^-$ and the anion of the at least one lithium conducting salt can in this context be different or identical.

In the context of an implementation of this embodiment the anion of the at least one conducting salt, in particular lithium conducting salt, and $Z^-$ and $Q^-$, are respectively selected from the same anion class, for example the sulfonylimides, for instance trifluoromethanesulfonylimide and/or pentafluoroethanesulfonylimide and/or fluorosulfonylimide, in particular trifluoromethanesulfonylimide. Undesired secondary reactions can thereby advantageously be avoided, and a further result is in particular that the anion of the at least one conducting salt and $Z^-$ and $Q^-$ respectively coordinate alkali ions, in particular lithium ions, with similar, for example identical, intensity, which can have an advantageous effect on ion mobility.

In the context of a further embodiment the at least one polymer electrolyte encompasses at least one, in particular ion-conductive or ion-conducting, for example lithium ion-conductive or lithium ion-conducting, polymer, having at least one repeating unit of the general chemical formula:

where Q denotes a negatively charged group $Q^-$ and a counter ion $Z^+$, in particular lithium ion, and/or
where the spacer X encompasses at least one, where applicable further, negatively charged group $Q^-$, in particular based on a conducting salt anion, in particular lithium conducting salt anion, and/or on an anion of an ionic liquid or a sulfonate group, for example at least one sulfonylimide group and/or at least one sulfonate group, and a counter ion $Z^+$, for example alkali ion, in particular lithium ion.

In the context of a further, alternative or additional embodiment the at least one polymer electrolyte encompasses at least one, in particular ion-conductive or ion-conducting, for example lithium ion-conductive or lithium ion-conducting, polymer, having at least one repeating unit of the general chemical formula:

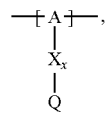

where Q denotes a positively charged group $Q^+$ and a counter ion $Z^-$, and/or where the spacer X encompasses at least one, where applicable further, positively charged group $Q^+$, in particular based on a cation of an ionic liquid, for example at least one ammonium group and/or at least one pyridinium group and/or at least one imidazolium group and/or at least one piperidinium group and/or at least one pyrrolidinium group and/or at least one phosphonium group and/or at least one guanidinium group and/or at least one morpholinium group and/or at least one uronium group and/or at least one thiouronium group, and a counter ion $Z^-$, for example conducting salt anion, in particular lithium conducting salt anion. Positively charged groups $Q^+$ can advantageously allow the ion dissociation, for example of the conducting salt and/or inorganic ion conductor, and thus the ion conductivity, to be increased. Such polymers are, however, only ion-conductive, in particular lithium ion-conductive, and should be used in combination, for example in a mixture, with at least one conducting salt, in particular lithium conducting salt.

In the context of a further, alternative or additional embodiment the at least one polymer electrolyte encompasses at least one, in particular ion-conductive or ion-conducting, for example lithium ion-conductive or lithium ion-conducting, polymer, the at least one polymer encompassing a polyalkylene oxide, for example polyethylene oxide, and/or a polymer having at least one alkylene oxide group, for example ethylene oxide group, in particular oligoalkylene oxide group, for instance oligoethylene oxide group, and/or at least one repeating unit of the general formula:

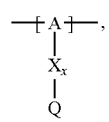

where Q denotes an uncharged group Q, in particular an alkylene oxide group, in particular an oligoalkylene oxide group, for example an ethylene oxide group, for example an oligoethylene oxide group, and/or
where the spacer X encompasses at least one alkylene oxide group, in particular an oligoalkylene oxide group, for example an ethylene oxide group, for instance an oligoethylene oxide group, and/or
where the polymer-backbone-forming unit -[A]- encompasses at least one alkylene oxide group, for example an oligoalkylene oxide group, in particular an ethylene oxide group, for instance an oligoethylene oxide group. The cathode material can encompass in particular at least one conducting salt, in particular lithium conducting salt. Alkylene oxide units or groups and/or uncharged groups Q can respectively allow the ion mobility and thus ion conductivity to be advantageously increased. Such polymers are, however, only ion-conductive, in particular lithium ion-conductive, and should be used in combination, for example in a mixture, with at least one conducting salt, in particular lithium conducting salt.

In the context of a special embodiment Q denotes a negatively charged group Q⁻ and a counter ion Z⁺ and/or a positively charged group Q⁺ and a counter ion Z⁻. This has proven to be particularly advantageous because as a result, ion dissociation can be increased and polysulfide solubility decreased. Repeating units having a negatively charged group Q⁻ and a counter ion Z⁺ and/or having a positively charged group Q⁺ and a counter ion Z⁻ can prove to be particularly advantageous in combination with uncharged, ion-conductive or -conducting groups, for example alkylene oxide groups and/or cyclic and/or acyclic carbonate groups and/or cyclic and/or acyclic carboxylic acid ester groups, for example lactone groups and/or cyclic and/or acyclic carbamate groups, in particular alkylene oxide groups such as oligoalkylene oxide groups and/or polyethers, since ion dissociation can be increased thanks to the respectively negatively or positively charged group Q⁻ or Q⁺ and ion mobility can be further increased as a result of the uncharged group Q, which can result altogether in a considerable increase in ion conductivity, for example lithium ion conductivity.

In the context of a further embodiment the spacer X encompasses at least one, in particular substituted or unsubstituted, saturated or unsaturated, linear or branched, alkylene group and/or at least one, in particular substituted or unsubstituted, saturated or unsaturated, linear or branched, alkylene oxide group and/or at least one, in particular substituted or unsubstituted, phenylene oxide group, for example oligophenylene oxide group, in particular having ≥1 or ≥2 to ≤10 repeating units, and/or at least one, in particular substituted or unsubstituted, phenylene group, for example oligophenylene group, in particular having ≥1 or ≥2 to ≤10 repeating units, and/or at least one, in particular substituted or unsubstituted, benzylene group, for example oligobenzylene group, in particular having ≥1 or ≥2 to ≤10 repeating units, and/or at least one carbonyl group, in particular ketone group, for instance alkylcarbonyl group, and/or at least one cyclic carbonate group and/or at least one lactone group and/or at least one cyclic carbamate group and/or at least one acyclic carbonate group and/or at least one acyclic carboxylic acid ester group and/or at least one acyclic carbamate group and/or at least one ether oxygen and/or at least one positively charged group, for example at least one, in particular quaternary, ammonium group and/or at least one pyridinium group and/or at least one imidazolium group and/or at least one piperidinium group and/or at least one pyrrolidinium group and/or at least one, in particular quaternary, phosphonium group and/or at least one guanidinium group and/or at least one morpholinium group and/or at least one uronium group and/or at least one thiouronium group, and/or at least one negatively charged group, for example at least one sulfonate group and/or trifluoromethanesulfonylimide group, for instance at least one lithium sulfonate group and/or lithium trifluoromethanesulfonylimide group, in particular lithium benzenesulfonate group and/or lithium trifluoromethanesulfonylimide benzene group, The spacer X can also have a combination of these groups. A spacer X of this kind can advantageously allow the ion conductivity of the polymer or polymer electrolyte to be respectively increased overall, for example such that by way of the polymer backbone [ . . . ]¹ can be optimized in terms of other properties. Thanks to the introduction into the spacer X of at least one (where applicable, additional) cyclic carbonate group and/or lactone group and/or cyclic carbamate group and/or acyclic carbonate group and/or acyclic carboxylic acid ester group and/or acyclic carbamate group and/or positively charged group, in particular based on a cation of an ionic liquid, for example of an, in particular quaternary, ammonium group, and/or of a pyridinium group and/or of an imidazolium group and/or of a piperidinium group and/or of a pyrrolidinium group and/or of an, in particular quaternary, phosphonium group and/or of a guanidinium group and/or of a morpholinium group and/or of a uronium group and/or of a thiouronium group, and/or of a negatively charged group, for example a sulfonylimide group and/or sulfonate group, the ion conductivity, in particular as explained in conjunction with the corresponding groups Q, Q⁺, and Q⁻, can advantageously be further increased.

¹ [Translator's note: The original German sentence is garbled at this point (word(s) missing).]

In the context of an implementation of this embodiment the spacer X encompasses at least one, in particular substituted or unsubstituted, saturated or unsaturated, linear or branched, alkylene oxide group, in particular oligoalkylene oxide group. The spacer X can, for example, encompass at least one, for example substituted or unsubstituted, saturated or unsaturated, linear or branched, ethylene oxide group and/or propylene oxide group, in particular oligoethylene oxide group and/or oligopropylene oxide group. In particular, the spacer X can encompass at least one, for example substituted or unsubstituted, saturated or unsaturated, linear or branched, ethylene oxide group, in particular oligoethylene oxide group. The ion mobility can thereby advantageously be increased. This can be particularly advantageous in the case of a positively charged group Q⁺ and/or in the case of a negatively charged group Q⁻, in particular in order to mobilize dissociated ions and thereby increase the ion conductivity.

The at least one alkylene oxide group of the spacer X can in particular be partly or completely halogenated, in particular fluorinated, for example perfluorinated. As a result of halogenation, in particular fluorination, for example perfluorination, the solubility of polysulfides respectively by the polymer or the polymer electrolyte, in particular by alkylene oxide groups, can advantageously be decreased, which can be particularly advantageous in the context of utilization in combination with a sulfur/carbon composite, for example sulfur/polymer and/or sulfur/carbon allotrope composite, in particular sulfur/polymer composite having sulfur bound, for example covalently and/or ionically, in particular covalently, to the polymer of the composite, for example a sulfur/polyacrylonitrile composite, for instance a SPAN composite, as a cathode material.

In the context of a further, alternative or additional implementation of this embodiment the spacer X encompasses at least one carbonyl group, in particular at least one cyclic carbonate group and/or at least one lactone group and/or at least one cyclic carbamate group and/or at least one acyclic carbonate group and/or at least one acyclic carboxylic acid ester group and/or at least one acyclic carbamate group. In particular, the spacer X can in this context encompass at least one acyclic carbonate group. The ion mobility can thereby likewise advantageously be increased. This can be particularly advantageous in the case of a positively charged group Q⁺ and/or in the case of a negatively charged group Q⁻, in particular in order to mobilize dissociated ions and thereby increase the ion conductivity.

In the context of a further, alternative or additional implementation of this embodiment the spacer X encompasses at least one, where applicable further, positively charged group Q⁺, in particular based on a cation of an ionic liquid, for example at least one ammonium group and/or at least one pyridinium group and/or at least one imidazolium group and/or at least one piperidinium group and/or at least one pyrrolidinium group and/or at least one phosphonium group and/or at least one guanidinium group and/or at least one morpholinium group and/or at least one uronium group and/or at least one thiouronium group. The spacer X can encompass, for example, at least one ammonium group and/or at least one pyridinium group and/or at least one imidazolium group, for instance at least one ammonium group and/or at least one pyridinium group, and a counter ion $Z^-$, for example conducting salt anion, in particular lithium conducting salt anion. The at least one, where applicable further, positively charged group $Q^+$ of the spacer can be embodied in particular as explained above, in particular in the context of the positively charged groups $Q^+$ attached via the spacer X. Ion dissociation can thereby advantageously be increased. This can be particularly advantageous in the case of a positively charged group $Q^+$ and/or in the case of an uncharged group Q, in particular in order to further increase ion conductivity and further reduce polysulfide solubility.

In the context of a further, alternative or additional implementation of this embodiment the spacer X encompasses at least one, where applicable further, negatively charged group Q and a counter ion $Z^+$, for example an alkali ion, for example lithium ion and/or sodium ion, in particular a lithium ion. The at least one, where applicable further, negatively charged group $Q^-$ of the spacer can be embodied in particular as explained above, in particular in the context of the negatively charged groups $Q^-$ attached via the spacer X. For instance, the at least one, where applicable further, negatively charged group $Q^-$ of the spacer X can be a group based on a conducting salt anion, in particular on a lithium conducting salt anion, and/or on an anion of an ionic liquid, and/or a sulfonate group. For example, the spacer X can encompass at least one sulfonylimide group, for instance at least one trifluoromethanesulfonylimide group and/or perfluoroethanesulfonylimide group and/or fluorosulfonylimide group, in particular at least one trifluoromethanesulfonylimide group, and/or at least one sulfonate group. Ion dissociation can thereby advantageously be increased. This can be particularly advantageous in the case of a negatively charged group $Q^2$ and/or in the case of an uncharged group Q, in particular in order to further increase ion conductivity and further reduce polysulfide solubility.

[2] [Translator's note: Superscripts illegible in original German text.]

The at least one alkylene group of the spacer X can have, for example, a chain length from $\geq 1$ to $\leq 16$ carbon atoms, in particular from $\geq 1$ to $\leq 13$ carbon atoms, for instance from $\geq 1$ to $\leq 4$ carbon atoms or from $\geq 4$ to $\leq 8$ carbon atoms and/or from $\geq 9$ to $\leq 13$ carbon atoms. For instance, the alkylene group of the spacer X can denote in this context a saturated alkylene group, for example of the general chemical formula: $-(CH_2)_{a1}-$, where $1 \leq a1 \leq 15$, for example $1 \leq a1 \leq 12$, for instance $1 \leq a1 \leq 3$.

The at least one alkylene oxide group of the spacer X can be, for instance, an ethylene oxide group and/or a propylene oxide group. In particular, the at least one alkylene oxide group can be an oligoalkylene oxide group, for instance an oligoethylene oxide group and/or oligopropylene oxide group. In particular, the alkylene oxide group or oligoalkylene oxide group can respectively have $\geq 1$ or $\geq 2$ to $\leq 10$ repeating units, for example respectively $\geq 1$ or $\geq 2$ to $\leq 4$ repeating units. For instance, the at least one alkylene oxide unit can have the general chemical formula: $-[CH_2-CH_2-O-]_b$, where $1 \leq b \leq 10$, for example $1 \leq$ or $2 \leq b \leq 4$.

Attachment of the at least one alkylene oxide group of the spacer X to the polymer backbone -[A]- and to the group Q, for instance the pyridinium group, ammonium group, imidazolium group, piperidinium group, pyrrolidinium group, phosphonium group, guanidinium group, morpholinium group, uronium group, thiouronium group, cyclic carbonate group, lactone group, cyclic carbamate group, acyclic carbonate group, acyclic carboxylic acid ester group, acyclic carbamate group, sulfonylimide group, or sulfonate group, can be respectively accomplished via an, in particular saturated and/or unsaturated, linear or branched, alkylene group, for instance methylene groups, and/or alkoxy group. The spacer X can be, for example, an alkyl/alkylene oxide/alkyl group, for instance an alkyl/oligoalkylene oxide/alkyl group, for example of the general chemical formula: $-(CH_2)_{a1}-[CH_2-CH_2-O-]_{b1}-(CH_2)_{a1'}-$, where $1 \leq a1 \leq 12$, in particular $1 \leq a1 \leq 3$, $1 \leq b1 \leq 10$, in particular $1 \leq$ or $2 \leq b1 \leq 4$, and $1 \leq a1' \leq 12$, in particular $1 \leq a1' \leq 3$, or an alkoxy/alkylene oxide/alkyl group, for instance alkoxy/oligoalkylene oxide/alkyl group, for example of the general chemical formula: $-(CH_2)_{a2}-O-[CH_2-CH_2-O-]_{b2}-(CH_2)_{a2'}-$ where $1 \leq a2 \leq 12$, in particular $1 \leq a2 \leq 3$, $1 \leq b2 \leq 10$, in particular $1 \leq$ or $2 \leq b2 \leq 4$, and $1 \leq a2' \leq 12$, in particular $1 \leq a2' \leq 3$.

The at least one phenylene oxide group and/or the at least one phenylene group and/or the at least one benzylene group of the spacer X can be substituted in particular with one or more alkyl side chain(s) and/or one or more alkylene oxide side chain(s), for example oligoalkylene oxide side chains(s), for instance oligoethylene oxide side chains and/or oligopropylene oxide side chain(s), and/or one or more cyclic carbonate group(s) and/or lactone group(s) and/or cyclic carbamate group(s) and/or acyclic carbonate group(s) and/or acyclic carboxylic acid ester group(s) and/or acyclic carbamate group(s) and/or one or more charged groups, for example quaternary ammonium group(s) and/or pyridinium group(s) and/or imidazolium group(s) and/or piperidinium group)s) and/or pyrrolidinium group(s) and/or, in particular quaternary, phosphonium group(s) and/or guanidinium group(s) and/or morpholinium group(s) and/or uronium group(s) and/or thiouronium group(s) and/or sulfonylimide group(s) and/or sulfonate group(s), for example lithium sulfonate groups. Ion conductivity can thereby advantageously be further increased, in particular as explained in conjunction with the corresponding groups Q, $Q^+$ and $Q^-$. For example, the spacer X can encompass one or more phenylene oxide group(s) and/or phenylene group(s) and/or benzylene group(s). An, in particular saturated and/or unsaturated, linear or branched, for example partly or completely halogenated or unhalogenated, for instance partly fluorinated or perfluorinated or unfluorinated, alkylene group and/or alkylene oxide group, for example oligoalkylene oxide group, for instance oligoethylene oxide group and/or oligopropylene oxide group, can be (respectively) inserted between phenylene oxide groups and/or phenylene groups and/or benzylene groups of the spacer X.

Attachment of the at least one carbonyl group of the spacer X to the polymer backbone -[A]- and to the group Q, for instance the cyclic carbonate group, lactone group, cyclic carbamate group, acyclic carbonate group, acyclic carboxylic acid ester group, acyclic carbamate group, pyridinium group, ammonium group, imidazolium group, piperidinium group, pyrrolidinium group, phosphonium group, guanidinium group, morpholinium group, uronium group, thiouronium group, sulfonylimide group, or sulfonate group, can be respectively accomplished via an, in particular saturated and/or unsaturated, linear or branched, for example partly or completely halogenated or unhalogenated, for instance partly fluorinated or perfluorinated or unfluorinated, alkylene group and/or alkylene oxide group, for example oligoalkylene oxide group, for instance oligoethylene oxide group and/or oligopropylene oxide group.

For example, the spacer X can encompass one or more cyclic carbonate group(s) and/or lactone group(s) and/or cyclic carbamate group(s) and/or acyclic carbonate group(s) and/or acyclic carboxylic acid ester group(s) and/or acyclic carbamate group(s) (for example, analogous to Q) and/or ammonium group(s) and/or pyridinium groups(s) and/or imidazolium group(s) and/or piperidinium group)s) and/or pyrrolidinium group(s) and/or phosphonium group(s) and/or guanidinium group(s) and/or morpholinium group(s) and/or uronium group(s) and/or thiouronium group(s) (for example, analogous to $Q^+$) and/or sulfonylimide group(s) and/or sulfonate group(s), for instance benzenesulfonylimide group(s) and/or benzenesulfonate group(s) (for example, analogous to $Q^-$). Attachment of the cyclic carbonate group, lactone group, cyclic carbamate group, acyclic carbonate group, acyclic carboxylic acid ester group, acyclic carbamate group, ammonium group, pyridinium group, imidazolium group, piperidinium group, pyrrolidinium group, phosphonium group, guanidinium group, morpholinium group, uronium group, thiouronium group, sulfonylimide group, or sulfonate group, for example benzenesulfonylimide group and/or benzenesulfonate group, of the spacer X to the polymer backbone -[A]- and/or to a further cyclic carbonate group, lactone group, cyclic carbamate group, acyclic carbonate group, acyclic carboxylic acid ester group, acyclic carbamate group, ammonium group, pyridinium group, imidazolium group, piperidinium group, pyrrolidinium group, phosphonium group, guanidinium group, morpholinium group, uronium group, thiouronium group, sulfonylimide group, or sulfonate group of the spacer X, and/or between a cyclic carbonate group, lactone group, cyclic carbamate group, acyclic carbonate group, acyclic carboxylic acid ester group, acyclic carbamate group, ammonium group, pyridinium group, imidazolium group, piperidinium group, pyrrolidinium group, phosphonium group, guanidinium group, morpholinium group, uronium group, thiouronium group, sulfonylimide group, or sulfonate group, for example benzenesulfonylimide group and/or benzenesulfonate group, of the spacer X and/or to the, for example, terminal, group Q, for instance the cyclic carbonate group, lactone group, cyclic carbamate group, acyclic carbonate group, acyclic carboxylic acid ester group, acyclic carbamate group, ammonium group, pyridinium group, imidazolium group, piperidinium group, pyrrolidinium group, phosphonium group, guanidinium group, morpholinium group, uronium group, thiouronium group, sulfonylimide group, or sulfonate group, can be accomplished in particular (respectively) via an, in particular saturated and/or unsaturated, linear or branched, for example partly or completely halogenated or unhalogenated, for instance partly fluorinated or perfluorinated or unfluorinated, alkylene group and/or alkylene oxide group, for example oligoalkylene oxide group, for instance oligoethylene oxide group and/or oligopropylene oxide group.

For instance, the spacer X can be an, in particular saturated and/or unsaturated, linear or branched, alkylene spacer. In the case of an alkylene spacer X, in particular in the saturated case, the number of carbon atoms in the spacer can be in particular $\geq 1$ to $\leq 12$, for instance from $\geq 1$ to $\leq 4$. For example, the alkylene spacer can be based on the general chemical formula $-(CH_2)_{a1}-$, where $1 \leq a1 \leq 12$, in particular $1 \leq a1 \leq 3$.

Or the spacer X can be, for instance, an alkylene oxide spacer, for example oligoalkylene oxide spacer, for instance an oligoethylene oxide spacer or oligopropylene oxide spacer. In the case of an embodiment as an oligoalkylene oxide spacer the number of repeating units can be, for example, $\geq 2$ to $\leq 10$ repeating units, in particular $\geq 2$ to $\leq 4$. Attachment of the alkylene oxide unit, for example oligoalkylene oxide unit, for instance of the oligoethylene oxide unit or oligopropylene oxide, respectively to the polymer backbone -[A]- and/or to the group Q, for instance to the cyclic carbonate group, lactone group, cyclic carbamate group, acyclic carbonate group, acyclic carboxylic acid ester group, acyclic carbamate group, pyridinium group, ammonium group, imidazolium group, piperidinium group, pyrrolidinium group, phosphonium group, guanidinium group, morpholinium group, uronium group, thiouronium group, sulfonylimide group, or sulfonate group, can be accomplished in particular respectively via an, in particular saturated and/or unsaturated, linear or branched, alkylene group, for instance methylene groups. For example, the alkylene oxide spacer can be based on the general chemical formula: $-(CH_2)_{a3}-[CH_2-CH_2-O]_{b3}-(CH_2)_{a3}$, where $1 \leq b3 \leq 10$, in particular $1 \leq b3 \leq 4$, and 1 or $0 \leq a3 \leq 3$, for example $a3=1$.

Or the spacer X can be, for instance, a spacer based on, in particular substituted or unsubstituted, phenylene oxide and/or phenylene and/or benzylene. In particular, the spacer can encompass multiple phenylene oxide units and/or phenylene units and/or benzylene units. An, in particular saturated and/or unsaturated, linear or branched, for example partly or completely halogenated or unhalogenated, for instance partly fluorinated or perfluorinated or unfluorinated, alkylene group and/or alkylene oxide group, for example oligoalkylene oxide group, for instance oligoethylene oxide group and/or oligopropylene oxide group, can be (respectively) inserted between phenylene oxide units and/or oligophenylene oxide units and/or phenylene units and/or oligophenylene units and/or benzylene units and/or oligobenzylene units of the spacer X. A substitution can be accomplished in this context in particular with one or more alkyl side chain(s) and/or one or more alkylene oxide side chain(s), for example oligoalkylene oxide side chain(s), for example oligoethylene oxide side chains(s) and/or oligopropylene oxide side chain(s), and/or one or more cyclic carbonate group(s) and/or lactone group(s) and/or cyclic carbamate group(s) and/or acyclic carbonate group(s) and/or acyclic carboxylic acid ester group(s) and/or acyclic carbamate group(s) and/or one or more charged groups, for example quaternary ammonium group(s) and/or pyridinium groups(s) and/or imidazolium group(s) and/or piperidinium group)s) and/or pyrrolidinium group(s) and/or, for example quaternary, phosphonium group(s) and/or guanidinium group(s) and/or morpholinium group(s) and/or uronium group(s) and/or thiouronium group(s) and/or sulfonylimide group(s) and/or sulfonate group(s), for example lithium sulfonylimide group(s) and/or lithium sulfonate groups.

Or the spacer X can be, for instance, a carbonyl spacer, for example an (alkylene/alkylene oxide)/carbonyl/(alkylene/alkylene oxide) spacer.

Or the spacer can be, for example, an ether oxygen (—O—).

In the context of a special embodiment the spacer X is an alkylene spacer and/or alkylene oxide spacer, for example an alkylene spacer and/or oligoalkylene oxide spacer, for instance an ethylene oxide spacer and/or oligoethylene oxide spacer.

In the context of a further embodiment -[A]- denotes a polymer-backbone-forming unit that encompasses (at least) one alkylene oxide unit, in particular ethylene oxide unit (PEO) and/or propylene oxide unit, for example oligoalkylene oxide unit, for instance oligoethylene oxide unit and/or oligopropylene oxide unit, and/or a unit encompassing a carbonate group, in particular an organic carbonate group, and/or a siloxane unit and/or a phosphazene unit and/or a methyl methacrylate unit and/or a methacrylate unit and/or a phenylene unit and/or a phenylene oxide unit and/or a benzylene unit and/or an alkylene unit.

For example, -[A]- can denote a polymer-backbone-forming unit that encompasses and/or forms a polyether, in particular polyethylene oxide (PEO) and/or polypropylene oxide, and/or repeating units encompassing polymerized, in particular organic, carbonate group(s), for example a polycarbonate and/or a polymer made up of polymer-backbone-forming structural units having side groups containing carbonate groups, and/or a polysiloxane and/or a polyphosphazene and/or a poly(methyl)methacrylate and/or a polymethacrylate and/or a polyphenylene, for example a para-polyphenylene, and/or a polyphenylene oxide and/or a polybenzylene and/or a polyolefin, for example polypropylene and/or polyethylene. For instance, -[A]- can denote a polymer-backbone-forming unit that is based on a polyether, in particular polyethylene oxide (PEO) and/or polypropylene oxide, and/or on a repeating unit encompassing polymerized, in particular organic, carbonate group(s) and/or on a polysiloxane and/or on a polyphosphazene and/or on a poly(methyl)methacrylate and/or on a polymethacrylate and/or on a polyphenylene, for example a para-polyphenylene, and/or on a polyphenylene oxide and/or on a polybenzylene and/or on a polyolefin, for example polypropylene and/or polyethylene.

In the context of a special embodiment the polymer-backbone-forming unit -[A]- encompasses (at least) one siloxane. A low glass transition temperature for the polymer, and thus high ion conductivity, can thereby advantageously be obtained.

In the context of a further, in particular alternative or additional, special embodiment the polymer-backbone-forming unit -[A]- encompasses (at least) one phosphazene unit. A low glass transition temperature for the polymer, and thus high ion conductivity, can once again thereby advantageously be obtained.

In the context of a further, in particular alternative or additional, special embodiment the polymer-backbone-forming unit -[A]- encompasses (at least) one methyl methacrylate unit and/or methacrylate unit. These can advantageously be more easily accessible in terms of synthesis than phosphazene.

In the context of a further, in particular alternative or additional, special embodiment the polymer-backbone-forming unit -[A]- encompasses (at least) one phenylene unit. In particular, the polymer-backbone-forming unit -[A]- can encompass (at least) one para-phenylene unit. Advantageously, electrical conductivity can thereby additionally be achieved. In addition, phenylene units or polyphenylenes can easily be respectively singly or multiply substituted, for example sulfonated. In particular, multiple sulfonations of the phenylene unit, and/or of the polyphenyl polymer backbone constituted thereby, are also possible. For example, the polymer-backbone-forming unit -[A]- can encompass (at least) one phenylene oxide unit. Advantageously, groups Q, $Q^+$, and/or $Q^-$ can easily be attached via the oxygen, where applicable via a spacer X. For example, the polymer-backbone-forming unit -[A]- can encompass or be an at least singly sulfonated, for example multiply sulfonated, phenylene unit. For instance, the polymer or the polyelectrolyte can respectively encompass a polyphenylene substituted with sulfonate groups, in particular lithium sulfonate groups, for example para-polyphenylene, for example which encompasses at least one phenylene repeating unit that is at least singly substituted with a sulfonate group, in particular lithium sulfonate group, for example substituted with multiple sulfonate groups, in particular lithium sulfonate groups. This has proven to be advantageous because the number of anionic units and thus lithium ion charge carriers per phenylene unit can thereby be increased. In addition to the phenylene unit substituted with sulfonate groups, the polymer-backbone-forming unit -[A]-, for example in the form of a polyphenylene, can also encompass one or more other phenylene units, for example an unsubstituted phenylene unit and/or a phenylene unit singly or multiply substituted respectively with a group Q, for example respectively $Q^+$ or $Q^-$ or Q, and with a spacer X, in particular $X_x$.

In the context of a further, in particular alternative or additional, special embodiment the polymer-backbone-forming unit -[A]- encompasses (at least) one benzylene unit.

In the context of a further, in particular alternative or additional, special embodiment the polymer-backbone-forming unit -[A]- encompasses (at least) one alkylene unit.

In the context of a further, in particular alternative or additional, special embodiment the polymer-backbone-forming unit -[A]- encompasses (at least) one alkylene oxide unit, in particular ethylene oxide unit (PEO) and/or propylene oxide unit, for example oligoalkylene oxide unit, for instance oligoethylene oxide unit and/or oligopropylene oxide unit, in particular oligoethylene oxide unit. Ion mobility and thus ion conductivity can thereby advantageously be increased.

In the context of a further, in particular alternative or additional, special embodiment the polymer-backbone-forming unit -[A]- encompasses (at least) one unit encompassing a carbonate group, in particular an organic carbonate group. The polarity of the polymer backbone can thereby advantageously be increased, and the polysulfide solubility can thus be positively influenced, in particular reduced. Repeating units encompassing polymerized, in particular organic, carbonate groups can form, for example, a polycarbonate, i.e. a polyester whose polymer backbone encompasses, in particular esterified, carbonate groups linked for example by way of a condensation reaction. Alternatively or in addition thereto, however, repeating units encompassing polymerized, in particular organic, carbonate groups can also form a polymer made up of polymer-backbone-forming structural units having side groups containing, in particular organic, carbonate groups. The side groups containing carbonate groups advantageously allow the ion conductivity of the polymer as a whole to be increased. The polymer backbone that is formed can itself encompass carbonate groups, for example can be a polycarbonate, or can also be free of carbonate groups, in particular cannot be a polycarbonate. For example, the polymer-backbone-forming unit -[A]- can encompass a unit having a polymer-backbone-forming structural unit and having a side group containing a carbonate group. The side group containing the carbonate group can, for instance, be attached to an atom of the polymer-backbone-forming structural unit. The side group containing the carbonate group can also, however, for example, be attached cyclically, for example in the form of a five-membered ring or six-membered ring or seven-membered ring, in particular a five-membered ring, to the polymer-backbone-forming structural unit, in particular to two atoms of the polymer-backbone-forming structural unit. In particular, a carbonate group can form in this context a side group attached cyclically to the polymer-backbone-forming structural unit. For example, the polymer-backbone-forming unit -[A]- can encompass a unit having a polymer-backbone-forming structural unit and having a carbonate group, the carbonate group forming a side group attached cyclically to the polymer-backbone-forming structural unit. For instance, the carbonate group can in this context be attached via two oxygen atoms to two atoms of the polymer-backbone-forming structural unit and, for example, can form (together with atoms of the polymer-backbone-forming structural unit) a five-membered ring or six-membered ring or seven-membered ring, in particular a five-membered ring.

The polymer-backbone-forming unit -[A]- can be both monofunctionalized and polyfunctionalized, for example bifunctionalized, trifunctionalized, or tetrafunctionalized, with the group Q attached via the spacer X. A "polymer-backbone-forming unit -[A]-" can be understood in this context in particular as a polymer-backbone-forming unit -[A]- that is functionalized with at least two groups Q, for example Q and/or Q and/or Q, such that in particular a group Q, for example respectively $Q^+$ or $Q^-$ or Q, is respectively attached, where applicable via a spacer X, in particular $X_x$, to the polymer-backbone-forming unit -[A]-.

Some general chemical formulas on which the polymer-backbone-forming unit -[A]- or the repeating unit ([A]-X-Q):

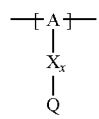

(and, for example, also the polymer-backbone-forming units respectively -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]- explained later, and special repeating units) can be based will be presented by way of example below. In the case where a polymer-backbone-forming unit -[A]- is depicted, xq can (respectively) denote an attachment site at which the or (respectively) a group Q is attached, for example via a spacer X, in particular $X_x$ (in the case where x=0, indirectly via the spacer, or in the case where x=0, directly) to the polymer-backbone-forming unit -[A]-. In the case where a repeating unit ([A]-X-Q) is depicted, xq can denote XQ, i.e. the or (respectively) a spacer X, in particular $X_x$, and the or (respectively) a group Q, for example respectively $Q^+$ or $Q^-$ or Q.

For instance, the polymer-backbone-forming unit -[A]- or the repeating unit ([A]-X-Q) can respectively encompass or be an alkylene oxide unit, for example ethylene oxide unit, of the general chemical formula:

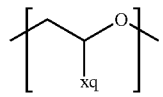

and/or a propylene oxide repeating unit of the general chemical formula:

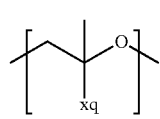 and/or 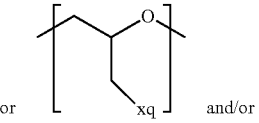 and/or

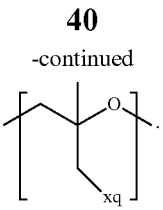

Alternatively or in addition thereto, the polymer-backbone-forming unit -[A]- or the repeating unit ([A]-X-Q) can respectively encompass or be a repeating unit having a polymer-backbone-forming structural unit and having a carbonate group, cyclically attached to the polymer-backbone-forming structural unit, of the general chemical formula:

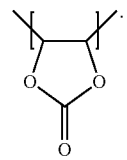

Alternatively or in addition thereto, the polymer-backbone-forming unit -[A]- or the repeating unit ([A]-X-Q) can respectively encompass or be a siloxane unit of the general chemical formula:

and/or

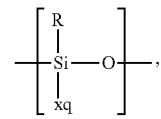

in particular where R denotes an alkyl group, for example a methyl, ethyl, and/or propyl group, for example a methyl group. For instance, the polymer-backbone-forming unit -[A]- or the repeating unit ([A]-X-Q) can respectively encompass or be a siloxane unit of the general chemical formula:

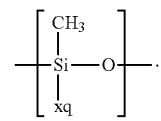

Alternatively or in addition thereto, the polymer-backbone-forming unit -[A]- or the repeating unit ([A]-X-Q) can respectively encompass or be a phosphazene unit of the general chemical formula:

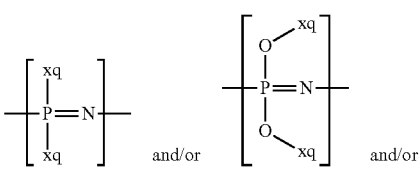 and/or

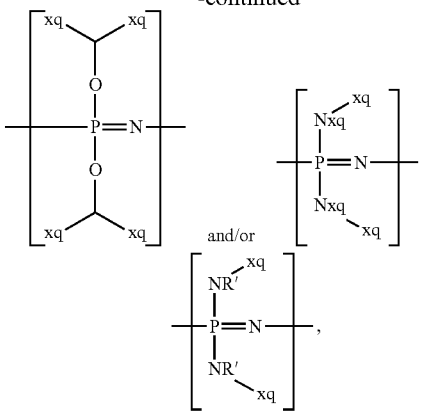

in particular where R' denotes hydrogen or (which may be) an alkyl group, for example a methyl, ethyl, and/or propyl group, for instance a methyl group.

Alternatively or in addition thereto, the polymer-backbone-forming unit -[A]- or the repeating unit ([A]-X-Q) can respectively encompass or be a methyl methacrylate unit of the general chemical formula:

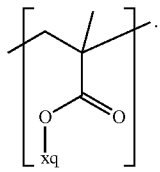

Alternatively or in addition thereto, the polymer-backbone-forming unit -[A]- or the repeating unit ([A]-X-Q) can respectively encompass or be a methacrylate unit of the general chemical formula:

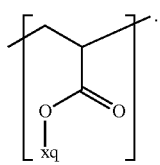

Alternatively or in addition thereto, the polymer-backbone-forming unit -[A]- or the repeating unit ([A]-X-Q) can respectively encompass or be a phenylene unit of the general chemical formula:

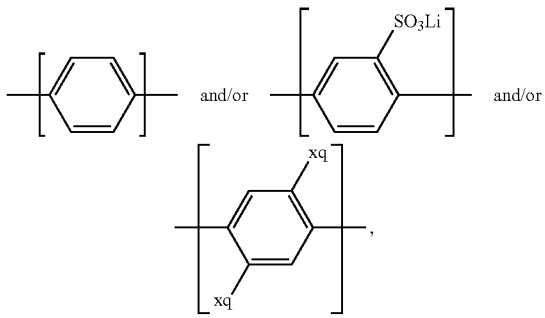

for example

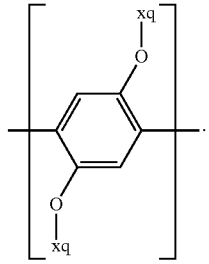

Alternatively or in addition thereto, the polymer-backbone-forming unit -[A]- or the repeating unit ([A]-X-Q) can respectively encompass or be a ethylene unit of the general chemical formula:

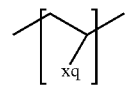

and/or a propylene unit of the general chemical formula:

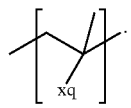

For example, the polymer-backbone-forming unit -[A]- can encompass (at least) one unit having a polymer-backbone-forming structural unit and having a side group containing a carbonate group. The ion conductivity of the polymer as a whole can thereby advantageously be increased. The side group containing the carbonate group can be attached in this context, for instance, to an atom of the polymer-backbone-forming structural unit. For instance, the polymer-backbone-forming unit -[A]- can be (at least) one unit having a polymer-backbone-forming structural unit and a carbonate group, which forms a side group cyclically attached to the polymer-backbone-forming structural unit. For example, the carbonate group can be attached via two oxygen atoms to two atoms of the polymer-backbone-forming structural unit and can form, for example (together with the polymer-backbone-forming structural unit), a five-membered ring or six-membered ring or seven-membered ring, in particular a five-membered ring.

In the context of a special embodiment the polymer-backbone-forming unit -[A]- encompasses (at least) one siloxane unit and/or one phosphazene unit and/or one methyl methacrylate unit and/or one methacrylate unit and/or one phenylene unit, in particular a para-phenylene unit. In particular, the polymer-backbone-forming unit -[A]- can encompass (at least) one siloxane unit and/or one phosphazene unit and/or one methyl methacrylate unit and/or one methacrylate unit. In the context of a special implementation the polymer-backbone-forming unit -[A]-encompasses (at least) one methyl methacrylate unit and/or one methacrylate unit and/or one siloxane unit. Phosphazene and/or siloxane can advantageously allow a low glass transition temperature of the polymer, and thus high ion conductivity, to be achieved. Methyl methacrylate and/or methacrylate can advantageously make possible a simplification of synthesis. Phenylene units can advantageously additionally allow electrical conductivity to be achieved. In addition, phenylene units or polyphenylenes can easily be respectively singly or multiply substituted, for example sulfonated.

In the context of a further embodiment the polymer-backbone-forming unit -[A]- encompasses (at least) one polyfunctionalized, for example bifunctionalized, siloxane unit and/or one polyfunctionalized, for example bifunctionalized or tetrafunctionalized, or polyfunctionalized, for example tetrafunctionalized by branching in one or more side chains, phosphazene unit and/or polyfunctionalized, for example bifunctionalized, methyl methacrylate unit and/or polyfunctionalized, for example bifunctionalized, methacrylate unit and/or polyfunctionalized, for example bifunctionalized, phenylene unit. In the context of a special implementation of this embodiment the polymer-backbone-forming unit -[A]-encompasses (at least) one polyfunctionalized, for example bifunctionalized, siloxane unit and/or one polyfunctionalized, for example bifunctionalized or tetrafunctionalized, for instance polyfunctionalized, for example tetrafunctionalized by branching in one or more side chains, phosphazene unit. In the context of a very special implementation of this embodiment the polymer-backbone-forming unit -[A]- encompasses (at least) one polyfunctionalized, for example bifunctionalized, siloxane unit. The polymer can thereby advantageously be equipped in simple fashion with several groups Q.

In the context of a further embodiment the polymer-backbone-forming unit -[A]- or the polymer-backbone-forming units -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]- explained later, and/or the spacer X or the spacers ($X_I$), ($X_{II}$), ($X_{III}$), ($X_{IV}$), ($X_V$), ($X_{VI}$), ($X_{VII}$), ($X_{VIII}$), ($X_{IX}$), ($X_a$), ($X_b$), ($X_c$), ($X_d$), ($X_e$), ($X_f$), ($X_Z$), or ($X_{Z1}$) explained later, and/or the group Q, for example $Q^+$ and/or $Q^-$ and/or Q, is respectively, in particular partly or completely, halogenated, for example fluorinated, where applicable perfluorinated. In particular, (at least) alkylene oxide groups and/or alkylene groups and/or alkyl groups and/or alkoxy groups can be halogenated, in particular fluorinated, where applicable perfluorinated. Fluorination, in particular of alkylene oxide groups such as ethylene oxide groups and/or propylene oxide groups, and/or of polyethers and/or of alkyl groups and/or alkylene groups and/or of alkoxy groups, can advantageously allow the solubility of polysulfides by the polymer to be decreased. It is thus possible in turn, advantageously, to respectively decrease or avoid dissolution of polysulfides out of the cathode active material, for example out of a sulfur/carbon composite, for instance a sulfur/polymer composite, in particular a sulfur/polyacrylonitrile composite, such as SPAN, and thus a loss of active material, and in that manner to improve the performance, cycle robustness, and service life respectively of a lithium/sulfur cell equipped therewith or of an energy system, for example a lithium/sulfur cell, equipped therewith. Fluorination can furthermore have a positive influence on transference number and can, in particular, increase the transference number.

In the context of a further embodiment the spacer X or the spacers ($X_I$), ($X_{II}$), ($X_{III}$), ($X_{IV}$), ($X_V$), ($X_{VI}$), ($X_{VII}$), ($X_{VIII}$), ($X_{IX}$), ($X_a$), ($X_b$), ($X_c$), ($X_d$), ($X_e$), ($X_f$), ($X_Z$), or ($X_{Z1}$) explained later, and/or the polymer-backbone-forming unit -[A]- or the polymer-backbone-forming units -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]- explained later, and or the group Q or $Q^+$ or $Q^-$, or the groups having R10 to R213 to be explained in further detail later, therefore respectively encompasses a fluorinated, in particular perfluorinated, alkylene oxide unit, for example ethylene oxide unit and/or propylene oxide unit, in particular ethylene oxide unit, for example oligoalkylene oxide unit, for instance oligoethylene oxide unit and/or oligopropylene oxide unit, in particular oligoethylene oxide unit. Where applicable, the spacer X or the spacers ($X_I$), ($X_{II}$), ($X_{III}$), ($X_{IV}$), ($X_V$), ($X_{VI}$), ($X_{VII}$), ($X_{VIII}$), ($X_{IX}$), ($X_a$), ($X_b$), ($X_c$), ($X_d$), ($X_e$), ($X_f$), ($X_Z$), or ($X_{Z1}$) explained later, and/or the polymer-backbone-forming unit -[A]- or the polymer-backbone-forming units -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]- explained later, and/or the group Q or $Q^+$ or $Q^-$, or the groups having R10 to R213 explained in further detail later, can be free of unfluorinated alkylene oxide units, for example ethylene oxide units and/or propylene oxide units, in particular ethylene oxide units, for example oligoalkylene oxide units, for instance oligoethylene oxide units and/or oligopropylene oxide units, in particular oligoethylene oxide units. A polymer electrolyte that in particular is not based, or is based only in part, on unfluorinated polyethylene oxide, for example that is not based on unfluorinated polyethylene oxide or that is respectively based on fluorinated, in particular perfluorinated, polyethylene oxide, advantageously respectively allows a cathode-side polysulfide solubility that is reduced in comparison with the use of unfluorinated, ether-based liquid electrolytes, such as dimethoxyethane (DME) or dioxolan (DOL), to be achieved. The capacity retention and thus the service life of the cell can thereby advantageously be considerably improved.

In the context of a further, alternative or additional embodiment the spacer X or the spacers ($X_I$), ($X_{II}$), ($X_{III}$), ($X_{IV}$), ($X_V$), ($X_{VI}$), ($X_{VII}$), ($X_{VIII}$), ($X_{IX}$), ($X_a$), ($X_b$), ($X_c$), ($X_d$), ($X_e$), ($X_f$), ($X_Z$), or ($X_{Z1}$) explained later, and/or the polymer-backbone-forming unit -[A]- or the polymer-backbone-forming units -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]-explained later, and/or the group Q or $Q^+$ or $Q^-$ or the groups having R10 to R213 explained in further detail below, is perfluorinated. The solubility of polysulfides by the polymer can thereby advantageously, in particular, be decreased.

In the context of an embodiment the, in particular uncharged, group Q denotes a group, in particular a cyclic carbonate group, of the general chemical formula:

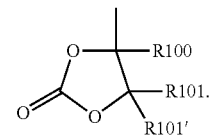

In the context of a further embodiment the, in particular uncharged, group Q denotes a group, in particular a lactone group, of the general chemical formula:

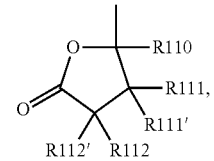

for example

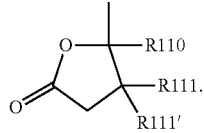

In the context of a further embodiment the, in particular uncharged, group Q denotes a group, in particular a cyclic carbamate group, of the general chemical formula:

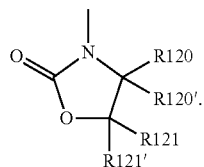

In the context of a further embodiment the, in particular uncharged, group Q denotes a group, in particular an ethylene oxide group, of the general chemical formula:

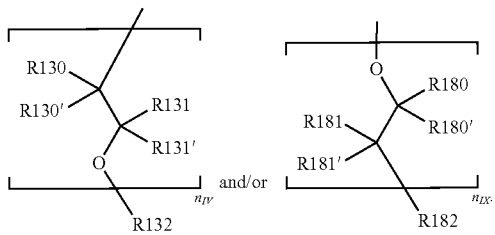

where $n_{IV}$ and $n_{IX}$ respectively denote the number of ethylene oxide units, and in particular are respectively $1 \leq n_{IV} \leq 15$, for example $2 \leq n_{IV} \leq 6$, and $1 \leq n_{IX} \leq 15$, for example $2 \leq n_{IX} \leq 6$.

In the context of a further embodiment the, in particular uncharged, group Q denotes a group, in particular an acyclic carbonate group, of the general chemical formula:

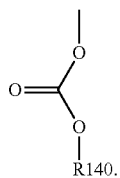

In the context of a further embodiment the, in particular uncharged, group Q denotes a group, in particular an acyclic carboxylic acid ester group, of the general chemical formula:

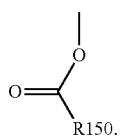

In the context of a further embodiment the, in particular uncharged, group Q denotes a group, in particular an acyclic carbamate group, of the general chemical formula:

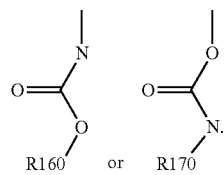

In the context of a further embodiment the, in particular positively charged, group Q⁺ denotes a group, in particular a pyridinium group, of the general chemical formula:

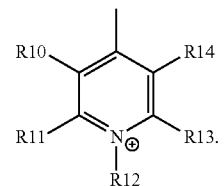

In the context of a further embodiment the, in particular positively charged, group Q⁺ denotes a group, in particular a quaternary ammonium group, of the general chemical formula:

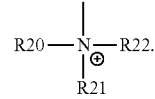

In the context of a further embodiment the, in particular positively charged, group Q⁺ denotes a group, in particular a quaternary ammonium group, of the general chemical formula:

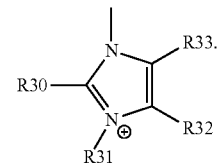

In the context of a further embodiment the, in particular positively charged, group Q⁺ denotes a group, in particular a piperidinium group, of the general chemical formula:

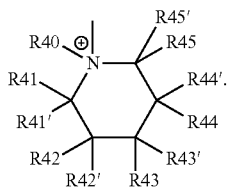

In the context of a further embodiment the, in particular positively charged, group Q⁺ denotes a group, in particular a pyrrolidinium group, of the general chemical formula:

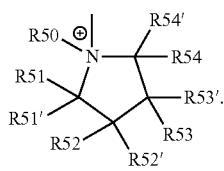

In the context of a further embodiment the, in particular positively charged, group Q⁺ denotes a group, in particular a quaternary phosphonium group, of the general chemical formula:

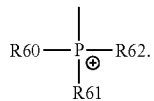

In the context of a further embodiment the, in particular negatively charged, group Q⁻ denotes a group, in particular a para-benzenesulfonylimide group, for example a para-trifluoromethanesulfonylimide benzene group, of the general chemical formula:

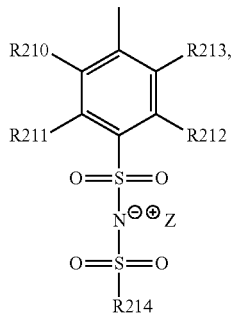

for example

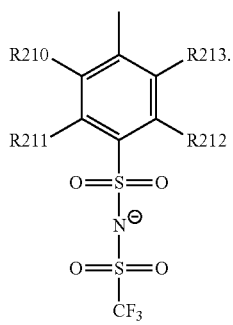

In the context of a further embodiment the, in particular negatively charged, group Q⁻ denotes a group, in particular a para-benzenesulfonate group, of the general chemical formula:

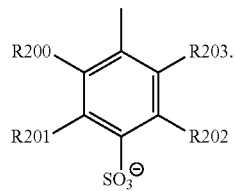

In this context, R10, R11, R12, R13, and/or R14, and R30, R31, R32, and/or R33, and R40, R41, R41', R42, R42', R43, R43', R44, R44', R45, and/or R45', and R50, R51, R51', R52, R52', R53, R53', R54, and/or R54', and R100, R101, and/or R101', and R110, R111, R111', R112, and/or R112', and R120, R120', R121, and/or R121', and R130, R130', R131, R131', and/or R132, and R140, and R150, and R160, and R170, and R180, R180', R181, R181', and/or R182, and R200, R201, R202, and/or R203, and R210, R211, R212, R213, and/or R214 can respectively denote, mutually independently in each case, hydrogen and/or an, in particular substituted or unsubstituted, saturated or unsaturated, linear or branched, alkyl group, in particular having a chain length from ≥1 to ≤16 carbon atoms, and/or an, in particular substituted or unsubstituted, saturated or unsaturated, linear or branched, alkylene oxide group, for example ethylene oxide group or propylene oxide group, in particular oligoalkylene oxide group, for example oligoethylene oxide group or oligopropylene oxide group, in particular having ≥1 or ≥2 to ≤10 repeating units, and/or a halogen atom, in particular fluorine, and/or an, in particular substituted or unsubstituted, saturated or unsaturated, linear or branched, alkoxy group, for example having a carbon chain length from ≥1 to ≤16 carbon atoms, and/or an, in particular substituted or unsubstituted, phenylene oxide group, for example oligophenylene oxide group, in particular having ≥1 or ≥2 to ≤10 repeating units, and/or an, in particular substituted or unsubstituted, phenoxy group, and/or an, in particular substituted or unsubstituted, phenylene group, for example oligophenylene group, in particular having ≥1 or ≥2 to ≤10 repeating units, and/or an, in particular substituted or unsubstituted, phenyl group, and/or an, in particular substituted or unsubstituted, benzylene group, for example oligobenzylene group, in particular having ≥1 or ≥2 to ≤10 repeating units, and/or an, in particular substituted or unsubstituted, benzyl group and/or a carbonyl group, in particular a ketone group, for instance an alkylcarbonyl group, and/or an, in particular cyclic and/or acyclic, carbonate group, and/or an, in particular cyclic and/or acyclic, carboxylic acid ester group, in particular a lactone group, and/or an, in particular cyclic and/or acyclic, carbamate group and/or—in particular respectively in the case of R41, R41', R42, R42', R43, R43', R44, R44', R45, and/or R45', and R51, R51', R52, R52', R53, R53', R54, and/or R54', and R100, R101, and/or R101', and R110, R111, R111', R112, and/or R112', and R120, R120', R121, and/or R121', and R130, R130', R131, R131', and/or R132, and R140, and R150, and R160, and R170, and R180, R180', R181, R181', and/or R182, and R200, R201, R202, and/or R203, and R210, R211, R212, [R]213, and/or R214—a charged group, for example a positively charged group, for instance based on a cation of an ionic liquid, for example a quaternary ammonium group and/or a quaternary phosphonium group, and/or a negatively charged group, for instance based on a conducting salt anion, in particular on a lithium conducting salt anion, and/or on an anion of an ionic liquid, for example a sulfonylimide group, and/or a sulfonate group, for instance a lithium sulfonylimide group and/or lithium sulfonate group.

R20, R21, and/or R22, and R60, R61, and/or R62 can in this context respectively denote, mutually independently in each case, an, in particular substituted or unsubstituted, saturated or unsaturated, linear or branched, alkyl group, in particular having a chain length from ≥1 to ≤16 carbon atoms, and/or an, in particular substituted or unsubstituted, saturated or unsaturated, linear or branched, alkylene oxide group, for example ethylene oxide group or propylene oxide group, in particular oligoalkylene oxide group, for example oligoethylene oxide group or oligopropylene oxide group, in particular having ≥1 or ≥2 to ≤10 repeating units, and/or an, in particular substituted or unsubstituted, saturated or unsaturated, linear or branched, alkoxy group, for example having a carbon chain length from ≥1 to ≤16 carbon atoms, and/or an, in particular substituted or unsubstituted, phenylene oxide group, for example oligophenylene oxide group, in particular having ≥1 or ≥2 to ≤10 repeating unit, and/or an, in particular substituted or unsubstituted, phenoxy group, and/or an, in particular substituted or unsubstituted, phenylene group, for example oligophenylene group, in particular having ≥1 or ≥2 to ≤10 repeating units, and/or an, in particular substituted or unsubstituted, phenyl group, and/or an, in particular substituted or unsubstituted, benzylene group, for example oligobenzylene group, in particular having ≥1 or ≥2 to ≤10 repeating units, and/or an, in particular substituted or unsubstituted, benzyl group and/or a carbonyl group, in particular a ketone group, for instance an alkylcarbonyl group, and/or an, in particular cyclic and/or acyclic, carbonate group, and/or an, in particular cyclic and/or acyclic, carboxylic acid ester group, in particular a lactone group, and/or an, in particular cyclic and/or acyclic, carbamate group.

An "alkyl group" and an "alkylene group" and an "alkylene oxide group" and an "ethylene oxide group" and a "propylene oxide group" and an "oligoalkylene oxide group" and an "oligoethylene oxide group" and an "oligopropylene oxide group" and an "alkoxy group" and a "phenylene oxide group" and an "oligophenylene oxide group" and a "phenoxy group" and a "phenylene group" and an "oligophenylene group" and a "phenyl group" and a "benzylene group" and an "oligobenzylene group" and a "benzyl group" can be respectively understood for purposes of the present invention in particular as a respective group that can be both substituted and unsubstituted.

In the context of R10, R11, R12, R13, R14, R20, R21, R22, R30, R31, R32, R33, R40, R41, R41', R42, R42', R43, R43', R44, R44', R45, R45', R50, R51, R51', R52, R52', R53, R53', R54, R54', R60, R61, R62, R100, R101, R101', R110, R111, R111', R112, R112', R120, R120', R121, R121', R130, R130', R131, R131', R132, R140, R150, R160, R170, R180, R180', R181, R181', R182, R200, R201, R202, R203, R210, R211, R212, [R]213, and/or R214 an alkyl group or alkoxy group can respectively have, for instance, a carbon chain length from ≥1 to ≤16 carbon atoms, for instance a carbon chain length from ≥1 to ≤4 carbon atoms, and/or from ≥4 to ≤8 carbon atoms and/or from ≥9 to ≤13 carbon atoms. In particular, an alkyl group can be a saturated alkyl group, for example of the general chemical formula: $—(CH_2)_a—CH_3$ where $1 \leq a \leq 15$.

In the context of R10, R11, R12, R13, R14, R20, R21, R22, R30, R31, R32, R33, R40, R41, R41', R42, R42', R43, R43', R44, R44', R45, R45', R50, R51, R51', R52, R52', R53, R53', R54, R54', R60, R61, R62, R100, R101, R101', R110, R111, R111', R112, R112', R120, R120', R121, R121', R130, R130', R131, R131', R132, R140, R150, R160, R170, R180, R180', R181, R181', R182, R200, R201, R202, R203, R210, R211, R212, [R]213, and/or R214 an alkylene oxide group, for example ethylene oxide group or propylene oxide group, in particular oligoalkylene oxide group, for example oligoethylene oxide group or oligopropylene oxide group, or a phenylene oxide group, for example oligophenylene oxide group, or a phenylene group, for example oligophenylene group, or a benzylene group, for example oligobenzylene group, can respectively have, for instance, ≥1 or ≥2 to ≤10 repeating units, for instance ≥1 or ≥2 to ≤4 repeating units. For instance, an alkylene oxide can have in this context the general chemical formula: $—[CH_2—CH_2—O]b$ where $1 \leq b \leq 10$, for example $1 \leq$ or $2 \leq b \leq 4$.

In the context of R10, R11, R12, R13, R14, R20, R21, R22, R30, R31, R32, R33, R40, R41, R41', R42, R42', R43, R43', R44, R44', R45, R45', R50, R51, R51', R52, R52', R53, R53', R54, R54', R60, R61, R62, R100, R101, R101', R110, R111, R111', R112, R112', R120, R120', R121, R121', R130, R130', R131, R131', R132, R140, R150, R160, R170, R180, R180', R181, R181', R182, R200, R201, R202, R203, R210, R211, R212, [R]213, and/or R214 combinations of these groups, for example an alkyl/alkylene oxide group, for instance an alkyl/oligoalkylene oxide group, for example of the general chemical formula: $H_3C—(CH_2)_{a1*}—[CH_2—CH_2—O—]_{b1*}$ where $0 \leq a1* \leq 15$, in particular $0 \leq a1* \leq 3$, and $1 \leq b1* \leq 10$, in particular $1 \leq$ or $2 \leq b1* \leq 14$, or an alkyl/alkylene oxide/alkyl group, for instance an alkyl/oligoalkylene oxide/alkyl group, or an alkoxy/alkylene oxide/alkyl group, for instance alkoxy/oligoalkylene oxide group, or an alkoxy/alkylene oxide/alkyl group, for instance alkoxy/oligoalkylene oxide/alkyl group, for example of the general chemical formula: $H_3C—(CH_2)_{a2*}—O—[CH_2—CH_2—O—]_{b2*}—(CH_2)_{a2*'}$ where $0 \leq a2* \leq 15$, in particular $0 \leq a2* \leq 3$, $0 \leq a2*' \leq 15$, in particular $0 \leq a2*' \leq 3$, and $1 \leq b2* \leq 10$, in particular $1 \leq$ or $2 \leq b2* \leq 4$, are also possible.

For example, R100, R101, and/or R101', and R111, R111', R112, and/or R112', for example R110, R111, and/or R111', and R120, R120', R121, and/or R121', and R130, R130', R131, and/or R131', and R150, and R180, R180', R181, R181', and/or R182, and R10, R11, R13, and/or R14, and R30, R32, and/or R33, and R41, R41', R42, R42', R43, R43', R44, R44', R45, and/or R45', and R51, R51', R52, R52', R53, R53', R54, and/or R54', and R200, R201, R202, and/or R203, and R210, R211, R212, [R]213, and/or R214 can respectively denote, mutually independently in each case, hydrogen and/or a halogen atom, in particular fluorine, and/or an alkyl group and/or an alkylene oxide group, in particular an oligoalkylene oxide group, and/or an alkoxy group and/or a phenylene oxide group, in particular an oligophenylene oxide group, and/or a phenoxy group and/or a phenylene group, in particular an oligophenylene group, and/or a phenyl group and/or a benzylene group, in particular an oligobenzylene group, and/or a benzyl group and/or a carbonyl group and/or an, in particular cyclic and/or acyclic, carbonate group, and/or an, in particular cyclic and/or acyclic, carboxylic acid ester group, in particular a lactone group, and/or an, in particular cyclic and/or acyclic, carbamate group, and/or a charged group, for example a positively charged group, in particular based on a cation of an ionic liquid, for instance a quaternary ammonium group and/or a quaternary phosphonium group, and/or a negatively charged group, in particular based on a conducting salt anion, in particular on a lithium conducting salt anion, and/or on an anion of an ionic liquid, and/or a sulfonate group, for example sulfonylimide group and/or a sulfonate group, for instance a lithium sulfonylimide group and/or a lithium sulfonate group.

For instance, R41, R41', R42, R42', R43, R43', R44, R44', R45, and/or R45', and R51, R51', R52, R52', R53, R53', R54, and/or R54', and R100, R101, and/or R101', and R110, R111, R111', R112, and/or R112', and R120, R120', R121, and/or R121', and R130, R130', R131, R131', and/or R132, and R140, and R150, and R160, and R170, and R180, R180', R181, R181', and/or R182 can denote a positively charged group, in particular based on a cation of an ionic liquid, for example a pyridinium group and/or a quaternary ammonium group and/or an imidazolium group and/or a piperidinium group and/or a pyrrolidinium group and/or a quaternary phosphonium group and/or a guanidinium group and/or a morpholinium group and/or a uronium group and/or a thiouronium group, for example a quaternary ammonium group and/or a quaternary phosphonium group. Ion conductivity can thereby, where applicable, be further improved.

In particular, R200, R201, R202, and/or R203, and R210, R211, R212, [R]213, and/or R214 can denote a negatively charged group, in particular based on a conducting salt anion, in particular lithium conducting salt anion, and/or on an anion of an ionic liquid, for example a sulfonylimide group, and/or a sulfonate group, for instance a lithium sulfonylimide group and/or a lithium sulfonate group. For instance, at least one of the residues R200, R201, R202, and/or R203, and R210, R211, R212, [R]213, and/or R214, for example at least two or three of the residues R200, R201, R202, and/or R203, and R210, R211, R212, [R]213, and/or R214, where applicable all the residues R200, R201, R202, and/or R203, and R210, R211, R212, [R]213, and/or R214, can denote a negatively charged group, in particular based on a conducting salt anion, in particular lithium conducting salt anion, and/or on an anion of an ionic liquid, for example a sulfonylimide group, and/or a sulfonate group, for instance a lithium sulfonylimide group and/or a lithium sulfonate group. Ion conductivity can thereby, where applicable, be further improved.

R132, and R140, and R160, and R170, and R12, and R20, R21, and R22, and R31, and R40, and R50, and R60, R61, and R62 can denote, mutually independently in each case, an alkyl group and/or an alkylene oxide group, in particular an oligoalkylene oxide group, and/or an alkoxy group and/or a phenylene oxide group, in particular an oligophenylene oxide group, and/or a phenoxy group and/or a phenylene group, in particular an oligophenylene group, and/or a phenyl group and/or a benzylene group, in particular an oligobenzylene group, and/or a benzyl group and/or a carbonyl group and/or an, in particular cyclic and/or acyclic, carbonate group and/or an, in particular cyclic and/or acyclic, carboxylic acid ester group, in particular a lactone group, and/or an, in particular cyclic and/or acyclic, carbamate group.

R132 can in particular denote an, in particular cyclic and/or acyclic, carbonate group and/or an, in particular cyclic and/or acyclic, carboxylic acid ester group, in particular a lactone group, and/or an, in particular cyclic and/or acyclic, carbamate group and/or an alkyl group, in particular a methyl group or an ethyl group, for example a methyl group. Ion conductivity can thereby advantageously be further improved.

R20 and/or R21, and R60 and/or R61, and R132, and R140, and R150, and R160, and R170 can denote in particular an alkyl group, for example a methyl group or an ethyl group, in particular a methyl group, and/or an alkylene oxide group, in particular an oligoalkylene oxide group. A short-chain alkyl group such as a methyl group advantageously allows the polymer to be optimized in terms of its ion-conducting function.

In the context of a special embodiment the residues R10, R11, R12, R13, and/or R14, and R20, R21, and/or R22, and R30, R31, R32, and/or R33, and R40, R41, R41', R42, R42', R43, R43', R44, R44', R45, and/or R45', and R50, R51, R51', R52, R52', R53, R53', R54, and/or R54', and R60, R61, and/or R62, and R100, R101, and/or R101', and R110, R111, R111', R112, and/or R112', and R120, R120', R121, and/or R121', and R130, R130', R131, R131', and/or R132, and R140, and R150, and R160, and R170, and R180, R180', R181, R181', and/or R182, and R200, R201, R202, and/or R203, and R210, R211, R212, [R]213, and/or R214 are partly or completely halogenated, in particular fluorinated. Halogenation, in particular fluorination, advantageously allows the polarity of the polymer to be influenced and thus allows the solubility of polysulfides by the polymer, in particular by alkylene oxide groups, possibly to be decreased, which can be particularly advantageous in the context of utilization in combination with a sulfur/carbon composite, for example sulfur/polymer and/or sulfur/carbon allotrope composites, in particular sulfur/polymer composites having sulfur bound, for example covalently and/or ionically, in particular covalently, to the polymer of the composite, for instance sulfur/polyacrylonitrile composites, for example a SPAN composite, as a cathode material.

In the context of an alternative or additional embodiment the residues R10, R11, R12, R13, and/or R14, and R20, R21, and/or R22, and R30, R31, R32, and/or R33, and R40, R41, R41', R42, R42', R43, R43', R44, R44', R45, and/or R45', and R50, R51, R51', R52, R52', R53, R53', R54, and/or R54', and R60, R61, and/or R62, and R100, R101, and/or R101', and R110, R111, R111', R112, and/or R112', and R120, R120', R121, and/or R121', and R130, R130', R131, R131', and/or R132, and R140, and R150, and R160, and R170, and R180, R180', R181, R181', and/or R182, and R200, R201, R202, and/or R203, and R210, R211, R212, [R]213, and/or R214 are substituted with at least one positively charged group, in particular based on a cation of an ionic liquid, for example with an, in particular quaternary, ammonium group and/or with an, in particular quaternary, phosphonium group, and/or with at least one negatively charged group, in particular based on a conducting salt anion, for example lithium conducting salt anion, and/or on an anion of an ionic liquid, for example with at least one sulfonylimide group, for example lithium sulfonylimide group, and/or with at least one sulfonate group, for instance lithium sulfonate group. The ion conductivity can thereby advantageously be further increased, in particular respectively by ion dissociation or counter ion solvating, for example lithium ion solvating. In particular, R10, R11, R12, R13, and/or R14, and R20, R21, and/or R22, and R30, R31, R32, and/or R33, and R40, R41, R41', R42, R42', R43, R43', R44, R44', R45, and/or R45', and R50, R51, R51', R52, R52', R53, R53', R54, and/or R54', and R60, R61, and/or R62 can be substituted with a positively charged group, and R200, R201, R202, and/or R203, and R210, R211, R212, [R]213, and/or R214 can respectively be substituted with a negatively charged group, for example which can be embodied in particular as explained above, in particular in the context of the groups $Q^+$, $Q^-$, in particular $Q^-$ respectively attached via the spacer X.

In the context of an alternative or additional embodiment the residues R10, R11, R12, R13, and/or R14, and R20, R21, and/or R22, and R30, R31, R32, and/or R33, and R40, R41, R41', R42, R42', R43, R43', R44, R44', R45, and/or R45', and R50, R51, R51', R52, R52', R53, R53', R54, and/or R54', and R60, R61, and/or R62, and R100, R101, and/or R101', and R110, R111, R111', R112, and/or R112', and R120, R120', R121, and/or R121', and R130, R130', R131, R131', and/or R132, and R140, and R150, and R160, and R170, and R180, R180', R181, R181', and/or R182, and R200, R201, R202, and/or R203, and R210, R211, R212, [R]213, and/or R214 are substituted with at least one oxygen-containing group, for example alkoxy group and/or alkylene oxide group, for example oligoalkylene oxide group, for instance oligoethylene oxide group and/or oligopropylene oxide group, and/or ketone group, for example alkylcarbonyl group, and/or carboxylic acid ester group. The ion conductivity can thereby advantageously be further increased, since oligoalkylene oxide groups in particular, such as oligoethylene oxide groups, offer a capability of, inter alia, respectively reducing the glass temperature of the polymer or polymer electrolyte.

Aromatic groups such as phenylene groups and benzylene groups advantageously offer multiple substitution positions that can be substituted with charged groups and/or oxygen-containing groups, and thus in particular enable ion conductivity to be optimized.

For example, R10, R11, R12, R13, and/or R14, and R30, R31, R32, and/or R33, and R41, R41', R42, R42', R43, R43', R44, R44', R45, and/or R45', and R51, R51', R52, R52', R53, R53', R54, and/or R54', and R100, R101, and/or R101', and R110, R111, R111', R112, and/or R112', and R120, R120', R121, and/or R121', and R130, R130', R131, R131', and R150, and R180, R180', R181, R181', and/or R182, and R200, R201, R202, and/or R203, and R210, R211, R212, [R]213, and/or R214 can therefore, for example mutually independently in each case, denote hydrogen and/or a, partly or completely halogenated, in particular fluorinated alkyl group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, alkylene oxide group, for example ethylene oxide group or propylene oxide group, in particular oligoalkylene oxide group, for example oligoethylene oxide group or oligopropylene oxide group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, alkoxy group, and/or substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, phenylene oxide group, for example oligophenylene oxide group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, phenoxy group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, phenylene group, for example oligophenylene group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, phenyl group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, benzylene group, for example oligobenzylene group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, benzyl group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a carbonyl group, in particular a ketone group, for example alkylcarbonyl group, and/or a, partly or completely halogenated, in particular fluorinated, in particular cyclic and/or acyclic, carbonate group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, in particular cyclic and/or acyclic, carboxylic acid ester group, in particular a lactone group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, in particular cyclic and/or acyclic, carbamate group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group.

R12, and R20, R21, and/or R21, and R31, and R40, and R50, and R60, R61, and/or R62, and R132, and R140, and R160, and R170 can therefore in particular, mutually independently in each case, denote a, partly or completely halogenated, in particular fluorinated, alkyl group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, alkylene oxide group, for example ethylene oxide group or propylene oxide group, in particular oligoalkylene oxide group, for example oligoethylene oxide group or oligopropylene oxide group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, alkoxy group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, phenylene oxide group, for example oligophenylene oxide group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, phenoxy group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, phenylene group, for example oligophenylene group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, phenyl group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, benzylene group, for example oligobenzylene group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, benzyl group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a carbonyl group, in particular a ketone group, for example alkylcarbonyl group, and/or a, partly or completely halogenated, in particular fluorinated, in particular cyclic and/or acyclic, carbonate group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, in particular cyclic and/or acyclic, carboxylic acid ester group, in particular a lactone group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group, and/or a, partly or completely halogenated, in particular fluorinated, in particular cyclic and/or acyclic, carbamate group, and/or one substituted with at least one positively charged group, in particular based on a cation of an ionic liquid, for example with at least one quaternary ammonium group and/or phosphonium group, and/or substituted with at least one negatively charged group, in particular based on a conducting salt anion, for example lithium conducting salt anion, and/or on an anion of an ionic liquid, for example with at least one lithium sulfonylimide group and/or lithium sulfonate group, and/or substituted with at least one oxygen-containing group.

For instance, R100, R101, and/or R101', and R110, R111, R111', R112, and/or R112', and R120, R120', R121, and/or R121', and R130, R130', R131, and/or R131', and R150, and R180, R180', R181, R181', and/or R182, and R10, R11, R12, R13, and/or R14, and R30, R32, and/or R33, and R41, R41', R42, R42', R43, R43', R44, R44', R45, and/or R45', and R51, R51', R52, R52', R53, R53', R54, and/or R54', R200, R201, R202, and/or R203, and R210, R211, R212, [R]213, and/or R214 can denote, mutually independently in each case, hydrogen and/or a halogen atom, in particular fluorine, or an alkyl group and/or an alkylene oxide group, in particular oligoalkylene oxide group, and/or an alkoxy group and/or a phenylene oxide group, in particular oligophenylene oxide group, and/or a phenoxy group and/or a phenylene group, in particular oligophenylene group, and/or a phenyl group and/or a benzylene group, in particular oligobenzylene group, and/or a benzyl group and/or a carbonyl group and/or an, in particular cyclic and/or acyclic, carbonate group, and/or an, in particular cyclic and/or acyclic, carboxylic acid ester group, in particular a lactone group, and/or an, in particular cyclic and/or acyclic, carbamate group and/or a charged group, for example a positively charged group, in particular based on a cation of an ionic liquid, for example a quaternary ammonium group and/or a quaternary phosphonium group, and/or a negatively charged group, in particular based on a conducting salt anion, for example lithium conducting salt anion, and/or on an anion of an ionic liquid, and/or a sulfonate group, for example a lithium sulfonylimide group and/or lithium sulfonate group.

R132, and R140, and R160, and R170, and R12, and R20, R21, and R22, and R31, and R40, and R50, and R60, R61, and R62 can in this context denote, mutually independently in each case, an alkyl group and/or an alkylene oxide group, in particular oligoalkylene oxide group, and/or an alkoxy group and/or a phenylene oxide group, in particular oligophenylene oxide group, and/or a phenoxy group and/or a phenylene group, in particular oligophenylene group, and/or a phenyl group and/or a benzylene group, in particular oligobenzylene group, and/or a benzyl group and/or a carbonyl group and/or an, in particular cyclic and/or acyclic, carbonate group, and/or an, in particular cyclic and/or acyclic, carboxylic acid ester group, and/or an, in particular cyclic and/or acyclic, carbamate group.

In the context of a special embodiment the at least one polymer electrolyte or the at least one polymer respectively encompasses at least one repeating unit, based on a cyclic carbonate, of the general chemical formula:

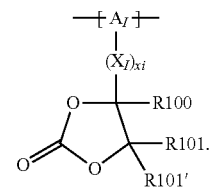

In the context of a further, alternative or additional, special embodiment the at least one polymer electrolyte or the at least one polymer respectively encompasses at least one repeating unit, based on a lactone, of the general chemical formula:

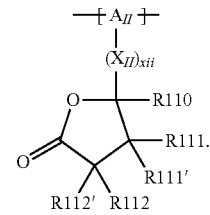

for example

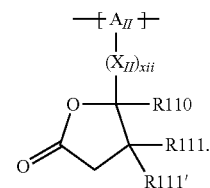

In the context of a further, alternative or additional, special embodiment the at least one polymer electrolyte or the at least one polymer respectively encompasses at least one repeating unit, based on a cyclic carbamate, of the general chemical formula:

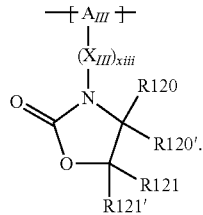

In the context of a further, alternative or additional, special embodiment the at least one polymer electrolyte or the at least one polymer respectively encompasses at least one repeating unit, based on an alkylene oxide, in particular ethylene oxide, of the general chemical formula: and/or

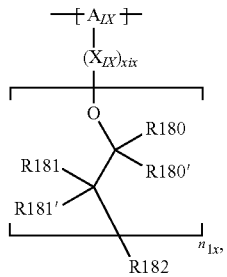

where $n_{IV}$ and $n_{IX}$ respectively denote the number of ethylene oxide units. Possibilities are respectively, for instance, $1 \leq n_{IV} \leq 15$, for example $2 \leq n_{IV} \leq 6$, and $1 \leq n_{IX} \leq 15$, for example $2 \leq n_{IX} \leq 6$.

In the context of a further, alternative or additional, special embodiment the at least one polymer electrolyte or the at least one polymer respectively encompasses at least one repeating unit, based on an acyclic carbonate, of the general chemical formula:

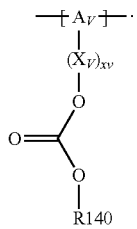

In the context of a further, alternative or additional, special embodiment the at least one polymer electrolyte or the at least one polymer respectively encompasses at least one repeating unit, based on an acyclic carboxylic acid ester, of the general chemical formula:

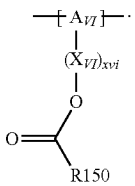

In the context of a further, alternative or additional, special embodiment the at least one polymer electrolyte or the at least one polymer respectively encompasses at least one repeating unit, based on an acyclic carbamate, of the general chemical formula:

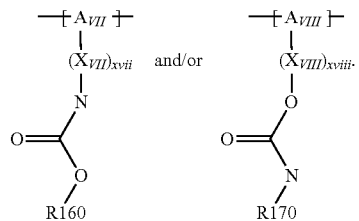

$-[A_I]-$, $-[A_{II}]-$, $-[A_{III}]-$, $-[A_{IV}]-$, $-[A_V]-$, $-[A_{VI}]-$, $-[A_{VII}]-$, $-[A_{VIII}]-$, or $-[A_{IX}]-$ here respectively denotes in particular a polymer-backbone-forming unit. $(X_I)$, $(X_{II})$, $(X_{III})$, $(X_{IV})$, $(X_V)$, $(X_{VI})$, $(X_{VII})$, $(X_{VIII})$, or $(X_{IX})$ here respectively denotes in particular a spacer. xi, xii, xiii, xiv, xv, xvi, xvii, xviii, or xix here respectively denotes the number, in particular the presence or absence, of the (respective) spacers. In particular, xi, xii, xiii, xiv, xv, xvi, xvii, xviii, or xix can respectively be 1 or 0, for example 1.

The polymer-backbone-forming unit $-[A_I]-$, $-[A_{II}]-$, $-[A_{III}]-$, $-[A_{IV}]-$, $-[A_V]-$, $-[A_{VI}]-$, $-[A_{VII}]-$, $-[A_{VIII}]-$, or $-[A_{IX}]-$ can respectively be embodied, for example, as explained in conjunction with the polymer-backbone-forming unit -[A]-. The spacer $(X_I)$, $(X_{II})$, $(X_{III})$, $(X_{IV})$, $(X_V)$, $(X_{VI})$, $(X_{VII})$, $(X_{VIII})$, or $(X_{IX})$ can respectively be embodied, for example, as explained in conjunction with the spacer X. R100, R101, R101', R110, R111, R111', R112, R112', R120, R120', R121, R121', R130, R130', R131, R131', R132, R140, R150, R160, R180, R180', R181, R181', R182, and/or R170 can likewise be embodied, for example, as explained above.

$X_I$ or $X_{II}$ or $X_{III}$ or $X_{IV}$ or $X_V$ or $X_{VI}$ or $X_{VII}$ or $X_{VIII}$ or $X_{IX}$ can respectively denote, for example, an, in particular saturated or unsaturated, linear or branched, for example partly or completely halogenated, in particular fluorinated, alkylene spacer, for example of the general chemical formula: $—(CH_2)_{a1}—$ where $1 \leq a1 \leq 10$, for instance where $1 \leq a1 \leq 4$, and/or an, in particular saturated or unsaturated, linear or branched, for example partly or completely halogenated, in particular fluorinated, alkylene oxide spacer, for example oligoalkylene oxide spacer, in particular (oligo)ethylene oxide spacer, in particular having $\leq 1$ or $\leq 2$ to $\leq 10$ repeating units, for example having $\geq 1$ or $\geq 2$ to $\leq 4$ repeating units, for instance of the general chemical formula: $—CH_2—[CH_2—CH_2—O]_{b1}—CH_2—$ where $1 \leq b1 \leq 10$, for example where $2 \leq b1 \leq 4$, and/or of the general chemical formula $—[CH_2—CH_2—O—]_b$ where $1 \leq b \leq 10$, for example where $2 \leq b \leq 4$, and/or $—(CH_2)_{a2}—O—[CH_2—CH_2—O—]_{b2}—(CH_2)_{a2'}$ where $1 \leq a2 \leq 3$, $1 \leq b2 \leq 10$, in particular $1 \leq b2 \leq 4$, and $1 \leq a2' \leq 3$, and/or a charged group, for example a positively charged group, in particular based on a cation of an ionic liquid, for instance a pyridinium group and/or a quaternary ammonium group, and/or a negatively charged group, for instance a sulfonylimide group and/or sulfonate group, and/or a phenylene group, for example a phenylene group substituted with at least an alkyl group and/or with an alkylene oxide group and/or with an alkoxy group and/or with a charged group, for example with a positively charged group, for instance with a quaternary ammonium group, and/or with a negatively charged group, for instance with a sulfonylimide group and/or sulfonate group, and/or a benzylene group, for example a benzylene group substituted with at least an alkyl group and/or with an alkylene oxide group and/or with an alkoxy group and/or with a charged group, for example with a positively charged group, in particular based on a cation of an ionic liquid, for instance with a quaternary ammonium group, and/or with a negatively charged group, for instance with a sulfonylimide group and/or sulfonate group, and/or a ketone group, for example alkylcarbonyl group.

R100, R101, and/or R101', and R110, R111, R111', R112, and/or R112', and R120, R120', R121, and/or R121', and R130, R130', R131, R131', and/or R132, and R140, and R150, and R160, and R170, and R180, R180', R181, R181', and/or R182 can denote in this context, for example, mutually independently in each case, hydrogen or an, in particular saturated or unsaturated, linear or branched, for example partly or completely halogenated, in particular fluorinated, alkyl group, for example of the general chemical formula: —$(CH_2)_{a1*}$—$CH_3$ where $0 \leq$ or $1 \leq a1* \leq 10$, for instance where $0 \leq$ or $1 \leq a1* \leq 3$, and/or an, in particular saturated or unsaturated, linear or branched, for example partly or completely halogenated, in particular fluorinated, alkylene oxide group, for example an ethylene oxide group, in particular an oligoalkylene oxide group, for instance an oligoethylene oxide group, in particular having $\geq 1$ to $\leq 10$ repeating units, for example having $\geq 1$ or $\geq 2$ to $\leq 5$ repeating units, and/or a charged group, for example a positively charged group, in particular based on a cation of an ionic liquid, for instance a pyridinium group and/or a quaternary ammonium group, and/or a negatively charged group, for instance a sulfonylimide group and/or sulfonate group, and/or a phenylene group, for example a phenylene group substituted with at least an alkyl group and/or with an alkylene oxide group and/or with an alkoxy group and/or with a charged group, for example a positively charged group, for instance with a quaternary ammonium group, and/or with a negatively charged group, for instance with a sulfonylimide group and/or sulfonate group, and/or a benzylene group, for example a benzylene group substituted with at least an alkyl group and/or with an alkylene oxide group and/or with an alkoxy group and/or with a charged group, for example a positively charged group, for instance with a quaternary ammonium group, and/or with a negatively charged group, for instance a sulfonylimide group and/or sulfonate group, and/or a ketone group, for example alkylcarbonyl group.

In this context, for instance, at least two of the residues R100, R101, and/or R101', and R110, R111, R111', R112, and/or R112', and R120, 120', R121, and/or R121', and R130, R130', R131, R131', and/or R132, and R140, and R150, and R160, and R170, and R180, R180', R181, R181', and/or R182—where applicable, all the residues R100, R101, and/or R101', and R110, R111, R111', R112, and/or R112', and R120, 120', R121, and/or R121', and R130, R130', R131, R131', and/or R132, and R140, and R150, and R160, and R170, and R180, R180', R181, R181', and/or R182—can denote different groups, for example alkyl groups and/or oligoalkylene oxide groups, for instance having a different length and/or substitution and/or degree of saturation and/or degree of branching and/or degree of halogenation, in particular degree of fluorination. In particular, R100, R101, and/or R101', and R110, R111, R111', R112, and/or R112', and R120, 120', R121, and/or R121', and R130, R130', R131, R131', and/or R132, and R140, and R150, and R160, and R170, and R180, R180', R181, R181', and/or R182 can denote, mutually independently in each case, hydrogen or a methyl group or an ethyl group or an, in particular saturated, alkyl group having a chain length from $\geq 1$ to $\leq 10$ carbon atoms, for example from $\geq 3$ to $\leq 5$ carbon atoms.

R132, and R140, and R150, and R160, and R170 can denote in particular an alkyl group, for example a methyl group or ethyl group, in particular a methyl group, and/or an alkylene oxide group, in particular oligoalkylene oxide group. The polymer can be advantageously be optimized in terms of its ion-conducting function thanks to a short-chain alkyl group such as a methyl group.

R132, and R140, and R150, and R160, and R170 can denote in particular a methyl group.

In particular, the polymer-backbone-forming unit -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]-, or the repeating unit ([A]-X-Q), can respectively encompass or be a methacrylate unit, for instance of the general chemical formula:

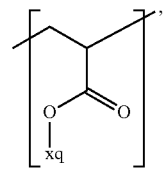

and/or a methyl methacrylate unit, for instance of the general chemical formula:

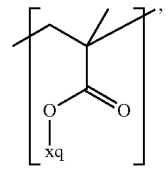

and/or a siloxane unit, for instance of the general formula:

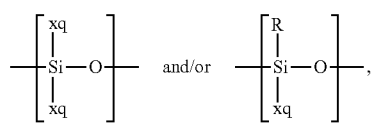

in particular where R denotes an alkyl group, for example a methyl, ethyl, and/or propyl group, for instance a methyl group, for instance of the general chemical formula:

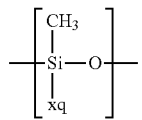

and/or a phosphazene unit, for instance of the general chemical formula:

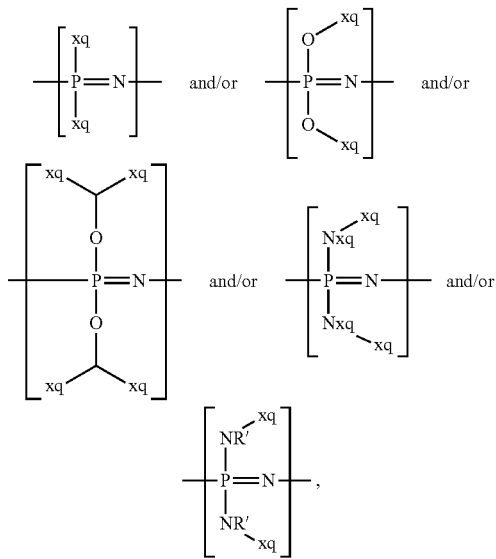

in particular where R' denotes hydrogen or (which may be) an alkyl group, for example a methyl, ethyl, and/or propyl group, for instance a methyl group, and/or a siloxane/alkylene oxide unit, for example a siloxane/ethylene oxide unit, for instance of the general chemical formula:

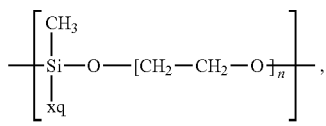

in particular where xq respectively characterizes the attachment site(s) or denotes XQ. Polysiloxanes, polyphosphazenes, and/or polymers made up of siloxane/alkylene oxide units advantageously allow low glass transition temperatures to be achieved. Polymethacrylates and/or poly(methyl methacrylates) can advantageously be comparatively easy to access synthetically.

The respective polymer-backbone-forming unit -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]- can denote, for example, an alkylene oxide unit, for example an ethylene oxide unit and/or a propylene oxide unit, in particular an ethylene oxide unit, and/or an alkylene unit, and/or a unit encompassing a carbonate group, and/or a methacrylate unit, and/or a methyl methacrylate unit, and/or a siloxane unit, and/or a phosphazene unit, and/or a phenylene unit, for example a phenylene oxide unit, and/or a benzylene unit. For example, the respective polymer-backbone-forming unit -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]- can denote an alkylene oxide unit, for example an ethylene oxide unit and/or a propylene oxide unit, in particular an ethylene oxide unit, and/or an alkylene unit, and/or a unit encompassing a carbonate group, and/or a methacrylate unit, and/or a methyl methacrylate unit, and/or a siloxane unit, and/or a phosphazene unit, and/or a phenylene unit, for example a phenylene oxide unit. In particular, the respective polymer-backbone-forming unit -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]- can denote a siloxane unit, and/or a phosphazene unit, and/or a methacrylate unit, and/or a methyl methacrylate unit, and/or a phenylene unit, for example a siloxane unit. For example, the respective polymer-backbone-forming unit -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]- can denote a siloxane unit and/or a phosphazene unit and/or a methacrylate unit and/or a methyl methacrylate unit.

In the context of a further embodiment the respective polymer-backbone-forming unit -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]- denotes a polyfunctionalized, for example bifunctionalized, trifunctionalized, or tetrafunctionalized, polymer-backbone-forming unit. For example, the respective polymer-backbone-forming unit -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]- can denote a polyfunctionalized, for example bifunctionalized, siloxane unit and/or a polyfunctionalized, for example bifunctionalized, or tetrafunctionalized, phosphazene unit and/or polyfunctionalized, for example bifunctionalized, phenylene unit.

In the context of a special implementation of this embodiment the respective polymer-backbone-forming unit -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]- or the repeating unit ([A]-X-Q) respectively denotes a polyfunctionalized, for example bifunctionalized or tetrafunctionalized, polymer-backbone-forming unit of the general chemical formula:

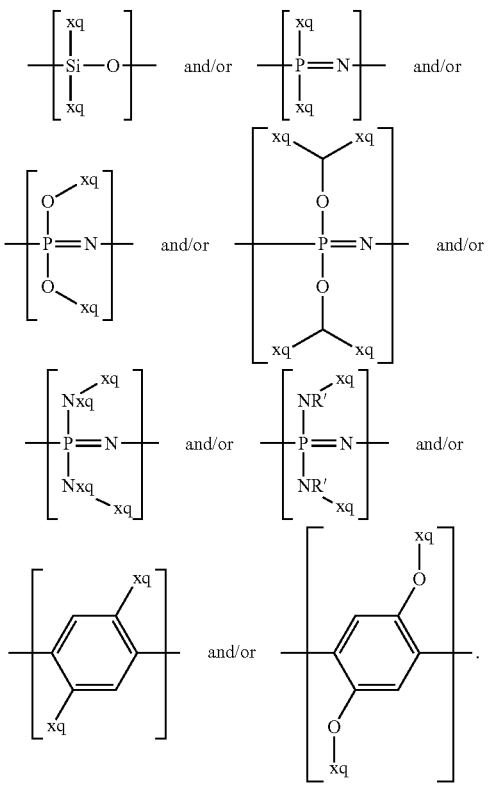

Here xq can respectively denote an attachment site, in particular at which a group Q, for example respectively $Q^+$ or $Q^-$ or Q, is respectively attached via a spacer X, in particular $X_x$, to the polymer-backbone-forming unit -[A]-, or respectively can denote XQ, i.e. respectively a group Q, for example respectively $Q^+$ or $Q^-$ or Q, and a spacer X, in particular $X_x$. R' can denote here, in particular, hydrogen or (which may be) an alkyl group, for example a methyl, ethyl, and/or propyl group, for instance a methyl group.

A cyclic carbonate group respectively substituted with R100, R101, and R101', in particular the one having the general chemical formula:

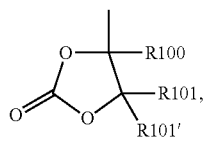

can respectively be attached to the polymer-backbone-forming unit -[$A_I$]- at the attachment sites xq via a spacer $(X_I)_{xi}$.

A lactone group respectively substituted with R110, R111, R111', R112, and/or R112', in particular the one having the general chemical formula:

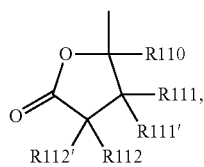

for example

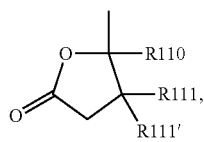

can respectively be attached to the polymer-backbone-forming unit -[$A_{II}$]- at the attachment sites xq via a spacer $(X_{II})_{xii}$.

A cyclic carbamate group substituted with R120, R120', [R]121, and/or R121', in particular the one having the general chemical formula:

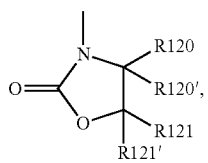

can respectively be attached to the polymer-backbone-forming unit -[$A_{III}$]- at the attachment sites xq via a spacer $(X_{III})_{xiii}$.

An alkylene oxide group respectively substituted with R130, R130', [R]131, R131', and [R]132, in particular the one having the general chemical formula:

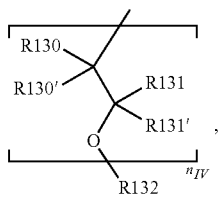

can respectively be attached to the polymer-backbone-forming unit -[$A_{IV}$]- at the attachment sites xq via a spacer $(X_{IV})_{xiv}$.

An acyclic carbonate group respectively substituted with R140, in particular the one having the general chemical formula:

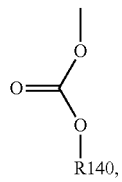

can respectively be attached to the polymer-backbone-forming unit -[$A_V$]- at the attachment sites xq via a spacer $(X_V)_{xv}$.

An acyclic carboxylic acid ester group respectively substituted with R150, in particular the one having the general chemical formula:

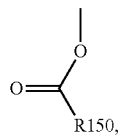

can respectively be attached to the polymer-backbone-forming unit -[$A_{VI}$]- at the attachment sites xq via a spacer $(X_V)_{xvi}$.

An acyclic carbamate group respectively substituted with R160, in particular the one having the general chemical formula:

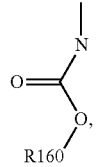

can respectively be attached to the polymer-backbone-forming unit -[$A_{VII}$]- at the attachment sites xq via a spacer $(X_{VII})_{xvii}$.

An acyclic carbamate group respectively substituted with R170, in particular the one having the general chemical formula:

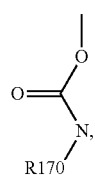

can respectively be attached to the polymer-backbone-forming unit -[$A_{VIII}$]- at the attachment sites xq via a spacer $(X_{VIII})_{xviii}$.

An alkylene oxide group respectively substituted with R180, R180', R181, R181', and R182, in particular the one having the general chemical formula:

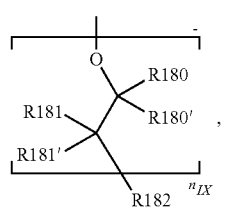

can respectively be attached to the polymer-backbone-forming unit -[$A_{IX}$]- at the attachment sites xq via a spacer $(X_{IX})_{xix}$.

A pyridinium group respectively substituted with R10, R11, R12, R13, and R14, in particular the one having the general chemical formula:

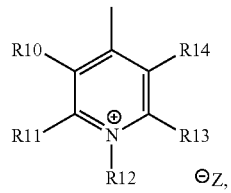

can respectively be attached to the polymer-backbone-forming unit -[$A_a$]- at the attachment sites xq via a spacer $(X_a)_{xa}$.

An ammonium group respectively substituted with R20, R21, and R22, in particular the one having the general chemical formula:

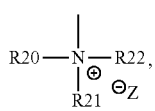

can respectively be attached to the polymer-backbone-forming unit -[$A_b$]- at the attachment sites xq via a spacer $(X_b)_{xb}$.

An imidazolium group respectively substituted with R30, R31, R32, and R33, in particular the one having the general chemical formula:

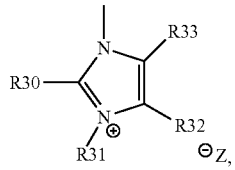

can respectively be attached to the polymer-backbone-forming unit -[$A_c$]- at the attachment sites xq via a spacer $(X_c)_{xc}$.

A piperidinium group respectively substituted with R40, R41, R41', R42, R42', R43, R43', R44, R44', R45, and R45', in particular the one having the general chemical formula:

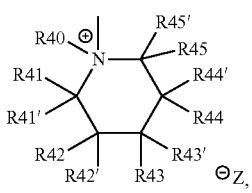

can respectively be attached to the polymer-backbone-forming unit -[$A_d$]- at the attachment sites xq via a spacer $(X_d)_{xd}$.

A pyrrolidinium group respectively substituted with R50, R51, R51', R52, R52', R53, R53', R54, and R54', in particular the one having the general chemical formula:

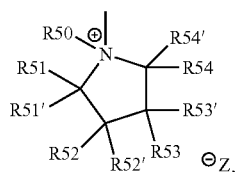

can respectively be attached to the polymer-backbone-forming unit -[$A_e$]- at the attachment sites xq via a spacer $(X_e)_{xe}$.

A phosphonium group respectively substituted with R60, R61, and R62, in particular the one having the general chemical formula:

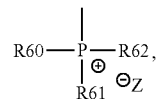

can respectively be attached to the polymer-backbone-forming unit -[$A_f$]- at the attachment sites xq via a spacer $(X_f)_{xf}$.

A benzenesulfonate group respectively substituted with R200, R201, R202, and R203, in particular the one having the general chemical formula:

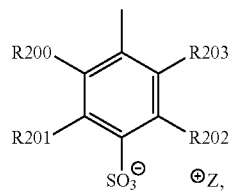

can respectively be attached to the polymer-backbone-forming unit -[A$_Z$]- at the attachment sites xq via a spacer (X$_Z$)$_{xZ}$.

A para-benzenesulfonylimide group respectively substituted with R210, R211, R212, [R]213, and R214, for example a para-trifluoromethanesulfonylimide benzene group, in particular the one having the general chemical formula:

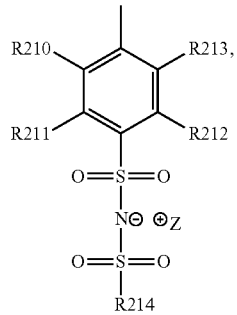

for example

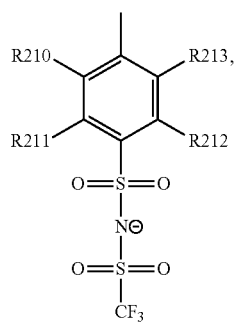

can respectively be attached to the polymer-backbone-forming unit -[A$_{Z1}$]- at the attachment sites xq via a spacer (X$_{Z1}$)$_{xZ1}$.

The respective polymer-backbone-forming unit -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, or -[A$_{IX}$]-, like the polymer-backbone-forming units -[A$_a$]-, -[A$_b$]-[A$_c$]-, -[A$_d$]-, -[A$_e$]-, -[A$_f$]-, -[A$_Z$]-, and/or -[A$_{Z1}$]- of the special embodiments explained later, can encompass an alkylene oxide unit, for example of the general chemical formula:

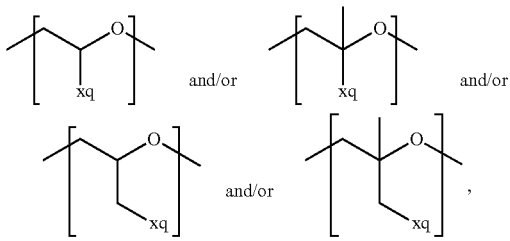

and/or an alkylene unit, for example an ethylene unit and/or propylene unit, for instance of the general chemical formula:

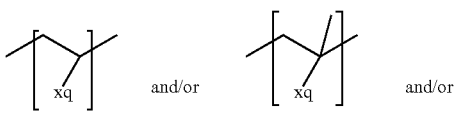

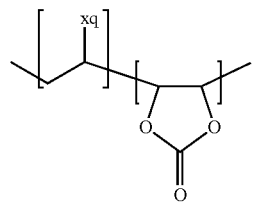

and/or a carbonate unit, and/or a methacrylate unit, for instance of the general chemical formula:

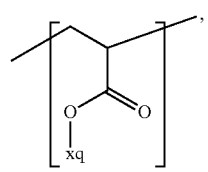

and/or a methyl methacrylate unit, for instance of the general chemical formula:

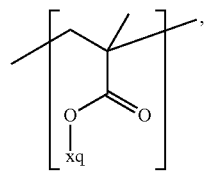

and/or a siloxane unit, for instance of the general formula:

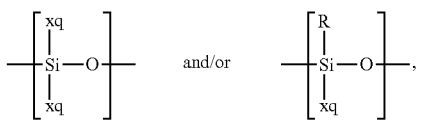

in particular where R denotes an alkyl group, in particular a methyl, ethyl, and/or propyl group, for instance a methyl group, for example

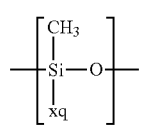

and/or a phosphazene unit, for instance of the general chemical formula:

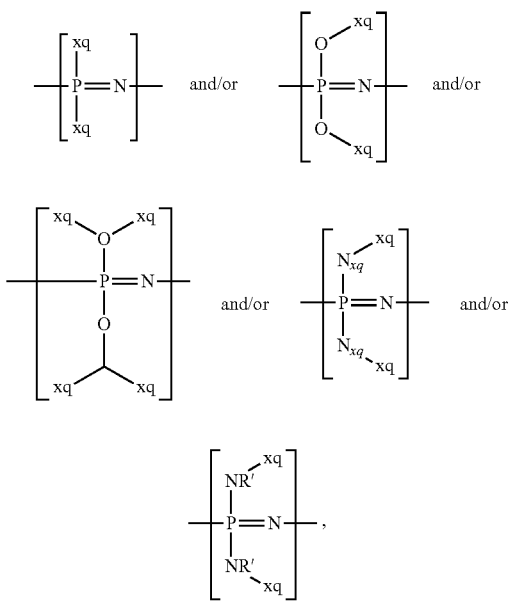

in particular where R' denotes hydrogen or (which may be) an alkyl group, for example a methyl, ethyl, and/or propyl group, for instance a methyl group, and/or a siloxane/alkylene oxide unit, for example a siloxane/ethylene oxide unit, for instance of the general chemical formula:

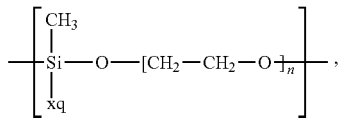

and/or a phenylene unit, in particular of a polyphenylene, for example of a para-polyphenylene, for example having an ether function, for instance of the general chemical formula:

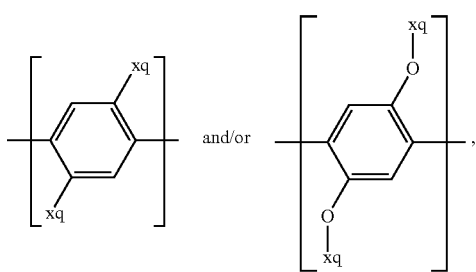

in particular where xq respectively characterizes the attachment site(s) or denotes XQ.

In the context of a further, alternative or additional embodiment the at least one polymer electrolyte or the at least one polymer respectively encompasses at least one pyridinium-based repeating unit of the general chemical formula:

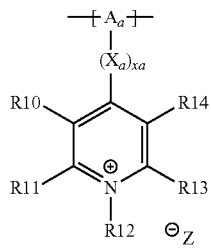

where -[$A_a$]- denotes a polymer-backbone-forming unit -[A]-. ($X_a$) here denotes a spacer, and xa denotes the number, in particular respectively the presence or absence, of spacers ($X_a$); xa can be, in particular, 1 or 0, for example 1. The polymer-backbone-forming unit -[$A_a$]- can be embodied, for example, as explained in conjunction with the polymer-backbone-forming unit -[A]-. The spacer ($X_a$) can be embodied, for example, as explained in conjunction with the spacer X. R10, R11, R12, R13, and/or R14 can likewise be embodied, for example, as explained above.

$Z^-$ can denote in this context, in particular, perchlorate and/or trifluoromethanesulfonate and/or tetrafluoroborate and/or bisoxalatoborate and/or hexafluorophosphate and/or bis(trifluoromethanesulfonylimide) and/or difluorooxalatoborate and/or bromide and/or iodide and/or chloride.

($X_a$) can denote in this context, in particular, an, in particular saturated or unsaturated, linear or branched, for example partly or completely halogenated, in particular fluorinated, alkylene spacer, for example of the general chemical formula: —$(CH_2)_{a1}$— where $1 \leq a1 \leq 12$, for instance where $1 \leq a1 \leq 3$, and/or an, in particular saturated or unsaturated, linear or branched, for example partly or completely halogenated, in particular fluorinated, alkylene oxide spacer, in particular ethylene oxide spacer, for example having the general chemical formula: —$CH_2$—[$CH_2$—$CH_2$—O]$_{b1}$—$CH_2$— where $1 \leq b1 \leq 10$, for instance $1 \leq b1 \leq 4$, and/or a further positively charged group, for instance a further pyridinium group and/or a quaternary ammonium group, and/or a phenylene group, for example a phenylene group substituted with at least an alkyl group and/or with an alkylene oxide group and/or with an alkoxy group and/or with a further positively charged group, for instance with a quaternary ammonium group, and/or a benzylene group, for example a benzylene group substituted with at least an alkyl group and/or with an alkylene oxide group and/or with an alkoxy group and/or with a further positively charged group, for instance with a quaternary ammonium group, and/or a ketone group, for example alkylcarbonyl group.

R12 denotes here in particular an, in particular saturated or unsaturated, linear or branched, for example partly or completely halogenated, in particular fluorinated, alkyl group, in particular having a chain length from $\geq 1$ to $\leq 16$ carbon atoms, for example of the general chemical formula: —$(CH_2)_{a1*}$—$CH_3$ where $1 \leq a1* \leq 15$, for instance where $8 \leq a1* \leq 12$, and/or an, in particular saturated or unsaturated, linear or branched, for example partly or completely halogenated, in particular fluorinated, alkylene oxide group, for example an ethylene oxide group, in particular an oligoalkylene oxide group, for instance an oligoethylene oxide group, in particular having $\geq 1$ to $\leq 10$ repeating units, for example having $\geq 1$ or $\geq 2$ to $\leq 5$ repeating units, and/or a further positively charged group, for instance a further pyridinium group and/or a quaternary ammonium group, and/or a phenylene group, for example a phenylene group substituted with at least an alkyl group and/or with an alkylene oxide group and/or with an alkoxy group and/or with a further positively charged group, for instance with a quaternary ammonium group, and/or a benzylene group, for example a benzylene group substituted with at least an alkyl group and/or with an alkylene oxide group and/or with an alkoxy group and/or with a further positively charged group, for instance with a quaternary ammonium group, and/or a ketone group, for example alkylcarbonyl group. For example, R12 can denote a saturated alkyl group, in particular having a chain length from ≥1 to ≤16 carbon atoms. For instance, R12 can denote a saturated alkyl group having a chain length from ≤9 to ≤13 carbon atoms, for instance an undecyl group (—$C_{11}H_{23}$)—.

R10, R11, R13, and/or R14 can in this context, for example, mutually independently in each case, denote hydrogen or an, in particular saturated or unsaturated, linear or branched, for example partly or completely halogenated, in particular fluorinated, alkyl group, for example of the general chemical formula: —$(CH_2)_{a1*}$—$CH_3$ where 1≤a1*≤15, for instance where 1≤a1*≤3, for example a methyl group and/or an ethyl group, and/or an, in particular saturated or unsaturated, linear or branched, for example partly or completely halogenated, in particular fluorinated, alkylene oxide group, for example an ethylene oxide group, in particular an oligoalkylene oxide group, for instance an oligoethylene oxide group, in particular having ≥1 to ≤10 repeating units, for example having ≥1 or ≥2 to ≤5 repeating units, and/or a further positively charged group, for instance a further pyridinium group and/or a quaternary ammonium group, and/or a phenylene group, for example a phenylene group substituted with at least an alkyl group and/or with an alkylene oxide group and/or with an alkoxy group and/or with a further positively charged group, for instance with a quaternary ammonium group, and/or a benzylene group, for example a benzylene group substituted with at least an alkyl group and/or with an alkylene oxide group and/or with an alkoxy group and/or with a further positively charged group, for instance with a quaternary ammonium group, and/or a ketone group, for example alkylcarbonyl group. For instance, at least two, for example at least three, of the residues R10, R11, R12, R13, and R14, where applicable all the residues R10, R11, R12, R13, and R14, can in this context denote different groups, for example alkyl groups and/or oligoalkylene oxide groups, for instance having a different length and/or substitution and/or degree of saturation and/or degree of branching and/or degree of halogenation, in particular degree of fluorination.

Examples of such embodiments are:

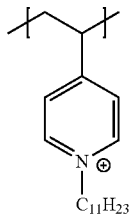 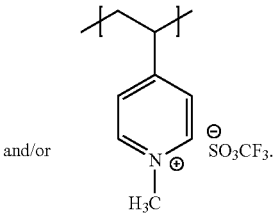

and/or

In the context of a further, alternative or additional embodiment the at least one polymer electrolyte or the at least one polymer respectively encompasses at least one ammonium-based repeating unit of the general chemical formula:

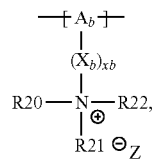

where -[$A_b$]- denotes a polymer-backbone-forming unit -[A]-. ($X_b$) here denotes a spacer, and xb denotes the number, in particular respectively the presence or absence, of spacers ($X_b$); xb can be, in particular, 1 or 0, for example 1. The polymer-backbone-forming unit -[$A_b$]- can be embodied, for example, as explained in conjunction with the polymer-backbone-forming unit -[A]-. The spacer ($X_b$) can be embodied, for example, as explained in conjunction with the spacer X. R20, R21, and/or R22 can likewise be embodied, for example, as explained above.

$Z^-$ can denote in this context, in particular, perchlorate and/or trifluoromethanesulfonate and/or tetrafluoroborate and/or bisoxalatoborate and/or hexafluorophosphate and/or bis(trifluoromethanesulfonylimide) and/or difluorooxalatoborate and/or bromide and/or iodide and/or chloride.

($X_b$) can denote in this context, in particular, an, in particular saturated or unsaturated, linear or branched, for example partly or completely halogenated, in particular fluorinated, alkylene spacer, for example of the general chemical formula: —$(CH_2)_{a1}$— where 1≤a1≤12, for instance where 1≤a1≤3, and/or an, in particular saturated or unsaturated, linear or branched, for example partly or completely halogenated, in particular fluorinated, alkylene oxide spacer, in particular ethylene oxide spacer, for example having the general chemical formula: —$CH_2$—[$CH_2$—$CH_2$—$O]_{b1}$—$CH_2$— where 1≤b1≤10, for instance 1≤b1≤4, and/or a further positively charged group, for instance a pyridinium group and/or a quaternary ammonium group, and/or a phenylene group, for example a phenylene group substituted with at least an alkyl group and/or with an alkylene oxide group and/or with an alkoxy group and/or with a further positively charged group, for instance with a quaternary ammonium group, and/or a benzylene group, for example a benzylene group substituted with at least an alkyl group and/or with an alkylene oxide group and/or with an alkoxy group and/or with a further positively charged group, for instance with a quaternary ammonium group, and/or a ketone group, for example alkylcarbonyl group.

R20, R21, and R22 can denote in this context, for example, mutually independently in each case, hydrogen or an, in particular saturated or unsaturated, linear or branched, for example partly or completely halogenated, in particular fluorinated, alkyl group, for example of the general chemical formula: —$(CH_2)_{a1*}$—$CH_3$ where 1≤a1*≤15, for instance 1≤a1*≤3 and/or 8≤a1*≤12, for example a methyl group or an ethyl group, and/or an, in particular saturated or unsaturated, linear or branched, for example partly or completely halogenated, in particular fluorinated, alkylene oxide group, for example an ethylene oxide group, in particular an oligoalkylene oxide group, for instance an oligoethylene oxide group, in particular having ≥1 to ≤10 repeating units, for example having ≥1 or ≥2 to ≤5 repeating units, and/or a further positively charged group, for instance a pyridinium group and/or a quaternary ammonium group, and/or a phenylene group, for example a phenylene group substituted with at least an alkyl group and/or with an alkylene oxide group and/or with an alkoxy group and/or with a further positively charged group, for instance with a quaternary ammonium group, and/or a benzylene group, for example a benzylene group substituted with at least an alkyl group and/or with an alkylene oxide group and/or with an alkoxy group and/or with a further positively charged group, for instance with a quaternary ammonium group, and/or a ketone group, for example alkylcarbonyl group. For instance, at least two of the residues R20, R21, and R22, where applicable all the residues R20, R21, and R22, can in this context denote different groups, for example alkyl groups and/or oligoalkylene oxide groups, for instance having a different length and/or substitution and/or degree of saturation and/or degree of branching and/or degree of halogenation, in particular degree of fluorination.

In the context of a special embodiment R20 and R21 denote identical or different, in particular saturated, alkyl groups having a chain length from $\geq 1$ to $\leq 4$ carbon atoms, for example a methyl group, and R22 denotes an, in particular saturated, alkyl group having a chain length from $\geq 9$ to $\leq 13$ carbon atoms, for example an undecyl group ($-C_{11}H_{23}$)—.

Examples of such embodiments are:

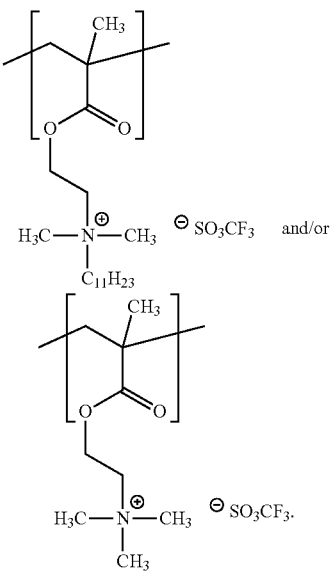

In the context of a further, alternative or additional embodiment the at least one polymer electrolyte or the at least one polymer respectively encompasses at least one imidazolium-based repeating unit of the general chemical formula:

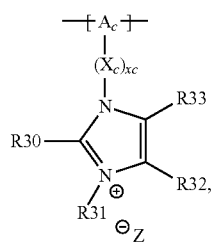

where $-[A_c]-$ denotes a polymer-backbone-forming unit $-[A]-$. $(X_c)$ here denotes a spacer, and xc denotes the number, in particular respectively the presence or absence, of spacers $(X_c)$; xc can be, in particular, 1 or 0, for example 1. The polymer-backbone-forming unit $-[A_c]-$ can be embodied, for example, as explained in conjunction with the polymer-backbone-forming unit $-[A]-$. The spacer $(X_c)$ can be embodied, for example, as explained in conjunction with the spacer X. R30, R31, R32, and/or R33 can likewise be embodied, for example, as explained above.

$Z^-$ can denote in this context, in particular, perchlorate and/or trifluoromethanesulfonate and/or tetrafluoroborate and/or bisoxalatoborate and/or hexafluorophosphate and/or bis(trifluoromethanesulfonylimide) and/or difluorooxalatoborate and/or bromide and/or iodide and/or chloride.

$(X_c)$ can denote in this context, in particular, an, in particular saturated or unsaturated, linear or branched, for example partly or completely halogenated, in particular fluorinated, alkylene spacer, for example of the general chemical formula: $-(CH_2)_{a1}-$ where $1 \leq a1 \leq 12$, for instance where $3 \leq a1 \leq 5$, and/or an, in particular saturated or unsaturated, linear or branched, for example partly or completely halogenated, in particular fluorinated, alkylene oxide spacer, in particular ethylene oxide spacer, in particular having $\geq 1$ or $\geq 2$ to $\leq 10$ repeating units, for example having $\geq 1$ or $\geq 2$ to $\leq 4$ repeating units, for instance of the general chemical formula: $-CH_2-[CH_2-CH_2-O]_{b1}-CH_2-$ where $1 \leq b1 \leq 10$, for example where $1 \leq b1 \leq 4$, and/or of the general chemical formula: $-CH_2-[CH_2-CH_2-O]_b$ where $1 \leq b \leq 10$, for example where $2 \leq b \leq 4$, and/or a further positively charged group, for instance a pyridinium group and/or a quaternary ammonium group, and/or a phenylene group, for example a phenylene group substituted with at least an alkyl group and/or with an alkylene oxide group and/or with an alkoxy group and/or with a further positively charged group, for instance with a quaternary ammonium group, and/or a benzylene group, for example a benzylene group substituted with at least an alkyl group and/or with an alkylene oxide group and/or with an alkoxy group and/or with a further positively charged group, for instance with a quaternary ammonium group, for example of the general chemical formula:

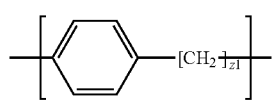

where $1 \leq z1 \leq 4$, and/or a ketone group, for example alkylcarbonyl group.

R30, R32, and/or R33 can denote in this context, for example, mutually independently in each case, hydrogen or an, in particular saturated or unsaturated, linear or branched, for example partly or completely halogenated, in particular fluorinated, alkyl group, for example of the general chemical formula: $-(CH_2)_{a1*}-CH_3$ where $0$ or $1 \leq$ or $2 \leq a1^* \leq 15$, for instance where $0 \leq$ or $1$ or $2 \leq a1^* \leq 4$, and/or an, in particular saturated or unsaturated, linear or branched, for example partly or completely halogenated, in particular fluorinated, alkylene oxide group, for example an ethylene oxide group, in particular an oligoalkylene oxide group, for instance an oligoethylene oxide group, in particular having $\geq 1$ to $\leq 10$ repeating units, for example having $\geq 1$ or $\geq 2$ to $\leq 5$ repeating units, and/or a further positively charged group, for instance a pyridinium group and/or a quaternary ammonium group, and/or a phenylene group, for example a phenylene group substituted with at least an alkyl group and/or with an alkylene oxide group and/or with an alkoxy group and/or with a further positively charged group, for instance with a quaternary ammonium group, and/or a benzylene group, for example a benzylene group substituted with at least an alkyl group and/or with an alkylene oxide group and/or with an alkoxy group and/or with a further positively charged group, for instance with a quaternary ammonium group, and/or a ketone group, for example alkylcarbonyl group. For instance, at least two, in particular at least three, of the residues R30, R31, R32, and R33, where applicable all the residues R30, R31, R32, and R33, can in this context denote different groups, for example alkyl groups and/or oligoalkylene oxide groups, for instance having a different length and/or substitution and/or degree of saturation and/or degree of branching and/or degree of halogenation, in particular degree of fluorination. In particular, R30, R31, R32, and R33 can denote, mutually independently in each case, hydrogen or a methyl group or an alkyl group having a chain length from $\geq 2$ to $\leq 15$ carbon atoms, for example from $\geq 2$ to $\leq 4$ carbon atoms. R31 can denote in particular a methyl group.

In the context of a further, alternative or additional embodiment the at least one polymer electrolyte or the at least one polymer respectively encompasses at least one piperidinium-based repeating unit of the general chemical formula:

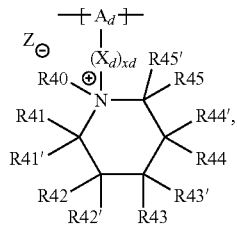

where $-[A_d]-$ denotes a polymer-backbone-forming unit $-[A]-$. $(X_d)$ here denotes a spacer, and xd denotes the number, in particular respectively the presence or absence, of spacers $(X_d)$; xd can be, in particular, 1 or 0, for example 1. The polymer-backbone-forming unit $-[A_d]-$ can be embodied, for example, as explained in conjunction with the polymer-backbone-forming unit $-[A]-$. The spacer $(X_d)$ can be embodied, for example, as explained in conjunction with the spacer X. R40, R41, R41', R42, R42', R43, R43', R44, R44', R45, and/or R45' can likewise be embodied, for example, as explained above.

$Z^-$ can denote in this context, in particular, perchlorate and/or trifluoromethanesulfonate and/or tetrafluoroborate and/or bisoxalatoborate and/or hexafluorophosphate and/or bis(trifluoromethanesulfonylimide) and/or difluorooxalatoborate and/or bromide and/or iodide and/or chloride.

$(X_d)$ can denote in this context, in particular, an, in particular saturated or unsaturated, linear or branched, for example partly or completely halogenated, in particular fluorinated, alkylene spacer, for example of the general chemical formula: $-(CH_2)_{a1}-$ where $1 \leq a1 \leq 15$, for instance where $3 \leq a1 \leq 5$, and/or an, in particular saturated or unsaturated, linear or branched, for example partly or completely halogenated, in particular fluorinated, alkylene oxide spacer, in particular ethylene oxide spacer, in particular having $\geq 1$ or $\geq 2$ to $\leq 10$ repeating units, for example having $\geq 1$ or $\geq 2$ to $\leq 4$ repeating units, for instance of the general chemical formula: $-CH_2-[CH_2-CH_2-O]_{b1}-CH_2-$ where $1 \leq b1 \leq 10$, for example where $2 \leq b1 \leq 4$, and/or of the general chemical formula: $-CH_2-[CH_2-CH_2-O]_b-$ where $1 \leq b \leq 10$, for example where $2 \leq b \leq 4$, and/or a further positively charged group, for instance a further pyridinium group and/or a quaternary ammonium group, and/or a phenylene group, for example a phenylene group substituted with at least an alkyl group and/or with an alkylene oxide group and/or with an alkoxy group and/or with a further positively charged group, for instance with a quaternary ammonium group, and/or a benzylene group, for example a benzylene group substituted with at least an alkyl group and/or with an alkylene oxide group and/or with an alkoxy group and/or with a further positively charged group, for instance with a quaternary ammonium group, and/or a ketone group, for example alkylcarbonyl group. In particular, the spacer X can be a saturated alkyl spacer having a chain length from $\geq 1$ to $\leq 15$ carbon atoms, for example from $\geq 3$ to $\leq 5$ carbon atoms.

R40, R41, R41', R42, R42', R43, R43', R44, R44', R45, and/or R45' can denote in this context, for example, mutually independently in each case, hydrogen or an, in particular saturated or unsaturated, linear or branched, for example partly or completely halogenated, in particular fluorinated, alkyl group, for example of the general chemical formula: $-(CH_2)_{a1*}-CH_3$ where $0 \leq$ or 1 or $2 \leq a1* \leq 15$, for instance where $0 \leq$ or 1 or $\leq 2 \leq a1* \leq 4$, and/or an, in particular saturated or unsaturated, linear or branched, for example partly or completely halogenated, in particular fluorinated, alkylene oxide group, for example an ethylene oxide group, in particular an oligoalkylene oxide group, for instance an oligoethylene oxide group, in particular having $\geq 1$ to $\leq 10$ repeating units, for example having $\geq 1$ or $\geq 2$ to $\leq 5$ repeating units, and/or a further positively charged group, for instance a pyridinium group and/or a quaternary ammonium group, and/or a phenylene group, for example a phenylene group substituted with at least an alkyl group and/or with an alkylene oxide group and/or with an alkoxy group and/or with a further positively charged group, for instance with a quaternary ammonium group, and/or a benzylene group, for example a benzylene group substituted with at least an alkyl group and/or with an alkylene oxide group and/or with an alkoxy group and/or with a further positively charged group, for instance with a quaternary ammonium group, and/or a ketone group, for example alkylcarbonyl group. For instance, at least two, in particular at least three, of the residues R40, R41, R41', R42, R42', R43, R43', R44, R44', R45, and/or R45', where applicable all the residues R40, R41, R41', R42, R42', R43, R43', R44, R44', R45, and/or R45', can in this context denote different groups, for example alkyl groups and/or oligoalkylene oxide groups, for instance having a different length and/or substitution and/or degree of saturation and/or degree of branching and/or degree of halogenation, in particular degree of fluorination. In particular, R40, R41, R41', R42, R42', R43, R43', R44, R44', R45, and/or R45' can denote, mutually independently in each case, hydrogen or a methyl group or an alkyl group having a chain length from $\geq 2$ to $\leq 15$ carbon atoms, for example from $\geq 2$ to $\leq 4$ carbon atoms. R41, R41', R42, R42', R43, R43', R44, R44', R45, and/or R45' can denote in particular hydrogen. R40 can denote in particular a methyl group.

In the context of a further, alternative or additional embodiment the at least one polymer electrolyte or the at least one polymer respectively encompasses at least one pyrrolidinium-based repeating unit of the general chemical formula:

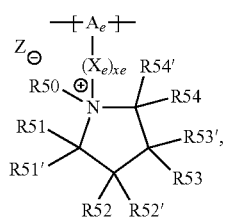

where -[$A_e$]- denotes a polymer-backbone-forming unit -[A]-. ($X_e$) here denotes a spacer, and xe denotes the number, in particular respectively the presence or absence, of spacers ($X_e$); xe can be, in particular, 1 or 0, for example 1. The polymer-backbone-forming unit -[$A_e$]- can be embodied, for example, as explained in conjunction with the polymer-backbone-forming unit -[A]-. The spacer ($X_e$) can be embodied, for example, as explained in conjunction with the spacer X. R50, R51, R51', R52, R52', R53, R53', R54, and/or R54' can likewise be embodied, for example, as explained above.

$Z^-$ can denote in this context, in particular, perchlorate and/or trifluoromethanesulfonate and/or tetrafluoroborate and/or bisoxalatoborate and/or hexafluorophosphate and/or bis(trifluoromethanesulfonylimide) and/or difluorooxalatoborate and/or bromide and/or iodide and/or chloride.

($X_e$) can denote, in particular, an, in particular saturated or unsaturated, linear or branched, for example partly or completely halogenated, in particular fluorinated, alkylene spacer, for example of the general chemical formula: —(CH$_2$)$_{a1}$— where 1≤a1≤15, for instance where 3≤a1≤5, and/or an, in particular saturated or unsaturated, linear or branched, for example partly or completely halogenated, in particular fluorinated, alkylene oxide spacer, in particular ethylene oxide spacer, in particular having ≥1 or ≥2 to ≤10 repeating units, for example having ≥1 or ≥2 to ≤4 repeating units, for instance of the general chemical formula: —CH$_2$—[CH$_2$—CH$_2$—O]$_{b1}$—CH$_2$— where 1≤b1≤10, for example where 2≤b1≤4, and/or of the general chemical formula: —CH$_2$—[CH$_2$—CH$_2$—O]$_b$ where 1≤b≤10, for example where 2≤b≤4, and/or a further positively charged group, for instance a pyridinium group and/or a quaternary ammonium group, and/or a phenylene group, for example a phenylene group substituted with at least an alkyl group and/or with an alkylene oxide group and/or with an alkoxy group and/or with a further positively charged group, for instance with a quaternary ammonium group, and/or a benzylene group, for example a benzylene group substituted with at least an alkyl group and/or with an alkylene oxide group and/or with an alkoxy group and/or with a further positively charged group, for instance with a quaternary ammonium group, and/or a ketone group, for example alkylcarbonyl group. In particular, the spacer X can be a saturated alkyl spacer having a chain length from ≥1 to ≤15 carbon atoms, for example from ≥3 to ≤5 carbon atoms.

R50, R51, R51', R52, R52', R53, R53', R54, and/or R54' can denote in this context, for example, mutually independently in each case, hydrogen or an, in particular saturated or unsaturated, linear or branched, for example partly or completely halogenated, in particular fluorinated, alkyl group, for example of the general chemical formula: —(CH$_2$)$_{a1*}$—CH$_3$ where 0≤ or 1≤ or 2≤a1*≤15, for instance where 0≤ or 1 [≤] or ≤2≤a1*≤4, and/or an, in particular saturated or unsaturated, linear or branched, for example partly or completely halogenated, in particular fluorinated, alkylene oxide group, for example an ethylene oxide group, in particular an oligoalkylene oxide group, for instance an oligoethylene oxide group, in particular having ≥1 to ≤10 repeating units, for example having ≥1 or ≥2 to ≤5 repeating units, and/or a further positively charged group, for instance a pyridinium group and/or a quaternary ammonium group, and/or a phenylene group, for example a phenylene group substituted with at least an alkyl group and/or with an alkylene oxide group and/or with an alkoxy group and/or with a further positively charged group, for instance with a quaternary ammonium group, and/or a benzylene group, for example a benzylene group substituted with at least an alkyl group and/or with an alkylene oxide group and/or with an alkoxy group and/or with a further positively charged group, for instance with a quaternary ammonium group, and/or a ketone group, for example alkylcarbonyl group. For instance, at least two, in particular at least three, of the residues R50, R51, R51', R52, R52', R53, R53', R54, and/or R54', if applicable all the residues R50, R51, R51', R52, R52', R53, R53', R54, and/or R54', can in this context denote different groups, for example alkyl groups and/or oligoalkylene oxide groups, for instance having a different length and/or substitution and/or degree of saturation and/or degree of branching and/or degree of halogenation, in particular degree of fluorination. In particular, R50, R51, R51', R52, R52', R53, R53', R54, and/or R54' can denote, mutually independently in each case, hydrogen or a methyl group or an alkyl group having a chain length from ≥2 to ≤15 carbon atoms, for example from ≥2 to ≤4 carbon atoms. R51, R51', R52, R52', R53, R53', R54, and/or R54' can denote in particular hydrogen. R50 can denote in particular a methyl or an ethyl group.

In the context of a further, alternative or additional embodiment the at least one polymer electrolyte or the at least one polymer respectively encompasses at least one phosphonium-based repeating unit of the general chemical formula:

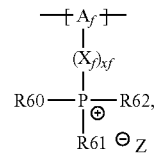

where -[$A_f$]- denotes a polymer-backbone-forming unit. ($X_f$) here denotes a spacer, and xf denotes the quantity, in particular respectively the presence or absence, of the spacer ($X_f$); xf can be, in particular, 1 or 0, for example 1. The polymer-backbone-forming unit -[$A_f$]- can be embodied, for example, as explained in conjunction with the polymer-backbone-forming unit -[A]-. The spacer ($X_f$) can be embodied, for example, as explained in conjunction with the spacer X. R60, R61, and/or R62 can likewise be embodied, for example, as explained above.

$Z^-$ can denote in this context, in particular, perchlorate and/or trifluoromethanesulfonate and/or tetrafluoroborate and/or bisoxalatoborate and/or hexafluorophosphate and/or bis(trifluoromethanesulfonylimide) and/or difluorooxalatoborate and/or bromide and/or iodide and/or chloride.

($X_f$) can denote in this context, in particular, an, in particular saturated or unsaturated, linear or branched, for example partly or completely halogenated, in particular fluorinated, alkylene spacer, for example of the general chemical formula: —(CH$_2$)$_{a1}$—where 1≤a1≤15, for instance where 2≤a1≤8, and/or an, in particular saturated or unsaturated, linear or branched, for example partly or completely halogenated, in particular fluorinated, alkylene oxide spacer, in particular ethylene oxide spacer, in particular having ≥1 or ≥2 to ≤10 repeating units, for example having ≥1 or ≥2 to ≤4 repeating units, for instance of the general chemical formula: —$CH_2$—[$CH_2$—$CH_2$—O]$_{b1}$—$CH_2$— where 1≤b1≤10, for example where 2≤b1≤4, and/or of the general chemical formula: —$CH_2$—[$CH_2$—$CH_2$—O]$_b$ where 1≤b≤10, for example where 2≤b≤4, and/or a further positively charged group, for instance a pyridinium group and/or a quaternary ammonium group, and/or a phenylene group, for example a phenylene group substituted with at least an alkyl group and/or with an alkylene oxide group and/or with an alkoxy group and/or with a further positively charged group, for instance with a quaternary ammonium group, and/or a benzylene group, for example a benzylene group substituted with at least an alkyl group and/or with an alkylene oxide group and/or with an alkoxy group and/or with a further positively charged group, for instance with a quaternary ammonium group, and/or a ketone group, for example alkylcarbonyl group. In particular, the spacer X can be a saturated alkyl spacer having a chain length from ≥1 to ≤16 carbon atoms, for example from ≥3 to ≤9 carbon atoms.

R60, R61, and R61 can denote in this context, for example, mutually independently in each case, hydrogen or an, in particular saturated or unsaturated, linear or branched, for example partly or completely halogenated, in particular fluorinated, alkyl group, for example of the general chemical formula: —$(CH_2)_{a1*}$—$CH_3$ where 0≤ or 1≤ or ≤2 a1*≤15, for instance where 0≤ or 1 [≤] or ≤2≤a1*≤4, and/or an, in particular saturated or unsaturated, linear or branched, for example partly or completely halogenated, in particular fluorinated, alkylene oxide group, for example an ethylene oxide group, in particular an oligoalkylene oxide group, for instance an oligoethylene oxide group, in particular having ≥1 to ≤10 repeating units, for example having ≥1 or ≥2 to ≤5 repeating units, and/or a further positively charged group, for instance a pyridinium group and/or a quaternary ammonium group, and/or a phenylene group, for example a phenylene group substituted with at least an alkyl group and/or with an alkylene oxide group and/or with an alkoxy group and/or with a further positively charged group, for instance with a quaternary ammonium group, and/or a benzylene group, for example a benzylene group substituted with at least an alkyl group and/or with an alkylene oxide group and/or with an alkoxy group and/or with a further positively charged group, for instance with a quaternary ammonium group, and/or a ketone group, for example alkylcarbonyl group. For instance, at least two of the residues R60, R61, and R61', where applicable all the residues R60, R61, and R61', can in this context denote different groups, for example alkyl groups and/or oligoalkylene oxide groups, for instance having a different length and/or substitution and/or degree of saturation and/or degree of branching and/or degree of halogenation, in particular degree of fluorination. In particular, R60, R61, and R61' can denote, mutually independently in each case, an alkyl group having a chain length from ≥1 to ≤16 carbon atoms, for example from ≥3 to ≤carbon atoms.

In the context of a further, alternative or additional embodiment the at least one polymer electrolyte or the at least one polymer respectively encompasses at least one repeating unit, based on a benzenesulfonate, of the general chemical formula:

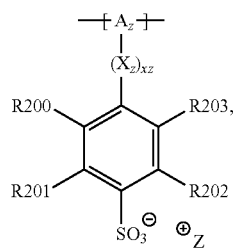

where -[$A_Z$]- denotes a polymer-backbone-forming unit -[A]-. ($X_Z$) here denotes a spacer, and xz denotes the quantity, in particular respectively the presence or absence, of the spacer ($X_Z$); xz can be, in particular, 1 or 0, for example 1. The polymer-backbone-forming unit -[$A_Z$]- can be embodied, for example, as explained in conjunction with the polymer-backbone-forming unit -[A]-. The spacer ($X_Z$) can be embodied, for example, as explained in conjunction with the spacer X. R200, R201, R202, and/or R203 can likewise be embodied, for example, as explained above.

$Z^+$ can denote in this context, in particular, a cation, in particular metal cation, for example alkali ion, for instance lithium ion and/or sodium ion, in particular lithium ion ($Li^+$).

($X_Z$) can denote in this context, in particular, an, in particular saturated or unsaturated, linear or branched, for example partly or completely halogenated, in particular fluorinated, alkylene spacer, for example of the general chemical formula: —$(CH_2)_{a1}$— where 1≤a1≤15, for instance where 1≤a1≤3, and/or an, in particular saturated or unsaturated, linear or branched, for example partly or completely halogenated, in particular fluorinated, alkylene oxide spacer, in particular ethylene oxide spacer, in particular having ≥1 or ≥2 to ≤10 repeating units, for example having ≥1 or ≥2 to ≤4 repeating units, for instance of the general chemical formula: —$CH_2$—[$CH_2$—$CH_2$—O]$_{b1}$—$CH_2$— where 1≤b1≤10, for example where 2≤b1≤4, and/or of the general chemical formula: —$CH_2$—[$CH_2$—$CH_2$—O]$_b$ where 1≤b≤10, for example where 2≤b≤4, and/or —$(CH_2)_{a2}$—O—[$CH_2$—$CH_2$—O]$_{b2}$—$(CH_2)_{a2'}$— where 1≤a2≤3, 1≤b2≤10, in particular 1≤b2≤4, and 1≤a2'≤3, and/or a further lithium sulfonate group and/or a phenylene group, for example a phenylene group substituted with at least one lithium sulfonate group (phenylene/sulfonate unit), and/or a benzylene group, for example a benzylene group substituted with at least one lithium sulfonate group, and/or a ketone group, for example alkylcarbonyl group, and/or an ether oxygen.

R200, R201, R202, and/or R203 can denote in this context, for example, mutually independently in each case, hydrogen or an, in particular saturated or unsaturated, linear or branched, for example partly or completely halogenated, in particular fluorinated, alkyl group, for example of the general chemical formula: —$(CH_2)_{a1*}$—$CH_3$ where 0≤ or 1≤a1*≤15, for instance where 1≤a1*≤2, and/or an, in particular saturated or unsaturated, linear or branched, for example partly or completely halogenated, in particular fluorinated, alkylene oxide group, for example an ethylene oxide group, in particular an oligoalkylene oxide group, for instance an oligoethylene oxide group, in particular having ≥1 to ≤10 repeating units, for example having ≥1 or ≥2 to ≤5 repeating units, and/or a further negatively charged group, for example lithium sulfonate group, and/or a phenylene group, for example a phenylene group substituted with at least one negative group, for example lithium sulfonate group, and/or a benzylene group, for example a benzylene group substituted with at least one negative group, for example lithium sulfonate group, and/or a ketone group, for example alkylcarbonyl group. For instance, at least two of the residues R200, R201, R202, and R203, where applicable all the residues R200, R201, R202, and R203, can in this context denote different groups, for example alkyl groups and/or oligoalkylene oxide groups, for instance having a different length and/or substitution and/or degree of saturation and/or degree of branching and/or degree of halogenation, in particular degree of fluorination. In particular, R200, R201, R202, and R203 can denote, mutually independently in each case, hydrogen or a lithium sulfonate group or an alkyl group, in particular substituted with at least one lithium sulfonate group, having a chain length from $\geq 1$ to $\leq 15$ carbon atoms, for example from $\geq 1$ to $\leq 2$ carbon atoms, for example of the general chemical formula: $-(CH_2)_{s1}-SO_3Li$ where $0 \leq s1 \leq 15$, for example where $0 \leq s1 \leq 2$. In particular, R200, R201, R202, and R203 can denote, mutually independently in each case, hydrogen, an, in particular saturated, for example partly or completely, sulfonated and/or halogenated, in particular fluorinated, alkyl group having a chain length from $\geq 1$ to $\leq 16$ carbon atoms, for example from 1 or 2 to $\leq 4$ carbon atoms, and/or a, for example partly or completely, sulfonated and/or halogenated, in particular fluorinated, alkylene oxide group, in particular an oligoalkylene oxide group, for instance an oligoethylene oxide group.

In particular, R200, R201, R202, and/or R203 can be substituted with at least one sulfonate group, in particular lithium sulfonate group.

In the context of a further, alternative or additional embodiment the at least one polymer electrolyte or the at least one polymer respectively encompasses at least one repeating unit, based on a trifluoromethanesulfonylimide benzene group, of the general chemical formula:

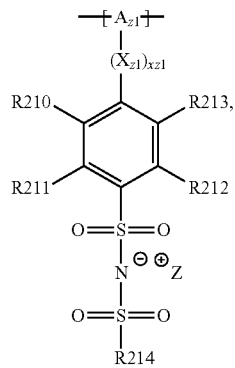

for example

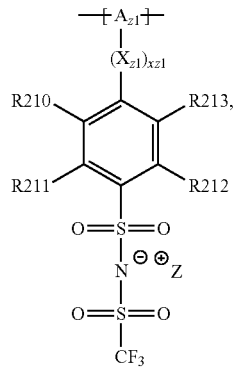

where $-[A_{Z1}]-$ denotes a polymer-backbone-forming unit. $(X_{Z1})$ here denotes a spacer, and xz1 denotes the quantity, in particular respectively the presence or absence, of the spacer $(X_{Z1})$; xz1 can be, in particular, 1 or 0, for example 1. The polymer-backbone-forming unit $-[A_{Z1}]-$ can be embodied, for example, as explained in conjunction with the polymer-backbone-forming unit $-[A]-$. The spacer $(X_{Z1})$ can be embodied, for example, as explained in conjunction with the spacer X. R210, R211, R212, [R]213, and/or R214 can likewise be embodied, for example, as explained above.

$Z^+$ can denote in this context, in particular, a cation, in particular metal cation, for example alkali ion, for instance lithium ion and/or sodium ion, in particular lithium ion $(Li^+)$. $(X_{Z1})$ can denote in this context, in particular, an, in particular saturated or unsaturated, linear or branched, for example partly or completely halogenated, in particular fluorinated, alkylene spacer, for example of the general chemical formula: $-(CH_2)_{a1}-$ where $1 \leq a1 \leq 15$, for instance where $1 \leq a1 \leq 3$, and/or an, in particular saturated or unsaturated, linear or branched, for example partly or completely halogenated, in particular fluorinated, alkylene oxide spacer, in particular ethylene oxide spacer, in particular having $\geq 1$ or $\geq 2$ to $\leq 10$ repeating units, for example having $\geq 1$ or $\geq 2$ to $\leq 4$ repeating units, for instance of the general chemical formula: $-CH_2-[CH_2-CH_2-O]_{b1}-CH_2-$ where $1 \leq b1 \leq 10$, for example where $2 \leq b1 \leq 4$, and/or of the general chemical formula: $-CH_2-[CH_2-CH_2-O]_b$ where $1 \leq b \leq 10$, for example where $2 \leq b \leq 4$, and/or $-(CH_2)_{a2}-O-[CH_2-CH_2-O]_{b2}-(CH_2)_{a2}'-$ where $1 \leq a2 \leq 3$, $1 \leq b2 \leq 10$, in particular $1 \leq b2 \leq 4$, and $1 \leq a2' \leq 3$, and/or a further lithium trifluoromethanesulfonylimide benzene group and/or a phenylene group, for example a phenylene group substituted with at least one lithium trifluoromethanesulfonylimide benzene group (phenylene-bis(trifluoromethanesulfonylimide benzene) unit), and/or a benzylene group, for example a benzylene group substituted with at least one lithium trifluoromethanesulfonylimide benzene group, and/or a ketone group, for example alkylcarbonyl group, and/or an ether oxygen.

R210, R211, R212, [R]213, and R214 can denote in this context, for example, mutually independently in each case, hydrogen or an, in particular saturated or unsaturated, linear or branched, for example partly or completely halogenated, in particular fluorinated, alkyl group, for example of the general chemical formula: $-(CH_2)_{a1*}-CH_3$ where $0 \leq$ or $1 \leq a1* \leq 15$, for example where $1 \leq a1* \leq 2$, and/or an, in particular saturated or unsaturated, linear or branched, for example partly or completely halogenated, in particular fluorinated, alkylene oxide group, for example an ethylene oxide group, in particular an oligoalkylene oxide group, for instance an oligoethylene oxide group, in particular having $\geq 1$ to $\leq 10$ repeating units, for example having $\geq 1$ or $\geq 2$ to $\leq 5$ repeating units, and/or a further lithium trifluoromethanesulfonylimide benzene group, and/or a phenylene group, for example a phenylene group substituted with at least one lithium trifluoromethanesulfonylimide benzene group, and/or a benzylene group, for example a benzylene group, for example a benzylene group substituted with at least one lithium trifluoromethanesulfonylimide benzene group, and/or a ketone group, for example alkylcarbonyl group. For instance, at least two of the residues R210, R211, R212, [R]213, and R214, where applicable all the residues R210, R211, R212, [R]213, and R214, can in this context denote different groups, for example alkyl groups and/or oligoalkylene oxide groups, for instance having a different length and/or substitution and/or degree of saturation and/or degree of branching and/or degree of halogenation, in particular degree of fluorination. In particular, R210, R211, R212, [R]213, and R214 can denote, mutually independently in each case, hydrogen or a lithium trifluoromethanesulfonylimide benzene group or an alkyl group, in particular substituted with at least one lithium trifluoromethanesulfonylimide benzene group, having a chain length from ≥1 to ≤15 carbon atoms, for example from ≥1 to ≤2 carbon atoms, for example of the general chemical formula: —(CH$_2$)$_{s2}$—SO$_3$NSO$_2$CF$_3$Li where 0≤s2≤15, for example where 0≤s2≤2. In particular, R210, R211, R212, [R]213, and R214 can denote, mutually independently in each case, hydrogen, an, in particular saturated, for example partly or completely, bis(trifluoromethanesulfonyl)imide-substituted and/or halogenated, in particular fluorinated, alkyl group having a chain length from ≥1 to ≤16 carbon atoms, for example from ≥1 or ≥2 to ≤4 carbon atoms, and/or a, for example partly or completely, bis(trifluoromethanesulfonyl)imide-substituted and/or halogenated, in particular fluorinated, alkylene oxide group, in particular an oligoalkylene oxide group, for instance an oligoethylene oxide group.

In particular, R210, R211, R212, [R]213, and R214 can be implemented in the form of a further sulfonylimide group, for example trifluoromethanesulfonylimide, in particular lithium trifluoromethanesulfonylimide group.

In particular, the polymer backbone -[A$_Z$]- or -[A$_{Z1}$]- can respectively denote a phenylene unit, in particular of a polyphenylene, for example of a para-polyphenylene, for example having an ether function, for instance of the general chemical formula:

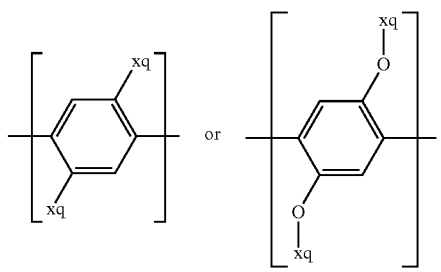

where in particular xq respectively characterizes the attachment site(s) or denotes XQ.

The polymer can comprise in this context, for example, at least one, for example unsubstituted, further phenylene unit and/or at least one further phenylene unit substituted with at least on lithium sulfonate group. For instance, the polymer backbone -[A$_Z$]- or -[A$_{Z1}$]- can denote a phenylene unit of the general chemical formula:

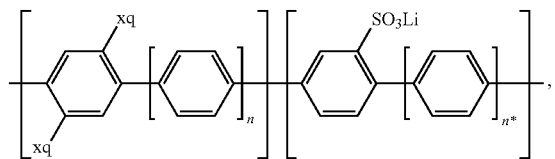

where n and n* denote the number of repetitions of the unsubstituted phenylene unit and, for example, 0≤n≤3 and 0≤n*≤3, in particular where xq respectively characterizes the attachment site(s) or denotes XQ.

In the context of a further, alternative or additional, special embodiment, the polymer, in particular the at least one first repeating unit -[A$_1$]-, encompasses or is based on a repeating unit, based on a singly or multiply sulfonated polyphenylene, of the general chemical formula:

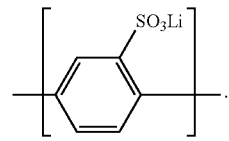

In the context of a further embodiment the at least one polymer electrolyte or the at least one polymer respectively encompasses at least one repeating unit of the general chemical formula:

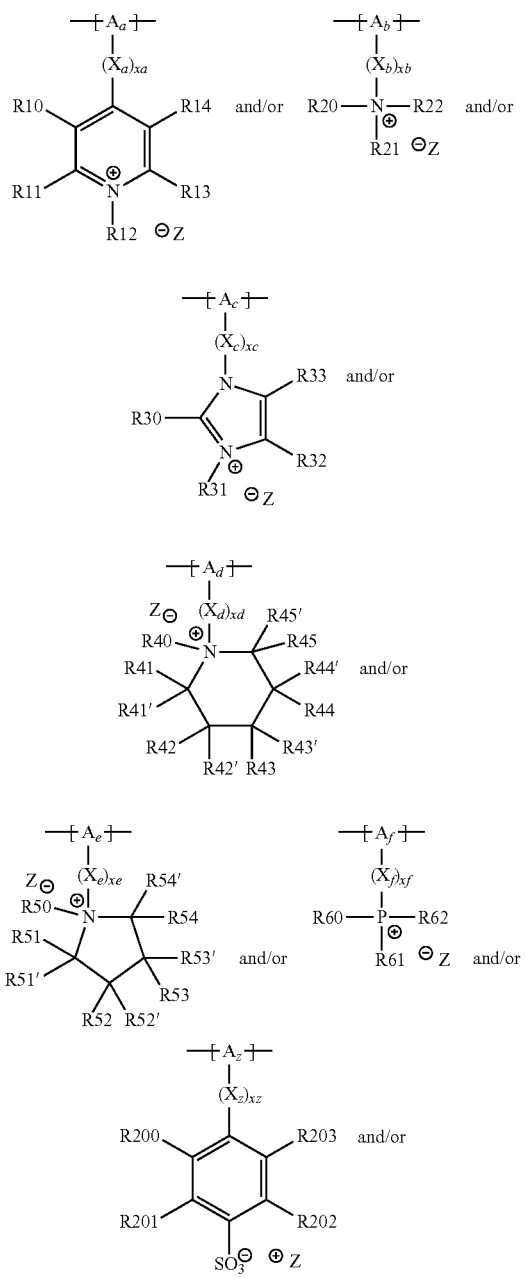

-continued

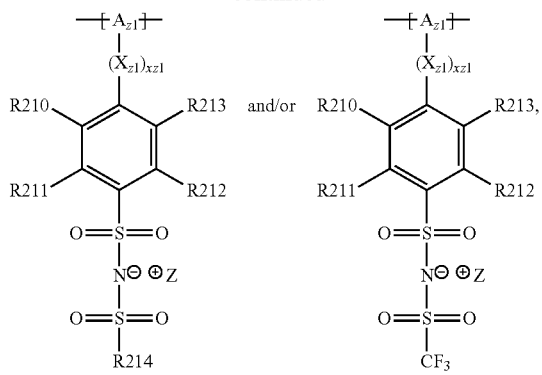

for example

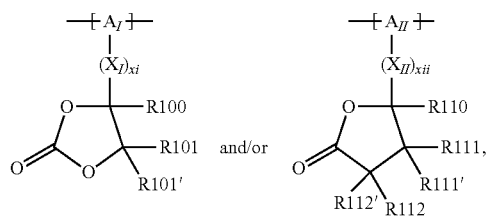

for example

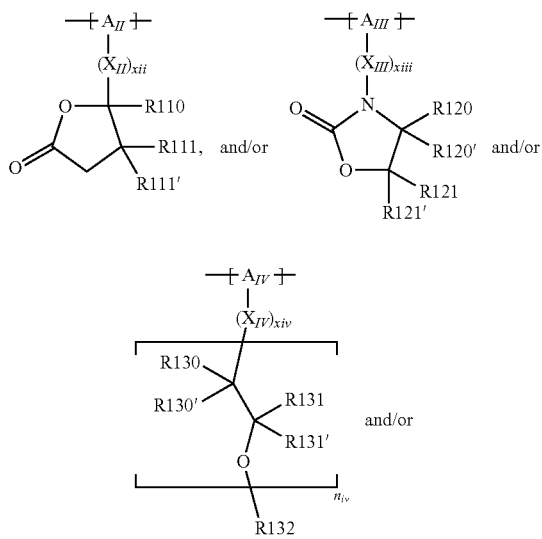

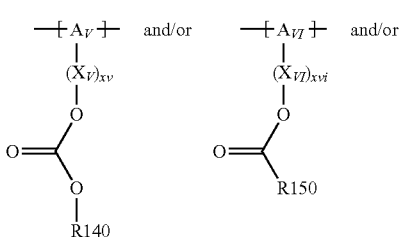

-continued

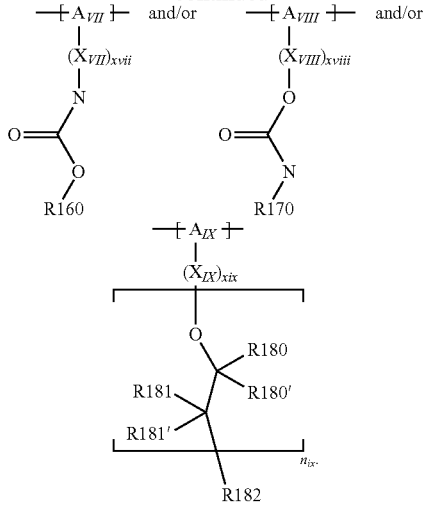

In this context, -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]- respectively denotes in particular a polymer-backbone-forming unit. ($X_I$), ($X_{II}$), ($X_{III}$), ($X_{IV}$), ($X_V$), ($X_{VI}$), ($X_{VII}$), ($X_{VIII}$), ($X_{IX}$), ($X_a$), ($X_b$) r, ($X_c$), ($X_d$), ($X_e$), ($X_f$), ($X_Z$), or ($X_{Z1}$) respectively denotes in this context, in particular, a spacer. xi, xii, xii, xiv, xv, xvi, xvii, xviii, xix, xa, xb, xc, xd, xe, xf, and xz denotes in this context the quantity, in particular the respective presence or absence, of the (respective) spacer. In particular, xi, xii, xii, xiv, xv, xvi, xvii, xviii, xix, xa, xb, xc, xd, xe, xf, and xz can respectively be 1 or 0, for example 1. In this context, $n_{IV}$ denotes the number of ethylene oxide units and is in particular $1 \leq n_{IV} \leq 15$, for example $2 \leq n_{IV} \leq 6$. In this context, $n_{IX}$ denotes the number of ethylene oxide units and is in particular $1 \leq n_{IX} \leq 15$, for example $2 \leq n_{IX} \leq 6$.

The polymer-backbone-forming unit -[$A_I$]-, -[$A_{II}$]-, -[$A_{III}$]-, -[$A_{IV}$]-, -[$A_V$], [$A_{VI}$]-, -[$A_{VII}$]-, -[$A_{VIII}$]-, -[$A_{IX}$], -[$A_a$]-, -[$A_b$]-, -[$A_c$]-, -[$A_d$]-, -[$A_e$]-, -[$A_f$]-, -[$A_Z$]-, or -[$A_{Z1}$]- can respectively be embodied, for example, as explained in conjunction with the polymer-backbone-forming unit -[A]-. The spacer ($X_I$), ($X_{II}$), ($X_{III}$), ($X_{IV}$), ($X_V$), ($X_{VI}$), ($X_{VII}$), ($X_{VIII}$), ($X_{IX}$), ($X_a$), ($X_b$), ($X_c$), ($X_d$), ($X_e$), ($X_f$), ($X_Z$), or ($X_{Z1}$) can be respectively embodied, for example, as explained in conjunction with the spacer X. R10, R11, R12, R13, R14, R20, R21, R22, R30, R31, R32, R33, R40, R41, R41', R42, R42', R43, R43', R44, R44', R45, R45', R50, R51, R51', R52, R52', R53, R53', R54, R54', R60, R61, R62, R100, R101, R101', R110, R111, R111', R112, R112', R120, R120', R121, R121', R130, R130', R131, R131', R132, R140, R150, R160, R170, R180, R180', R181, R181', R182, R200, R201, R202, R203, R210, R211, R212, [R]213, and/or R214 can likewise be respectively embodied, for example, as explained above.

The spacer ($X_I$), ($X_{II}$), ($X_{III}$), ($X_{IV}$), ($X_V$), ($X_{VI}$), ($X_{VII}$), ($X_{VIII}$), ($X_{IX}$), ($X_a$), ($X_b$), ($X_c$), ($X_d$), ($X_e$), ($X_f$), ($X_Z$) or ($X_{Z1}$) can in particular, as explained in conjunction with the spacer X, respectively encompass at least one alkylene oxide group, for example ethylene oxide group, in particular oligoalkylene oxide group, for example oligoethylene oxide group, or can be an alkylene oxide spacer, for example ethylene oxide spacer, in particular oligoalkylene oxide spacer, for example oligoethylene oxide spacer.

For example, the polymer-backbone-forming unit -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]- can respectively denote (at least) an alkylene oxide unit, in particular an ethylene oxide unit and/or propylene oxide unit, and/or an alkylene unit and/or a unit encompassing a carbonate group and/or a methacrylate unit and/or a methyl methacrylate unit and/or a siloxane unit and/or a phosphazene unit and/or a phenylene unit. For instance, the polymer-backbone-forming unit -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]- can respectively denote (at least) a siloxane unit and/or a phosphazene unit and/or a methacrylate unit and/or a methyl methacrylate unit and/or a phenylene unit. In particular, the polymer-backbone-forming unit -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]- can denote (at least) a siloxane unit and/or a phosphazene unit and/or a methacrylate unit and/or a methyl methacrylate unit.

R10, R11, R13, and/or R14, and R30, R32, and/or R33, and R41, R41', R42, R42', R43, R43', R44, R44', R45, and/or R45', and R51, R51', R52, R52', R53, R53', R54, and/or R54', and R200, R201, R202, and/or R203, and R210, R211, R212, [R]213, and/or R214, and R100, R101, and/or R101', and R110, R111, R111', R112, and/or R112', and R120, R120', R121, and/or R121', and R130, R130', R131, and/or R131', and R150, and R180, R180', R181, R181', and/or R182 can respectively denote, in particular mutually independently in each case, hydrogen and/or a halogen atom, in particular fluorine, and/or an alkyl group and/or an alkylene oxide group, in particular oligoalkylene oxide group, and/or an alkoxy group and/or a phenylene oxide group, in particular oligophenylene oxide group, and/or a phenoxy group and/or a phenylene group, in particular oligophenylene group, and/or a phenyl group and/or a benzylene group, in particular oligobenzylene group, and/or a benzyl group and/or a carbonyl group and/or an, in particular cyclic and/or acyclic, carbonate group, and/or an, in particular cyclic and/or acyclic, carboxylic acid ester group, in particular a lactone group, and/or an, in particular cyclic and/or acyclic, carbamate group, and/or a charged group, for example a positively charged group, in particular based on a cation of an ionic liquid, for instance a quaternary ammonium group and/or a quaternary phosphonium group, and/or a negatively charged group, in particular based on a conducting salt anion, in particular on a lithium conducting salt anion, and/or on an anion of an ionic liquid, in particular a sulfonylimide group, and/or a sulfonate group, for example a lithium sulfonate group and/or a lithium sulfonate group.

R12, and R20, R21 and R22, and R31, and R40, and R50, and R60, R61, and R62, and R132, and R140, and R160, and R170 can respectively, in particular mutually independently in each case, denote an alkyl group and/or an alkylene oxide group, in particular oligoalkylene oxide group, and/or an alkoxy group and/or a phenylene oxide group, in particular oligophenylene oxide group, and/or a phenoxy group and/or a phenylene group, in particular oligophenylene group, and/or a phenyl group and/or a benzylene group, in particular oligobenzylene group, and/or a benzyl group and/or a carbonyl group and/or an, in particular cyclic and/or acyclic, carbonate group, and/or an, in particular cyclic and/or acyclic, carboxylic acid ester group, and/or an, in particular cyclic and/or acyclic, carbamate group.

The at least one polymer electrolyte or the at least one polymer can respectively be both a homopolymer and a copolymer, for example a block copolymer, for instance a multi-block copolymer, and/or an alternating copolymer and/or a statistical copolymer. The cathode material or the at least one polymer electrolyte can, for example, respectively encompass or be both a homopolymer and several homopolymers and/or both a copolymer and several copolymers, and also a homopolymer/copolymer mixture.

In the context of an embodiment the at least one polymer electrolyte is a homopolymer, or the cathode material respectively encompasses at least one homopolymer, which encompasses at least one repeating unit of the general chemical formula:

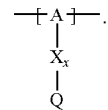

A, X, x, and Q here can be embodied as explained above. In particular, the homopolymer can encompass in this context one of the special repeating units explained above.

In the context of another embodiment the at least one polymer electrolyte is a copolymer, or the cathode material respectively encompasses at least one copolymer, for example a block copolymer, for instance a multi-block copolymer, and/or an alternating copolymer and/or a statistical copolymer, which encompasses at least one first repeating unit and at least one second repeating unit different from the at least one first repeating unit, the at least one first repeating unit having the general chemical formula:

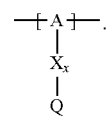

A, X, x, and Q here can be embodied as explained above. For example, the copolymer can encompass one of the special repeating units explained above. In particular, the at least one first repeating unit can respectively encompass or be one of the special repeating units explained above.

The at least one second repeating unit can be in this context, for example, any polymer-backbone-forming unit. For example, the at least one second repeating unit can encompass or be an alkylene oxide unit, for example a perfluorinated alkylene oxide unit and/or a perfluoropolyether unit, and/or a carbonate unit and/or a siloxane unit and/or a phosphazene unit and/or a methyl methacrylate unit and/or a methacrylate unit and/or a phenylene unit and/or a phenylene oxide unit and/or a benzylene unit and/or an alkylene unit and/or a styrene unit. In particular, the at least one second repeating unit can encompass or be an alkylene oxide unit and/or a siloxane unit and/or a phosphazene unit and/or a methyl methacrylate unit and/or a methacrylate unit, for example a phenylene oxide unit, and/or an alkylene unit and/or a phenylene unit.

Where applicable, the at least one second repeating unit can have no group Q and can be, for example, an, in particular single, alkylene oxide unit, for example a perfluorinated alkylene oxide unit and/or a perfluoropolyether unit, and/or a carbonate unit and/or a siloxane unit and/or a phosphazene unit and/or a methyl methacrylate unit and/or a methacrylate unit and/or a phenylene unit and/or a phenylene oxide unit and/or a benzylene unit and/or an alkylene unit, for instance an alkylene oxide unit and/or a phenylene unit, or another polymer-backbone-forming unit, for example a (poly)styrene unit. (Poly)phenylene units and/or (poly)styrene units, which can result in higher glass transition temperatures, can be advantageous in terms of mechanical properties.

The polymer-backbone-forming unit -[A]-, for example -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]-, of the at least one first repeating unit and the polymer-backbone-forming unit of the at least one second repeating unit can be identical or different from one another and can be selected, for example, from the group of the alkylene oxide unit(s), in particular ethylene oxide unit(s) and/or propylene oxide unit(s), and/or unit(s) encompassing, in particular organic, carbonate groups, and/or siloxane unit(s) and/or phosphazene unit(s) and/or methyl methacrylate unit(s) and/or methacrylate unit(s) and/or a phenylene unit and/or a phenylene oxide unit(s) and/or a benzylene unit(s) and/or an alkylene unit(s).

In particular, the polymer-backbone-forming unit -[A]-, for example -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]-, of the at least one first repeating unit and the polymer-backbone-forming unit of the at least one second repeating unit can be selected from the same polymer class, for example from the polymer classes explained in conjunction with -[A]-, -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]-, for instance from the siloxane units (from the class of the polysiloxanes). Synthesis can thereby advantageously be simplified. Where applicable, however, the polymer-backbone-forming unit -[A]-, for example -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]-, of the at least one first repeating unit and the polymer-backbone-forming unit of the at least one second repeating unit can be functionalized differently from one another.

For example, the polymer-backbone-forming unit -[A]-, for example -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]-, of the at least one first repeating unit and the polymer-backbone-forming unit of the at least one second repeating unit can, however, also be selected from different polymer classes, for example from the polymer classes explained in conjunction with -[A]-, -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]-, for instance from the siloxane units (from the class of the polysiloxanes) and from the alkylene oxide units (from the class of the polyalkylenes or polyethers), and/or can differ from one another in terms of different functionalizations. It is thereby advantageously possible to implement polymer blocks having different, inter alia, mechanical and/or solvating and/or electrical properties, so as thereby to establish advantageous solvating properties combined with high ion conductivities.

An example thereof is the siloxane/ethylene oxide copolymer of the general chemical formula:

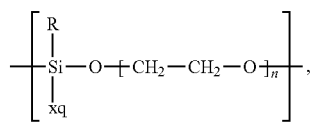

for instance

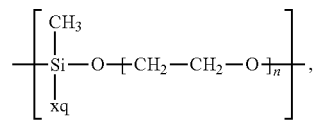

in particular where R denotes an alkyl group, for instance a methyl, ethyl, or propyl group, and where n denotes the number of repetitions of the ethylene oxide unit, for example $1 \leq n \leq 10$. The polymer-backbone-forming unit -[A]-, for example -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]-, of the at least one first repeating unit and the polymer-backbone-forming unit of the at least one second repeating unit can, however, in particular be selected from the same polymer class, for example respectively from the phenylene units (polyphenylenes) or from the alkylene units (polyolefins), and can differ from one another respectively in terms of different functionalizations or absent functionalizations, for example different groups Q and/or different spacers.

Examples thereof are the phenylene-phenylene copolymer of the general chemical formula:

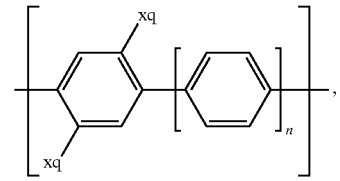

in particular where n denotes the number of repetitions of the phenylene unit of the unsubstituted repeating unit, for example $0 \leq n \leq 3$, and/or the phenylene-phenylene copolymer of the general chemical formula:

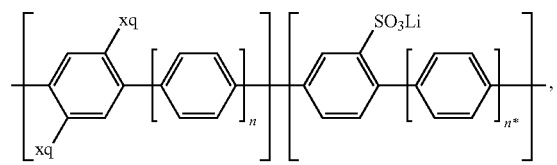

in particular where n and n* denote the number of repetitions of the unsubstituted phenylene units and, for example, $0 \leq n \leq 3$ and $0 \leq n^* \leq 3$, and/or the alkylene/alkylene copolymer of the general chemical formula:

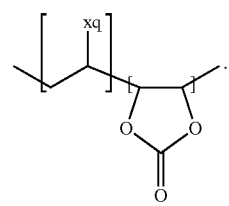

For instance, the at least one second repeating unit can have a polymer-backbone-forming structural unit, for example selected from the group of the siloxane unit(s) and/or phosphazene unit(s) and/or methyl methacrylate unit(s) and/or methacrylate unit(s) and/or phenylene unit(s), for instance having a side group containing a carbonate group and/or an alkylene oxide group, for example oligoalkylene oxide. The side group containing the carbonate group and/or alkylene oxide group can in this context, for instance, be attached to an atom of the polymer-backbone-forming structural unit. The side group containing the carbonate group and/or alkylene oxide group, in particular the carbonate group, can also, however, be attached cyclically to two atoms of the polymer-backbone-forming structural unit. The polymer backbone that is formed can in this context itself respectively encompass carbonate groups or alkylene oxide groups, for example respectively a polycarbonate or a polyalkylene oxide, or can also be respectively free of carbonate groups or alkylene oxide groups.

In the context of a special embodiment, however, the at least one second repeating unit encompasses a repeating unit, different from the at least one first repeating unit, of the general chemical formula:

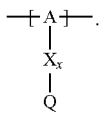

For example, the at least one second repeating unit can respectively encompass or be one of the special repeating units explained above.

For example, the polymer-backbone-forming unit -[A]-, for example -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]-, of the at least one first repeating unit and the polymer-backbone-forming unit -[A]-, for example -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]-, of the at least one second repeating unit can be selected from different polymer classes, for example from the siloxane units (polysiloxanes) and the alkylene oxide units (polyalkylenes, polyethers), and/or can differ from one another in terms of different functionalizations.

The polymer-backbone-forming unit -[A]-, for example -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]-, of the at least one first repeating unit and the polymer-backbone-forming unit -[A]-, for example -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]-, of the at least one second repeating unit can, however, also be selected in particular from the same polymer class, for example respectively from the siloxane unit(s) (polysiloxanes) and/or phosphazene unit(s) (polyphosphazenes) and/or methyl methacrylate unit(s) (methyl methacrylates) and/or methacrylate unit(s) (methacrylates) and/or the phenylene unit(s) (polyphenylenes) or the alkylene units (polyolefins), and can respectively differ from one another in terms of different functionalizations or absent functionalizations, for example different groups Q and/or different spacers.

In the context of a further embodiment the polymer electrolyte respectively encompasses or is at least one copolymer (P), for example a block copolymer, for instance a multi-block copolymer, and/or an alternating copolymer and/or a statistical copolymer, in particular a block copolymer, for example a comb copolymer, of the general chemical formula:

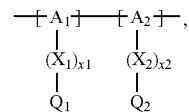

where the repeating unit

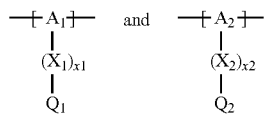

are repeating units, different from one another, of the general chemical formula:

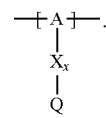

For example, the repeating units can respectively encompass or be special repeating units explained above.

In the context of an implementation of this embodiment the repeating units

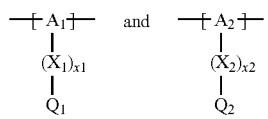

encompass in this context repeating units, different from one another, of the general chemical formula:

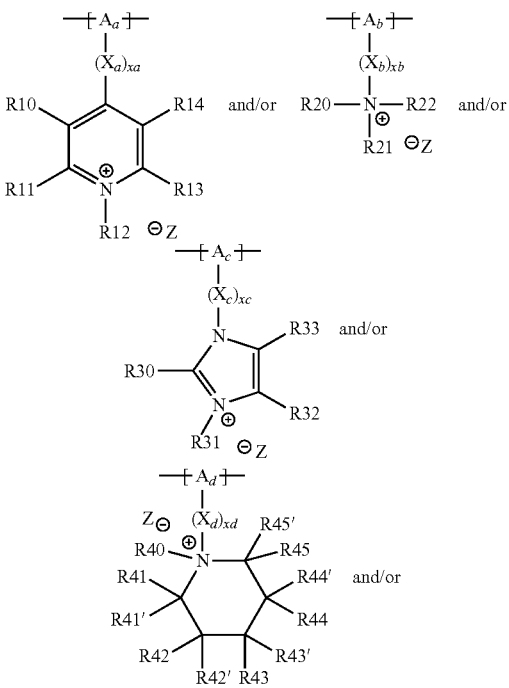

-continued

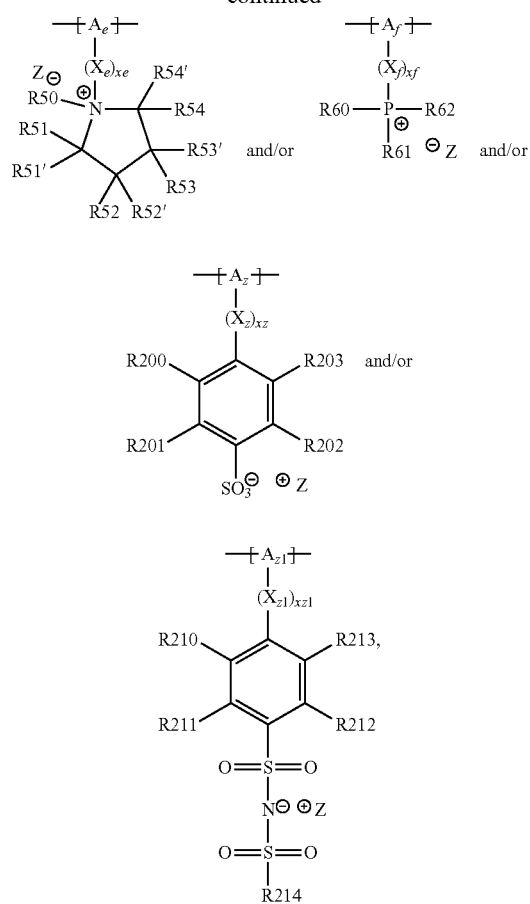

for example

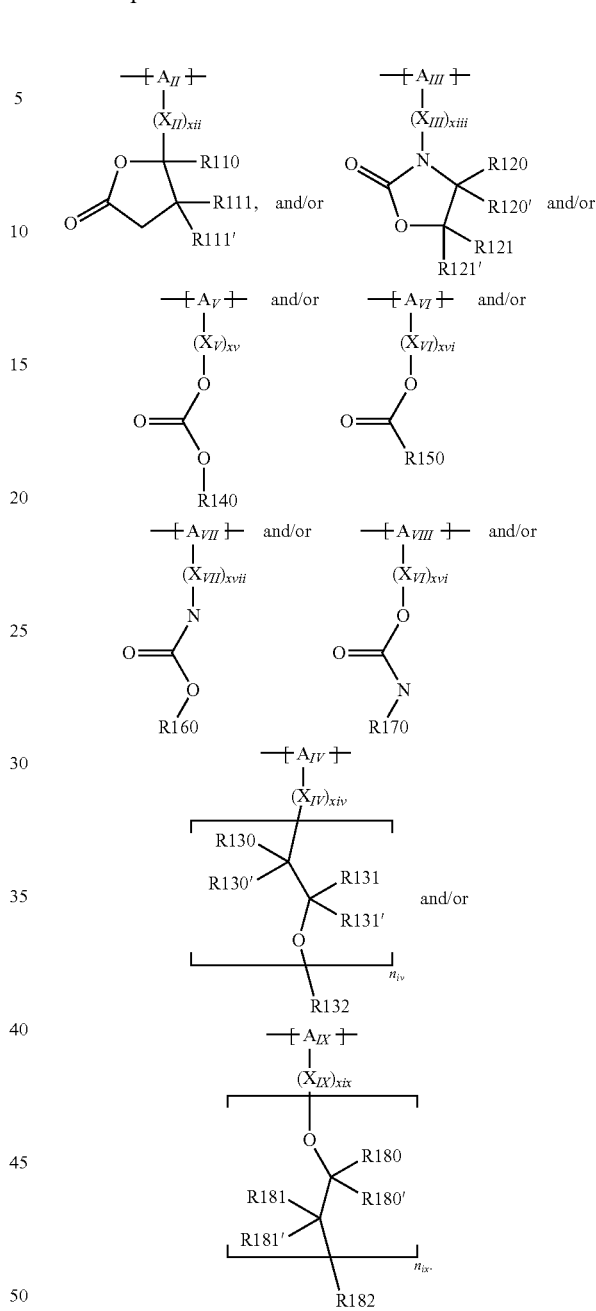

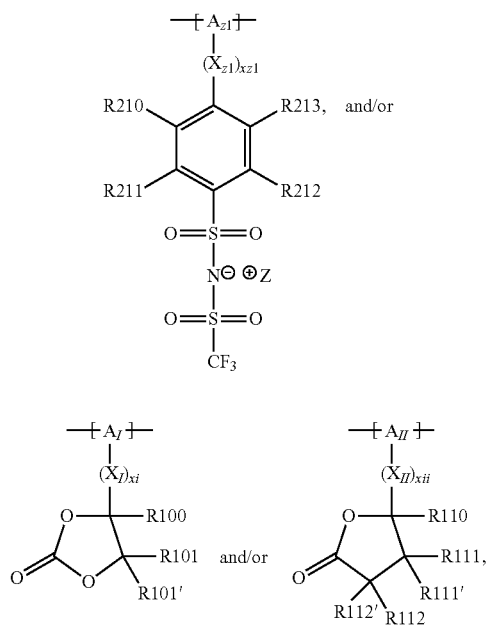

or respectively denote at least one repeating unit of the general chemical formulas above. Combining the above repeating units can result in an increase (compared with the corresponding homopolymers) in the ion conductivity, in particular lithium ion conductivity, where applicable in a mixture with lithium salt. The molecular weight or the average number of repeating units of the polymers can respectively be closely correlated with the glass temperature of the pure polymer, which can decisively determine the resulting lithium ion conductivity of the polymer/salt mixture.

In the context of a special implementation of this embodiment the at least one first repeating unit, for example the repeating unit:

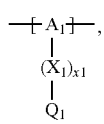

encompasses or respectively denotes (at least) one repeating unit of the general chemical formula:

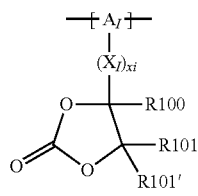 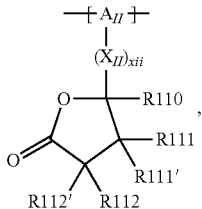

for example

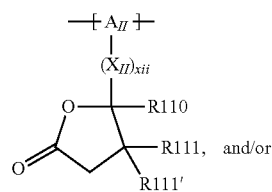 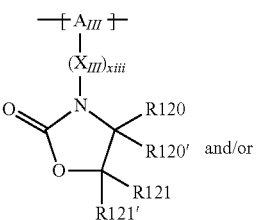

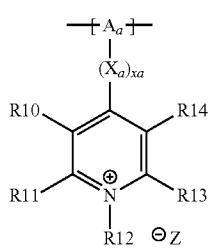

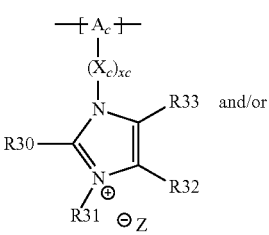

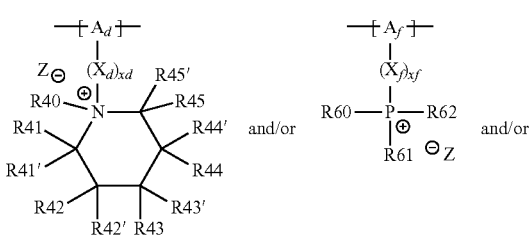

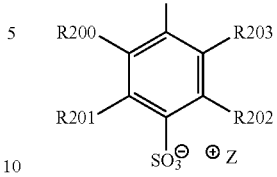 and/or 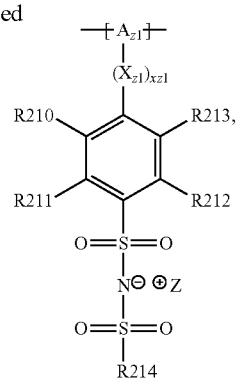

for example

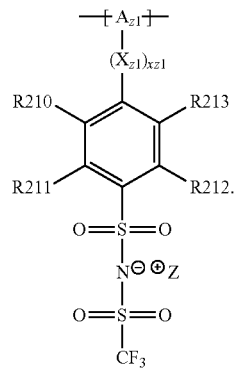

Combining the above repeating units with repeating units that carry an oligoethylene oxide function, for instance an (oligo)ethylene oxide group respectively having $1 \le n_{IV} \le 15$, for example respectively $2 \le n_{IV} \le 6$ and $n_{IX} \le 6$, repeating units, can again result in an increase (compared with the corresponding homopolymers) in ion conductivity, in particular lithium ion conductivity, where applicable in a mixture with lithium salt.

The at least one second repeating unit, for example the repeating unit:

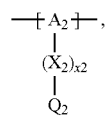

can therefore respectively encompass or be, for example, one or more repeating units that carry an oligoethylene oxide function, for instance an (oligo)ethylene oxide group respectively having $1 \le n \le 15$, for example $2 \le n \le 6$, repeating units.

In the context of a further, additional or alternative, special implementation of this embodiment, the at least one second repeating unit, for example the repeating unit:

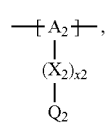

respectively encompasses or denotes (at least) one repeating unit of the general chemical formula:

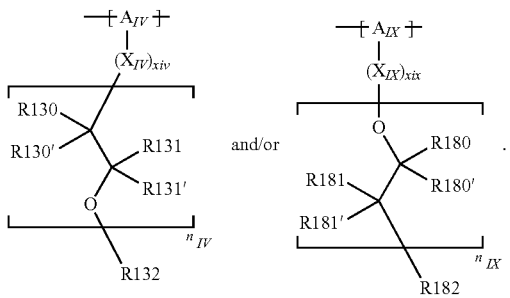

In order to minimize the dissolution of polysulfides, the proportion of ethylene oxide units for example can be kept low, for example can be minimized. Fluorination respectively of the ethylene oxide units or also of polyethers, however, in particular of polyethylene oxide and and/or propylene oxide, can cause polysulfide solubility to be decreased. For this reason in particular the at least one second repeating unit can respectively have perfluorinated alkylene oxide units, in particular perfluorinated ethylene oxide units, or can be a perfluoropolyether. For example, the groups R130-132 and R180-R182 can respectively be perfluorinated and/or can denote a fluorine atom.

As already explained, for these reasons the spacer X, ($X_I$), ($X_{II}$), ($X_{III}$), ($X_{IV}$), ($X_V$), ($X_{VI}$), ($X_{VII}$), ($X_{VIII}$), ($X_{IX}$), ($X_a$), ($X_b$), ($X_c$), ($X_d$), ($X_e$), ($X_f$), ($X_Z$), or ($X_{Z1}$) and/or the polymer-backbone-forming units -[A]-, -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]-, and/or the group Q or $Q^+$ or $Q^-$, or the groups having R10-R213, can also respectively have perfluorinated alkylene oxide groups, in particular perfluorinated ethylene oxide groups and/or perfluorinated propylene oxide groups, for example perfluorinated oligoalkylene oxide groups, for example perfluorinated oligoethylene oxide groups and/or perfluorinated oligopropylene oxide groups, and/or can be perfluorinated.

In the context of a special embodiment the polymer electrolyte respectively encompasses or is (at least) one copolymer (P), for example a block copolymer, for instance a multi-block copolymer, and/or an alternating copolymer and/or a statistical copolymer, in particular a block copolymer, for example a comb copolymer, of the general chemical formula:

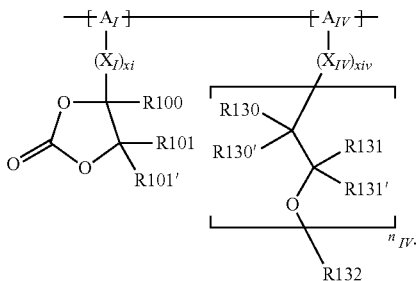

For example, the polymer electrolyte respectively can be based on or can be a copolymer, for example a block copolymer, for instance a multi-block copolymer, and/or an alternating copolymer and/or a statistical copolymer, of this general chemical formula. For example, the copolymer can be a block copolymer or an alternating copolymer or a statistical copolymer, for instance a block copolymer or an alternating copolymer. In particular, the copolymer of this general chemical formula can be a block copolymer. A copolymer of this kind, for example block copolymers, for instance a comb copolymer, advantageously allows a comparatively high lithium ion conductivity to be achieved.

For instance, the polymer electrolyte respectively can encompass, for example can be based on, for instance can be a copolymer, for example a block copolymer, for instance a multi-block copolymer, and/or an alternating copolymer and/or a statistical copolymer, in particular a block copolymer, for example a comb copolymer, of the general chemical formula:

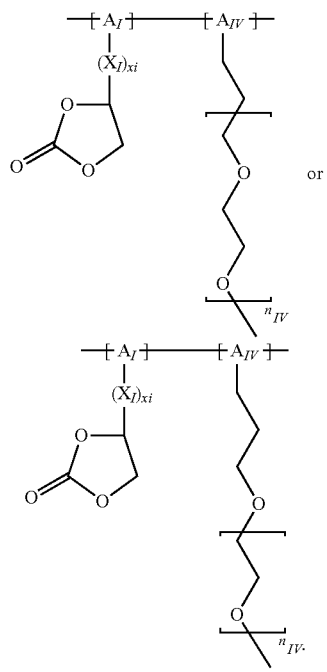

In the context of a special embodiment the polymer electrolyte respectively encompasses or is (at least) one copolymer (P), for example a block copolymer, for instance a multi-block copolymer, and/or an alternating copolymer and/or a statistical copolymer, in particular a block copolymer, for example a comb copolymer, of the general chemical formula:

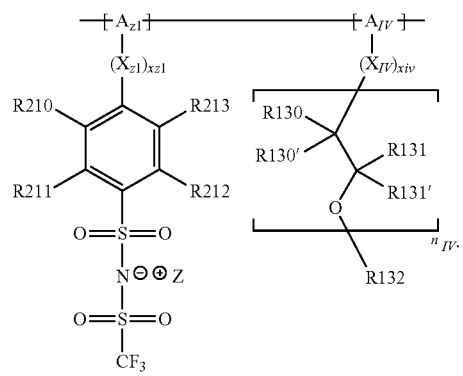

For example, the polymer electrolyte respectively can be based on or can be a copolymer, for example a block copolymer, for instance a multi-block copolymer, and/or an alternating copolymer and/or a statistical copolymer, of this general chemical formula. For example, the copolymer can be a block copolymer or an alternating copolymer or a statistical copolymer, for instance a block copolymer or an alternating copolymer. In particular, the copolymer of this general chemical formula can be a block copolymer. A copolymer of this kind, for example block copolymers, for instance a comb copolymer, advantageously allows a comparatively high lithium ion conductivity to be achieved.

For instance, the polymer electrolyte respectively can encompass, for example can be based on, for instance can be a copolymer, for example a block copolymer, for instance a multi-block copolymer, and/or an alternating copolymer and/or a statistical copolymer, in particular a block copolymer, for example a comb copolymer, of the general chemical formula:

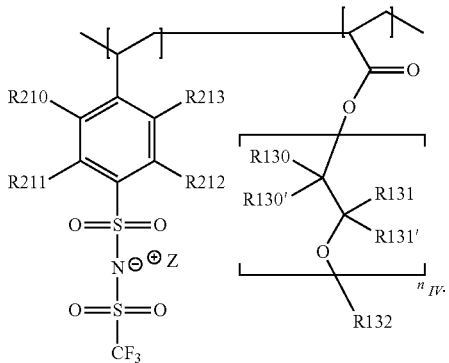

In the context of a further embodiment the polymer electrolyte (furthermore) encompasses at least one (singly or multiply) fluorinated, for example perfluorinated, and/or lithium sulfonate-substituted polymer. For example, the at least one, fluorinated and/or lithium sulfonate-substituted polymer can be a perfluoropolyether and/or a lithium sulfonate-substituted, in particular fluorinated, for example perfluorinated, polyolefin, for example tetrafluoroethylene polymer, and/or a lithium sulfonate-substituted, in particular fluorinated, for example perfluorinated, polyether, for instance a lithium ion-containing, for instance lithium ion-exchanged, Nafion, and/or a lithium sulfonate-substituted, in particular fluorinated, for example perfluorinated, polyphenylene. The lithium conductivity can thereby, where applicable, be further increased. Lithium sulfonate-substituted and/or fluorinated polymers, such as lithium Nafion and/or polyphenylenes substituted with lithium sulfonate and/or fluorinated, in particular perfluorinated, polyethers (perfluoropolyethers), can advantageously be used in lithium/sulfur cells, for instance having a sulfur/carbon composite, for example SPAN, as a cathode active material, in particular because a reduced polysulfide solubility can thereby be achieved. Fluorinated, in particular perfluorinated, polyethers (perfluoropolyethers) can be used in this context in lithium/sulfur cells, for instance having a sulfur/carbon composite, for example SPAN, as a cathode active material, particularly advantageously in combination with at least one lithium conducting salt. Lithium Nafion can have, for example, a repeating unit combination made up of an unsubstituted tetrafluoroethylene unit and a lithium sulfonate-substituted tetrafluoroethylene unit, for example having an oligoalkylene oxide spacer, and can be based, for example, on the general chemical formula:

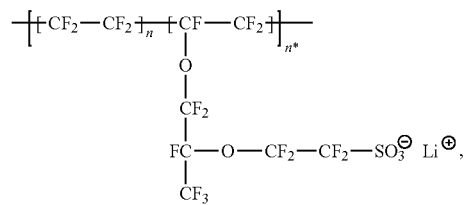

where n denotes the number of repetitions of the unsubstituted tetrafluoroethylene units and n* denotes the number of repetitions of the repeating unit combination.

A further example of a lithium sulfonate-substituted, for example fluorinated, for instance perfluorinated, polymer is a lithium sulfonate-substituted polyphenylene having a lithium sulfonate-substituted phenylene unit and where applicable an unsubstituted phenylene unit, for example which is based on the general chemical formula:

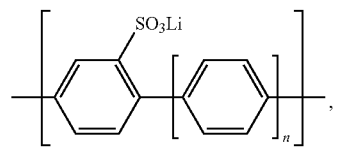

in particular where n denotes the number of repetitions of the unsubstituted phenylene units, for example $0 \leq n \leq 3$.

In the context of a further embodiment the polymer electrolyte encompasses a polymer mixture, in particular a polymer blend, made up of at least one first polymer and at least one second polymer. The at least one first polymer can respectively encompass or be (at least) one polymer according to the present invention, for example homopolymer or copolymer, for example a block copolymer, for instance a multi-block copolymer, and/or an alternating copolymer and/or a statistical copolymer, in particular a block copolymer, for example a comb copolymer, in particular which encompasses at least one repeating unit of the general chemical formula:

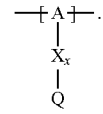

A, X, x, and Q can be embodied in this context as explained above. For example, the polymer mixture copolymer can encompass in this context at least one of the special repeating units explained above. In particular, the at least one first repeating unit can respectively encompass or be one of the special repeating units explained above.

The at least one second polymer can be, for example, (at least) one polymer of any kind. For example, the at least one second polymer can encompass or be a polyalkylene oxide (polyether), in particular a perfluoropolyether, and/or a polycarbonate and/or a polysiloxane and/or a polyphosphazene and/or a poly(methyl methacrylate) and/or a polymethacrylate and/or a polyphenylene and/or a polyphenylene oxide and/or a polybenzylene and/or a polyolefin and/or a polystyrene. For instance, the at least one second polymer can encompass or be a polyalkylene oxide and/or a polysiloxane and/or a polyphosphazene and/or a poly(methyl methacrylate) and/or a polymethacrylate and/or a polyolefin and/or a polyphenylene, in particular a polyalkylene oxide and/or polyolefin and/or a polyphenylene.

For instance, the at least one polymer can have no group Q and can be, for example, an, in particular single, polyalkylene oxide (polyether), in particular a perfluoropolyether, and/or polycarbonate and/or polysiloxane and/or polyphosphazene and/or poly(methyl methacrylate) and/or polymethacrylate and/or polyphenylene and/or polyphenylene oxide and/or polybenzylene unit and/or polyolefin, for instance a polyalkylene oxide (polyether) and/or polyphenylene, for example a para-polyphenylene, and/or polystyrenes, or another polymer.

Perfluoropolyethers, where applicable in combination with at least one lithium conducting salt, can be used advantageously as a polymer electrolyte in particular in lithium/sulfur cells, in particular having SPAN as a cathode material. (Poly)phenylene units and/or (poly)styrene units, which can result in higher glass transition temperatures, can be advantageous in terms of mechanical properties, in particular as a lithium ion-conductive matrix for SPAN.

In the context of a special embodiment, however, the at least one second polymer respectively encompasses or is (at least) one polymer according to the present invention, in particular homopolymer and/or copolymer, having at least one repeating unit different from the at least one repeating unit of the at least one first polymer, in particular of the general chemical formula:

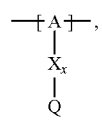

and/or at least one, fluorinated and/or lithium sulfonate-substituted polymer, in particular a perfluoropolyether and/or a lithium sulfonate-substituted, in particular fluorinated, polyolefin and/or a lithium sulfonate-substituted, in particular fluorinated, polyether and/or a lithium sulfonate-substituted, in particular fluorinated, polyphenylene, for example a lithium ion-containing, for instance lithium ion-exchanged, Nafion. A, X, x, and Q can be embodied in this context as explained above. The lithium ion conductivity can thereby, where applicable, be further increased.

In the context of a further embodiment the at least one polymer electrolyte respectively encompasses or is at least one polymer, in particular polymer electrolyte, having at least one repeating unit of the general chemical formula:

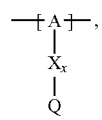

where -[A]-denotes a polymer-backbone-forming unit, where X denotes a spacer, where x denotes the quantity of the spacer X and is 1 or 0, and where Q denotes a negatively charged group $Q^-$ and a counter ion $Z^+$ or where Q denotes a positively charged group $Q^+$ and a counter ion $Z^-$. This has proven to be particularly advantageous because ion dissociation can be increased, and polysulfide solubility decreased, as a result thereof.

In the context of an implementation of this embodiment the at least one polymer electrolyte respectively encompasses or is:
(at least) one copolymer, for example a block copolymer, for instance a multi-block copolymer, and/or an alternating copolymer and/or a statistical copolymer, in particular a block copolymer, for example a comb copolymer, that has at least one first repeating unit and at least one second repeating unit different from the at least one first repeating unit, the at least one first repeating unit having the general chemical formula:

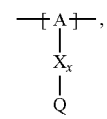

and/or
a polymer mixture, in particular a polymer blend, made up of at least one first polymer and at least one second polymer, the at least one first polymer having at least one repeating unit of the general chemical formula:

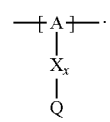

A, X, x, and Q can in this context be embodied as explained above. For example, the (co)polymer or the polymer mixture can in this context respectively encompass at least one of the special repeating units explained above.

Repeating units having a positively charged group $Q^+$ and a counter ion $Z^-$ and/or having a negatively charged group $Q^-$ and a counter ion $Z^+$ can prove to be particularly advantageous respectively in combination with uncharged, ion-conductive or -conducting groups, for example alkylene oxide groups and/or cyclic and/or acyclic carbonate groups and/or cyclic and/or acyclic carboxylic acid ester groups, for example lactone groups and/or cyclic and/or acyclic carbamate groups, in particular alkylene oxide groups, such as oligoalkylene oxide groups and/or polyethers, since ion dissociation can be increased as a result of the respectively positive or negatively charged group $Q^+$ or $Q^-$, and ion mobility can be increased as a result of the uncharged group Q, which can result altogether in a considerable increase in ion conductivity, for example lithium ion conductivity.

The at least one second repeating unit and/or the at least one second polymer can therefore have in particular an alkylene oxide and/or a cyclic carbonate group and/or a lactone group and/or a cyclic carbamate group and/or an acyclic carbonate group and/or an acyclic carboxylic acid ester group and/or an acyclic carbamate group.

In the context of an implementation of this embodiment, the at least one second repeating unit is an alkylene oxide unit and/or a repeating unit that carries an alkylene oxide function (alkylene oxide group), and/or
the at least one second polymer is a polyalkylene oxide (polyether) and/or has at least one repeating unit that carries an alkylene oxide function (alkylene oxide group).

A combination of a positively or negatively charged group $Q^+$, $Q^-$ and an alkylene oxide, for example an alkylene oxide unit and/or an alkylene oxide function and/or a polyalkylene oxide, has proven to be particularly advantageous because ion dissociation can be increased as a result of the respectively positively or negatively charged group $Q^+$ or $Q^-$, and ion mobility can be increased as a result of the alkylene oxide, which can result altogether in a considerable increase in ion conductivity, for example lithium ion conductivity.

In particular, the copolymer can be a block copolymer, for instance a multi-block copolymer. In this context, in particular, the length of the blocks can be selected so that the conducting salt, in particular lithium conducting salt, is present in dissociated fashion, and at the same time sufficient mobility of the ions, in particular lithium ions, in the alkylene oxide, for example polyether, exists.

The at least one second repeating unit can be, in particular, an alkylene oxide unit and/or a repeating unit that carries an alkylene oxide function, for example an oligoalkylene oxide function, for instance having respectively 1 or 2 to 15, for example 2 to 6 repeating units. For example, the at least one second repeating unit can be an ethylene oxide unit and/or a propylene oxide unit and/or a repeating unit that carries an ethylene oxide function and/or a propylene oxide function, for instance an oligoethylene oxide function and/or an oligopropylene oxide function, for example respectively having 1 or 2 to 15, for example 2 to 6 repeating units. In particular, the at least one second repeating unit can be an ethylene oxide unit and/or a repeating unit that carries an ethylene oxide function, for instance an oligoethylene oxide function, for example an (oligo)ethylene oxide group respectively having 1 or 2 to 15, for example 2 to 6 repeating units.

The at least one second polymer can in particular be a polyalkylene oxide (polyether) and/or can have a repeating unit that carries an alkylene oxide function, for example an oligoalkylene oxide function, for instance having respectively 1 or 2 to 15, for example 2 to 6 repeating units. For example, the at least one second polymer can be a polyethylene oxide (PEO) and/or polypropylene oxide and/or can have a repeating unit that carries an ethylene oxide function and/or a propylene oxide function, for instance an oligoethylene oxide function and/or an oligopropylene oxide function, for example having respectively 1 or 2 to 15, for example 2 to 6 repeating units. In particular, the at least one second polymer can be a polyethylene oxide (PEO) and/or can have a repeating unit that carries an ethylene oxide function, for instance an oligoethylene oxide function, for example an (oligo)ethylene oxide group having respectively 1 or 2 to 15, for example 2 to 6 repeating units.

Where applicable, the at least one second repeating unit and/or the at least one second polymer can be fluorinated and/or substituted with lithium sulfonate. For example, the at least one second repeating unit and/or the at least one second polymer can encompass or be a perfluoropolyether and/or a lithium sulfonate-substituted, in particular fluorinated, polyolefin, and/or a lithium sulfonate-substituted, in particular fluorinated, polyether and/or a lithium sulfonate-substituted, where applicable fluorinated, polyphenylene.

In the context of a special implementation of this embodiment,
the at least one second repeating unit is a partly or completely fluorinated, in particular perfluorinated, alkylene oxide unit and/or a repeating unit that carries a partly or completely fluorinated, in particular perfluorinated, alkylene oxide function, for example oligoalkylene oxide function, and/or
the at least one second polymer is a partly or completely fluorinated, in particular perfluorinated, polyalkylene oxide (perfluoropolyether) and/or has a repeating unit that carries a partly or completely fluorinated, in particular perfluorinated, alkylene oxide function, for example oligoalkylene oxide function.

Polysulfide solubility can advantageously be reduced by fluorination.

The at least one second repeating unit can in particular be a partly or completely fluorinated, in particular perfluorinated, alkylene oxide unit and/or a repeating unit that carries a partly or completely fluorinated, in particular perfluorinated, alkylene oxide function, for example an oligoalkylene oxide function, for instance respectively having 1 or 2 to 15, for example 2 to 6 repeating units. For example, the at least one second repeating unit can be a partly or completely fluorinated, in particular perfluorinated, ethylene oxide unit and/or propylene oxide unit and/or a repeating unit that carries a partly or completely fluorinated, in particular perfluorinated, ethylene oxide function and/or propylene oxide function. In particular, the at least one second repeating unit can be a partly or completely fluorinated, in particular perfluorinated, ethylene oxide unit and/or a repeating unit that carries a partly or completely fluorinated, in particular perfluorinated, ethylene oxide function, for instance an oligoethylene oxide function.

The at least one second polymer can in particular be a partly or completely fluorinated, in particular perfluorinated, polyalkylene oxide (polyether) and/or can have a repeating unit that carries a partly or completely fluorinated, in particular perfluorinated, alkylene oxide function, for example an oligoalkylene oxide function, for instance respectively having 1 or 2 to 15, for example 2 to 6 repeating units. For example, the at least one second polymer can be a partly or completely fluorinated, in particular perfluorinated, polyethylene oxide and/or can have a repeating unit that carries a partly or completely fluorinated, in particular perfluorinated, ethylene oxide function and/or propylene oxide function. In particular, the at least one second polymer can be a partly or completely fluorinated, in particular perfluorinated, polyethylene oxide and/or can have a repeating unit that carries a partly or completely fluorinated, in particular perfluorinated, ethylene oxide function, for instance an oligoethylene oxide function.

In the context of a special implementation of this embodiment the at least one polymer electrolyte respectively encompasses or is at least one repeating unit of the general chemical formula:

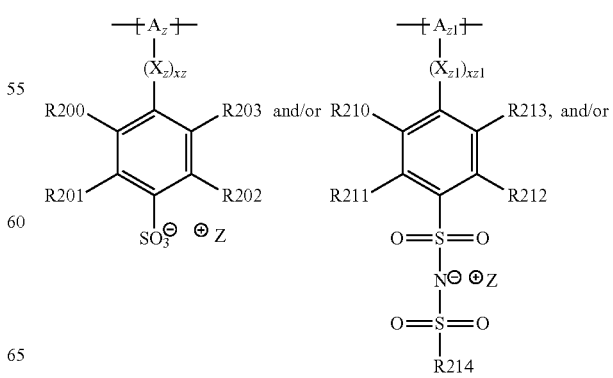

-continued

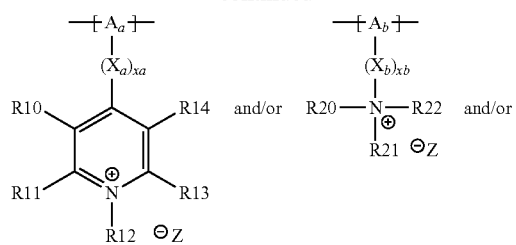

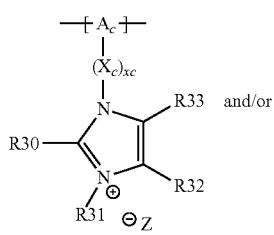

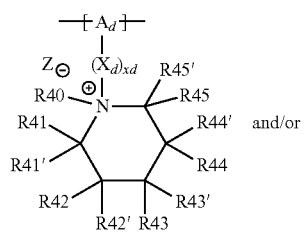

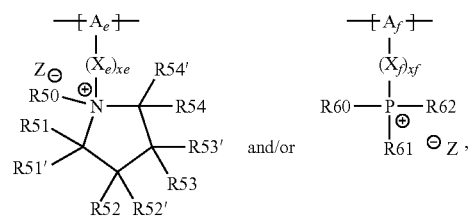

in particular where the at least one first repeating unit, for example the repeating unit:

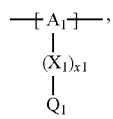

and/or the at least one first polymer, has at least one repeating unit of the general chemical formula above. The at least one second repeating unit, for example the repeating unit:

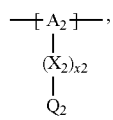

can in this context respectively encompass or denote (at least) one repeating unit of the general chemical formula:

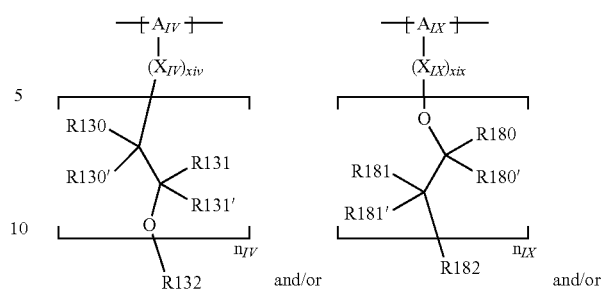

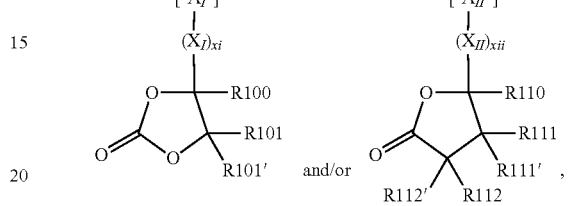

for example

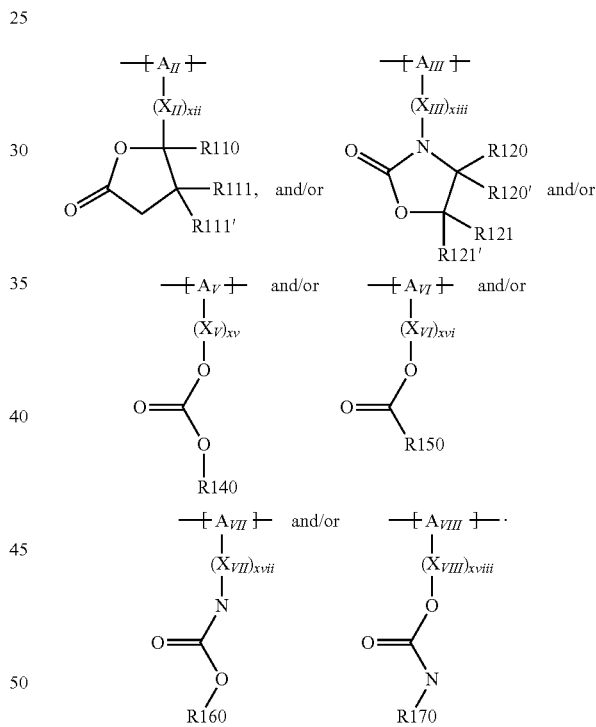

In particular, the at least one second repeating unit, for example the repeating unit:

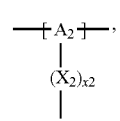

can in this context respectively encompass or denote, for example, (at least) one repeating unit of the general chemical formula:

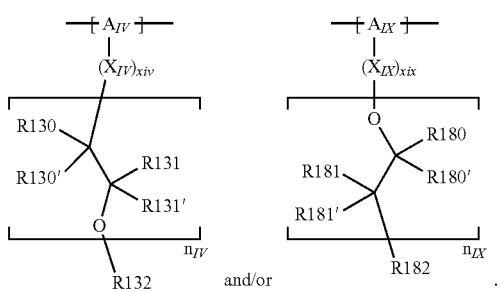

For instance, the copolymer can be poly[(4-styrenesulfonyl)(trifluoromethanesulfonyl)imide].

Where applicable, the copolymer (P) can furthermore encompass at least one third repeating unit, and/or the polymer mixture can furthermore encompass at least one third polymer, in particular different from the first polymer and from the second polymer.

In the context of a further embodiment the polymer electrolyte furthermore encompasses at least one conducting salt, in particular lithium conducting salt. The ion conductivity, in particular lithium ion conductivity, can thereby, where applicable, be further increased. Depending on the block copolymer, a small admixture of a conducting salt, in particular lithium conducting salt, can be advantageous despite a high transference number, in order to decrease the glass point of the block copolymer and thus to increase the total mobility of the lithium ions in the system, although this can come at the expense of a reduction in transference number. A conducting salt, in particular lithium conducting salt, whose anion interacts well with the group Q can ideally be used in this case. For example, lithium bis(trifluoromethanesulfonyl)imide (LiTFSI) can be used in the context of a sulfonylimide group. The conducting salt can be, for example, a lithium conducting salt or a sodium conducting salt, in particular a lithium conducting salt. Usual lithium conducting salts can be used as lithium salts. For example, the at least one lithium conducting salt can encompass or be lithium hexafluorophosphate ($LiPF_6$) and/or lithium bis(trifluoromethanesulfonyl)imide (LiTFSI) and/or lithium bisoxalatoborate (LiBOB) and/or trifluoromethanesulfonate (Li triflate) and/or lithium perchlorate ($LiClO_4$) and/or lithium difluorooxalatoborate (LiDFOB) and/or lithium tetrafluoroborate ($LiBF_4$) and/or lithium bromide (LiBr) and/or lithium iodide (LiI) and/or lithium chloride (LiCl). The anion $Z^-$ and the anion of the at least one lithium conducting salt can in this context be different or identical.

In the context of an implementation of this embodiment, the anion of the at least one conducting salt, in particular lithium conducting salt, and $Z^-$ and $Q^-$, are selected respectively from the same anion class, for example from the sulfonylimides, for instance trifluoromethanesulfonylimide and/or pentafluoroethanesulfonylimide and/or fluorosulfonylimide, in particular trifluoromethanesulfonylimide. It is thereby advantageously possible to avoid undesired secondary reactions; what is achieved in addition is, in particular, that the anion of the at least one conducting salt and $Z^-$ and $Q^+$ respectively coordinate alkali ions, in particular lithium ions, with similar, for example identical, intensity, which can have an advantageous effect on ion mobility.

In the context of a special implementation of this embodiment the at least one conducting salt, in particular lithium conducting salt, respectively has the counter ion $Z^-$ or $Z^+$ respectively of the polymer or polymer electrolyte, in particular respectively of the positively charged group $Q^+$ or of the negatively charged group $Q^-$. For example, the anion $Z^-$ can be identical to the anion of the at least one conducting salt, in particular lithium conducting salt.

The lithium salt concentration can depend in particular on the number of oxygen atoms respectively in the polymer or polymer electrolyte. In particular, the stoichiometric ratio of lithium ions of the at least one lithium conducting salt to oxygen atoms respectively of the polymer electrolyte or of the polymer can be in a range 1:2 to 1:100, in particular respectively from 1:5 or 1:10 to 1:25, for example from 1:10 to 1:15. This can advantageously be an optimum range in terms of the effective mobile charge carriers, and in terms of mobility as a function of glass temperature. The stoichiometric ratio of lithium ions of the at least one lithium conducting salt to repeating units respectively of the polymer electrolyte or polymer can be, for example, in a range from 2:1 to 1:100.

In the context of a further embodiment the particles are respectively coated with a respectively ion-conductive or ion-conducting, in particular respectively lithium ion-conductive or lithium ion-conducting, polymer or polymer electrolyte, for example of the general chemical formula:

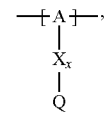

and/or with polyethylene glycol and/or polyethylene oxide. Polysulfides can thereby advantageously be particularly effectively prevented from diffusing away. A, X, x, and Q can be embodied in this context as explained above. In this context, for example, the coating can respectively encompass or be constituted by a respective polymer or polymer electrolyte described above. For example, in this context the polymer of the coating can encompass at least one of the special repeating units explained above.

It is furthermore possible to increase the conductivity by mixing in ionic liquids.

In the context of a further embodiment the at least one polymer electrolyte or the cathode material therefore furthermore respectively encompasses at least one ionic liquid. It is thereby advantageously possible respectively to increase mobility in the system and to reduce the glass temperature, and thereby to increase ion conductivity, in particular lithium ion conductivity. In particular, the ionic liquid can encompass at least one cation, selected from the group consisting of pyridinium cations and/or, in particular quaternary, ammonium cations and/or imidazolium cations and/or piperidinium cations and/or pyrrolidinium cations and/or, in particular quaternary, phosphonium cations and/or guanidinium cations and/or morpholinium cations and/or uronium cations and/or thiouronium cations, and/or at least one anion, selected from the group consisting of trifluoromethanesulfonate (triflate) and/or tetrafluoroborate and/or bisoxalatoborate and/or hexafluorophosphate and/or bis(trifluoromethanesulfonyl)imide and/or bis(perfluoroethanesulfonyl)imide and/or bis(fluoromethanesulfonyl)imide and/or difluorooxalatoborate and/or perchlorate and/or bromide and/or iodide and/or chloride. The anion $Z^-$ and the anion of the at least one lithium conducting salt and/or of the ionic liquid can in this context be identical or different. In particular, however, the anion $Z^-$ can be identical to the anion of the at least one lithium conducting salt and/or of the ionic liquid. It is thereby advantageously possible respectively to avoid undesired secondary reactions, and to prevent lithium salt from crystallizing out.

It is furthermore possible to increase conductivity by mixing in nonaqueous solvents and/or components that are used in liquid electrolytes, for example respectively carbonate- and/or ether-based substances or solvents.

Where applicable, the at least one polymer electrolyte or the cathode material can furthermore respectively encompass at least one carbonate-based and/or ether-based additive, for example at least one carbonate-based and/or ether-based solvent.

In the context of a special embodiment the polymer electrolyte encompasses at least one repeating unit of the general chemical formula:

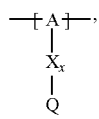

where -[A]- denotes a polymer-backbone-forming unit,
where X denotes a spacer, where x denotes the quantity of the spacer X and is 1 or 0, and
where Q denotes a positively charged group $Q^+$ and a counter ion $Z^-$,
in particular where $Q^+$ denotes a group based on a cation of an ionic liquid, for example where $Q^+$ denotes a pyridinium group or an ammonium group or an imidazolium group or a piperidinium group or a pyrrolidinium group or a phosphonium group or a guanidinium group or a morpholinium group or a uronium group or a thiouronium group and/or where $Z^-$ denotes an anion, in particular a lithium conducting salt anion,
or
where Q denotes a negatively charged group $Q^-$ and a counter ion $Z^+$, in particular where $Q^-$ denotes a group based on a lithium conducting salt anion and/or on an anion of an ionic liquid or a sulfonate group, for example where $Q^-$ denotes a sulfonylimide group and/or a sulfonate group, and/or $Z^+$ denotes an alkali ion, for example a lithium ion and/or sodium ion, in particular a lithium ion, or where Q denotes a cyclic carbonate group or a lactone group or a cyclic carbamate group or an acyclic carbonate group or an acyclic carboxylic acid ester group or an acyclic carbamate group or an alkylene oxide group, in particular where Q denotes a cyclic carbonate group or a lactone group or a cyclic carbamate group or an acyclic carbonate group or an acyclic carboxylic acid ester group or an acyclic carbamate group, and where the polymer-backbone-forming unit -[A]- encompasses at least one polyfunctionalized siloxane unit and/or a polyfunctionalized phosphazene unit and/or a polyfunctionalized phenylene unit, for example a polyfunctionalized siloxane unit.

In particular, in this context the polymer-backbone-forming unit -[A]- can respectively denote or encompass a polyfunctionalized polymer-backbone-forming unit of the general chemical formula:

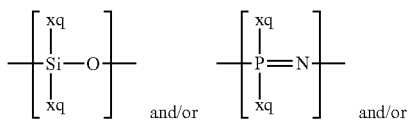

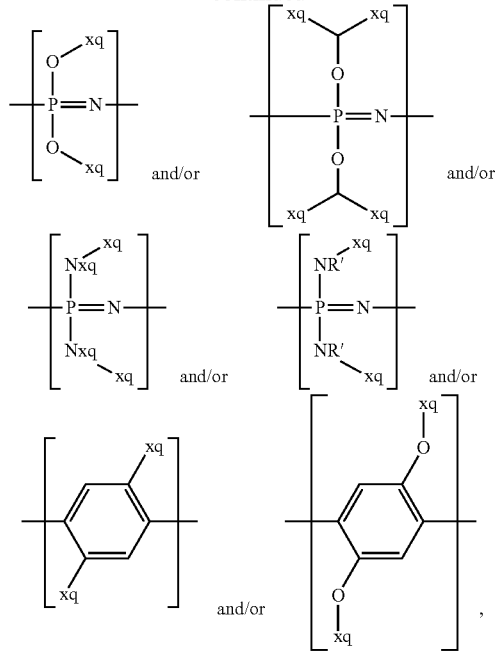

where xq respectively denotes an attachment site at which a group Q, in particular $Q^+$ or $Q^-$ or Q, is respectively attached via a spacer $X_x$ to the polymer-backbone-forming unit -[A]-, in particular where R' denotes hydrogen or an alkyl group.

The polymer-backbone-forming unit -[A]- and/or the spacer X and/or the group Q, for example respectively $Q^+$ or $Q^-$ or Q, and/or the anion $Z^-$ and/or the cation $Z^+$, can in this context be embodied as explained above. For example, the at least one repeating unit can respectively encompass or be (at least) one special repeating unit explained above.

In the context of a further special embodiment the polymer electrolyte encompasses at least one copolymer (P), in particular block copolymer, for example multi-block copolymer, having at least one first repeating unit and at least one second repeating unit different from the at least one first repeating unit, the at least one first repeating unit having the general chemical formula:

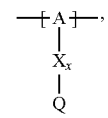

where -[A]- denotes a polymer-backbone-forming unit,
where X denotes a spacer, where x denotes the quantity of the spacer X and is 1 or 0, and
where Q denotes a positively charged group $Q^+$ and a counter ion $Z^-$,
in particular where $Q^+$ denotes a group based on a cation of an ionic liquid, for example where $Q^+$ denotes a pyridinium group or an ammonium group or an imidazolium group or a piperidinium group or a pyrrolidinium group or a phosphonium group or a guanidinium group or a morpholinium group or a uronium group or a thiouronium group and/or where $Z^-$ denotes an anion, in particular a lithium conducting salt anion,
in particular,
where the spacer X encompasses at least one further, positively charged group $Q^+$, in particular based on a cation of an ionic liquid, in particular at least one ammonium group and/or at least one pyridinium group and/or at least one imidazolium group and/or at least one piperidinium group and/or at least one pyrrolidinium group and/or at least one phosphonium group and/or at least one guanidinium group and/or at least one morpholinium group and/or at least one uronium group and/or at least one thiouronium group, in particular at least one ammonium group and/or at least one pyridinium group and/or at least one imidazolium group, for example at least one ammonium group and/or at least one pyridinium group, or where Q denotes a negatively charged group $Q^-$ and a counter ion $Z^+$, for example alkali ion, in particular lithium ion, in particular where $Q^-$ denotes a group based on a lithium conducting salt anion and/or on an anion of an ionic liquid or a sulfonate group, for example where $Q^-$ denotes a sulfonylimide group and/or a sulfonate group, and/or $Z^+$ denotes an alkali ion, for example a lithium ion and/or sodium ion, in particular a lithium ion, where the spacer X encompasses at least one further, negatively charged group $Q^-$, in particular based on a lithium conducting salt anion and/or on an anion of an ionic liquid and/or a sulfonate group, in particular at least one sulfonylimide group and/or at least one sulfonate group.

The at least one second repeating unit can in this context have the general chemical formula:

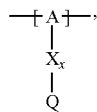

where -[A]- denotes a polymer-backbone-forming unit,
where X denotes a spacer, where x denotes the quantity of the spacer X and is 1 or 0,
but where Q denotes an uncharged group Q, for example an alkylene oxide group or a cyclic carbonate group or a lactone group or a cyclic carbamate group or an acyclic carbonate group or an acyclic carboxylic acid ester group or an acyclic carbamate group, in particular an alkylene oxide group.

The polymer-backbone-forming unit -[A]- and/or the spacer X and/or the group Q, for example respectively $Q^+$ or $Q^-$ or Q, and/or the anion $Z^-$ and/or the cation $Z^+$, can in this context be embodied as explained above. For example, the at least one first and/or second repeating unit can in this context respectively encompass or be (at least) one special repeating unit explained above.

In the context of a further embodiment the at least one polymer electrolyte serving as cathode material binder has at least one repeating unit of the general chemical formula:

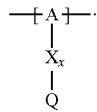

The polymer-backbone-forming unit -[A]- and/or the spacer X and/or the group Q, for example respectively $Q^+$ or $Q^-$ or Q, and/or the anion $Z^-$ and/or the cation $Z^+$, can in this context be embodied as explained above. The at least one polymer electrolyte serving as cathode material binder can in this context be identical to or different from the at least one polymer electrolyte explained above.

The cathode material can encompass, for example, with reference to the total weight of the cathode material, ≥50 wt % to ≤90 wt %, for example ≥50 wt % to ≤80 wt %, in particular ≥60 wt % to ≤70 wt %, cathode active material, and ≥5 wt % to ≤30 wt %, for example ≥20 wt % to ≤30 wt %, solid electrolyte, in particular made up of the at least one inorganic ion conductor and the at least one polymer electrolyte or polymer, respectively. Where applicable, the cathode material can furthermore encompass, with reference to the total weight of the cathode material, ≥5 wt % to ≤10 wt % additives and/or additional agents, for example conductivity additives and/or additional conductivity agents. For example, the solid electrolyte can encompass ≥50 wt % to ≤90 wt %, in particular ≥70 wt % to ≤90 wt %, of the at least one sulfidic ion conductor and ≥10 wt % to ≤50 wt %, in particular ≥10 wt % to ≤30 wt %, of the at least one, in particular respectively ion-conductive or ion-conducting, polymer.

For example, the cathode material can encompass at least one conductivity additive and/or additional conductivity agent, in particular in order to increase electrical conductivity in the cathode.

In the context of a further embodiment the cathode material respectively encompasses at least one, in particular electrical, conducting additive or additional conducting agent. For example, the cathode active material can encompass at least one carbon allotrope, for instance conducting carbon such as carbon black, carbon fibers, graphite, et cetera.

Alternatively or additionally, the cathode active material can encompass at least one conducting salt, in particular lithium conducting salt. Where applicable, the cathode material can furthermore encompass at least one ionic liquid.

The cathode material can be configured in particular for a cell according to the present invention.

With regard to further technical features and advantages of the cathode material according to the present invention, reference is herewith explicitly made to the explanations in conjunction with the cell according to the present invention and with the battery according to the present invention, and to the Figures and the description of the Figures.

A further subject of the present invention is an electrochemical cell, for instance an alkali metal cell, for example a lithium cell and/or sodium cell, in particular a lithium cell, in particular an alkali metal/sulfur cell, for example a lithium/sulfur cell and/or sodium/sulfur cell, in particular a lithium/sulfur cell, encompassing a cathode material according to the present invention.

The cell encompasses in particular a cathode and an anode. The cathode in particular encompasses in this context a cathode material according to the present invention.

The anode can encompass, for example, lithium and/or sodium. In particular, the anode can encompass lithium. In particular, the anode can be a metallic anode and can respectively encompass, for example, metallic lithium or a lithium alloy. The cell can have, in particular between the anode and the cathode, a separator and/or a protective layer, for example an anode protective layer and/or a cathode protective layer.

In the context of an embodiment of the cell, the cell encompasses, in particular between the anode and the cathode, a separator and/or a protective layer, for example an anode protective layer and/or a cathode protective layer.

In the context of an implementation of this embodiment the separator and/or the protective layer, for example the anode protective layer and/or the cathode protective layer, encompasses a block copolymer. The block copolymer can be in this context, for example, a di-block copolymer or tri-block copolymer. In particular, the separator and/or the protective layer, for example anode protective layer, can be constituted from the block copolymer, in particular from the di-block copolymer or tri-block copolymer. The block copolymer can in this context have in particular an ionically conductive phase and a mechanically stable phase, which are chemically connected to one another and, by self-organization, constitute a bi-continuous network. The cathode material according to the present invention, for example based on a sulfur/polymer composite having sulfur bound, for example covalently and/or ionically, in particular ionically, to the polymer of the composite, for example based on a sulfur/polyacrylonitrile composite, for instance SPAN, can be used particularly advantageously with block copolymers of this kind since it is possible to dispense with the use of low-molecular-weight ether compounds or ether solvents that, for example, otherwise could swell block copolymers and convert them into a polymer gel, and thereby to prevent swelling of the block copolymer of the separator and/or of the protective layer, for example of the anode layer, and to ensure the respective functionality thereof.

In the context of a special implementation of this embodiment the separator and/or the protective layer, for example the anode protective layer and/or the cathode protective layer, encompasses at least one polystyrene/polyalkylene oxide block copolymer, in particular polystyrene/polyethylene oxide block copolymer, for instance poly(styrene-b-ethylene oxide), in particular having a molecular weight of the blocks of ≥5000 dalton, for example having a total molecular weight of ≥150,000 dalton, in particular having a total molecular weight of ≥350,000 dalton. In particular, in this context the separator and/or the protective layer can be constituted from the polystyrene/polyalkylene oxide block copolymer, in particular polystyrene/polyethylene oxide block copolymer, for instance poly(styrene-b-ethylene oxide), in particular having a molecular weight of the blocks of ≥5000 dalton, for example having a total molecular weight of ≥150,000 dalton, in particular having a total molecular weight of ≥350,000 dalton. The separator and/or the protective layer, for example the anode protective layer and/or the cathode protective layer, can also, however, respectively encompass or be constituted from a block copolymer, for example tri-block copolymer, that encompasses at least one polystyrene component and at least one polyethylene oxide component and at least one further polymer component, for example a polyisoprene component. Polystyrene/polyethylene oxide block copolymers can advantageously have an ionic conductivity of >10⁻⁵ S/cm at operating temperatures of electrochemical cells, in particular lithium/sulfur cells.

In the context of a further, alternative or additional, special implementation of this embodiment the separator and/or the protective layer, for example the anode protective layer and/or the cathode protective layer, encompasses at least one polyacrylate/polyalkylene oxide block copolymer, for example polyacrylate/polyethylene oxide block copolymer, for instance poly(acrylate-ethylene oxide), in particular having a molecular weight of the blocks of ≥5000 dalton, for example having a total molecular weight of ≥150,000 dalton, in particular having a total molecular weight of ≥350,000 dalton. In particular, the separator and/or the protective layer can in this context be constituted from the polyacrylate/polyalkylene oxide block copolymer, in particular polyacrylate/polyethylene oxide block copolymer, for instance poly(acrylate-ethylene oxide), in particular having a molecular weight of the blocks of ≥5000 dalton, for example having a total molecular weight of ≥150,000 dalton, in particular having a total molecular weight of ≥350,000 dalton. The separator and/or the protective layer, for example the anode protective layer and/or the cathode protective layer, can, however, also encompass or be constituted from a block copolymer, for example tri-block copolymer, that encompasses at least one polyacrylate component and at least one polyethylene oxide component and at least one further polymer component, for example a polyisoprene component. Polyacrylate/polyethylene oxide block copolymers can advantageously likewise have high ionic conductivity at operating temperatures of electrochemical cells, in particular lithium/sulfur cells.

In the context of a further, alternative or additional, special implementation of this embodiment the separator and/or the protective layer, for example anode protective layer and/or the cathode protective layer, encompasses at least one polymer, for instance in the form of a block copolymer, having at least one repeating unit of the general chemical formula:

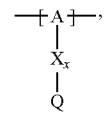

where -[A]- denotes a polymer-backbone-forming unit, where X denotes a spacer, where x denotes the quantity of the spacer X and is 1 or 0, and where Q denotes a positively charged group $Q^+$ and a counter ion $Z^-$, or where Q denotes a negatively charged group $Q^-$ and a counter ion $Z^+$, or where Q denotes an uncharged group Q, in particular a cyclic carbonate group or a lactone group or a cyclic carbamate group or an acyclic carbonate group or an acyclic carboxylic acid ester group or an acyclic carbamate group or an alkylene oxide group.

The polymer-backbone-forming unit -[A]- and/or the spacer X and/or the group Q, for example respectively $Q^+$ or $Q^-$ or Q, and/or the anion $Z^-$ and/or the cation $Z^+$, can in this context be embodied as explained above. For example, in this context the at least one repeating unit can respectively encompass or be (at least) one special repeating unit explained above.

For example, the cathode can have a cathode current collector. The cathode current collector can be constituted, for instance, from aluminum or carbon. Where applicable, the cathode current collector can be equipped with a coating in order to improve adhesion and/or electrical contacting and/or chemical stability and/or corrosion stability. The coating can be, for example, a polymer layer, in particular a carbon allotrope/polymer layer, where applicable having one or more additives such as adhesion promoters, corrosion protection additives, etc. For example, the coating can encompass a solid electrolyte according to the present invention and/or can be a protective layer, in particular cathode protective layer and/or anode protective layer, according to the present invention.

The cathode can be manufactured, for example, by the fact that cathode constituents are mixed, for instance in a dissolver, with at least one solvent to yield a slurry, and that a substrate, for instance a foil, for example an aluminum foil, in particular a foil, for example aluminum foil, coated with a carbon allotrope, is coated therewith. Coating can be accomplished by blading. The coating can then be dried and/or calendered. This can be accomplished in particular in such a way that the porosity is minimized.

Alternatively thereto, the cathode can be manufactured by dry coating, i.e. solvent-free coating.

With regard to further technical features and advantages of the cell according to the present invention, reference is herewith explicitly made to the explanations in conjunction with the cathode material according to the present invention and with the battery according to the present invention, and to the Figures and the description of the Figures.

The present invention furthermore relates to an alkali metal battery, for example a lithium battery and/or sodium battery, for instance a lithium battery, in particular an alkali metal/sulfur battery, for example a lithium/sulfur battery and/or sodium/sulfur battery, in particular a lithium/sulfur battery, that encompasses one or more cells according to the present invention.

With regard to further technical features and advantages of the battery according to the present invention, reference is herewith explicitly made to the explanations in conjunction with the cathode material according to the present invention and with the cell according to the present invention, and to the Figures and the description of the Figures.

Further advantages and advantageous embodiments of the subject matter according to the present invention are illustrated by the drawings and explained in the description that follows. Be it noted in this context that the drawings are merely descriptive in nature and are not intended to limit the invention in any form.

BRIEF DESCRIPTION OF THE DRAWING

FIG. 1 is a schematic cross section through an embodiment of a cell according to the present invention.

DETAILED DESCRIPTION

FIG. 1 shows a lithium/sulfur cell 1 that has a cathode 10, an anode 20, and a region 30 between cathode 10 and anode 20.

FIG. 1 illustrates that cathode 10 [encompasses] a particulate cathode active material 11. Particles 11 encompass at least one sulfur-containing cathode active material, for example a sulfur/carbon composite, and at least one transition metal sulfide (not depicted in detail in FIG. 1). The at least one cathode active material can encompass in particular a polymer having, in particular covalently, bound sulfur. For example, the polymer of the at least one cathode active material can be manufactured by sulfidation of a polymer, in particular polyacrylonitrile. For instance, the at least one cathode material can be, for example, a sulfur/carbon composite, in particular a sulfur/polyacrylonitrile composite, for instance SPAN.

FIG. 1 shows that cell 1 furthermore has a cathode current collector 14. Cathode current collector 14 can in this context be constituted, for example, from aluminum, and can serve in particular both for electrical contacting and as a support.

FIG. 1 illustrates that particles 11 are respectively incorporated and/or embedded into a matrix made up of at least one polymer electrolyte 12(P) serving as a cathode material binder or into a solid electrolyte 12(P).

FIG. 1 illustrates that a particulate, in particular electrical, conducting additive 13, for example a carbon allotrope, is furthermore mixed into cathode material 10, said additive likewise being, for example elastically, connected by way of polymer electrolyte 12(P), serving as binder 12, to the particles of cathode active material 11 and to cathode current collector 14.

FIG. 1 furthermore shows that anode 20 encompasses an anode active material 21, for example metallic lithium or a lithium alloy, and an anode current collector 22, for instance made of copper.

FIG. 1 illustrates that a layer 31(P) made of a block copolymer, which layer serves as a separator and/or protective layer, is constituted between 30 cathode 10 and anode 20. FIG. 1 shows that an anode protective layer 32, for example made of an inorganic, for instance ceramic and/or glass-like, material or of a block copolymer, can additionally be provided in this context, which layer can serve, for example, as a barrier layer against dendrite growth. Where applicable, however, layer 31(P) made of the block copolymer can also serve as a sole layer between anode 20 and cathode 10, which layer replaces anode protective layer 32 (not depicted).

What is claimed is:

1. A cathode material for an alkali metal/sulfur cell, comprising:
   at least one cathode active material that contains cyclic polyacrylonitrile with covalently bound sulfur; and
   at least one metal sulfide, wherein the at least one metal sulfide is one of (i) at least one transition metal sulfide, or (ii) at least one metal sulfide of at least one metal of the third, fourth, and/or fifth main group.

2. The cathode material of claim 1, wherein the at least one cathode active material contains a sulfur/carbon composite.

3. The cathode material of claim 1, wherein the at least one metal sulfide is incorporated into the at least one cathode active material.

4. The cathode material of claim 2, wherein the at least one cathode active material is surrounded by the at least one metal sulfide.

5. The cathode material of claim 1, wherein the at least one metal sulfide has a standard electrode potential ≥1 V higher than the alkali metal of the cell.

6. The cathode material of claim 1, wherein the at least one transition metal sulfide is a semiconductor.

7. The cathode material of claim 1, wherein the at least one metal sulfide has more than one metal atom per sulfur atom, wherein the at least one metal sulfide has a hyperstoichiometric metal proportion.

8. The cathode material of claim 1, wherein the at least one metal sulfide accounts in total for ≥25 wt % to ≤50 wt %, with reference to the weight of the at least one cathode active material and of the at least one metal sulfide.

9. The cathode material of claim 1, wherein the at least one metal sulfide is the at least one transition metal sulfide and contains a sulfide of iron, copper, cobalt, nickel, vanadium, niobium, tantalum, chromium, molybdenum, tungsten, zinc, manganese, and/or titanium.

10. The cathode material of claim 1, wherein the at least one metal sulfide is selected from the group consisting of FeS, $FeS_2$, CuS, $Cu_2S$, $CuS_2$, $Cu_9S_8$, $Cu_7S_4$, CoS, $CoS_2$, $Co_3S_4$, $Co_9S_8$, NiS, $NiS_2$, $Ni_9S_8$, $Ni_3S_2$, VS, $VS_2$, $V_2S_3$, $V_2S_5$, $VS_4$, $NbS_2$, $NbS_3$, $NbS_4$, $NbS_5$, $Nb_2S_3$, $Nb_2S_5$, $TaS_2$, $TaS_3$, $TaS_4$, $TaS_5$, $Ta_2S_3$, $Ta_2S_5$, $Cr_2S_3$, $CrS_3$, $MoS_2$, $MoS_3$, $MoS_4$, $WS_2$, $WS_3$, $WS_4$, $WS_5$, MnS, $Mn_2S_3$, $TiS_2$, $NiNb_3S_6$, $Cu_2MoS_4$, and $Cu_4Mo_6S_8$.

11. The cathode material of claim 1, further comprising at least one electrically conducting metal oxide or at least one electrically conducting metal carbide, wherein the at least one electrically conducting metal oxide or the at least one electrically conducting metal carbide is incorporated into the at least one cathode active material.

12. The cathode material of claim 1, further comprising at least one lithium ion-conducting or lithium ion-conductive polymer electrolyte and/or at least one inorganic ion conductor.

13. The cathode material of claim 12, wherein the at least one polymer electrolyte has at least one repeating unit of the general chemical formula:

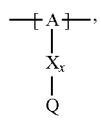

wherein:
-[A]- is a polymer-backbone-forming unit,
X is a spacer,
x is the quantity of spacer X and is 1 or 0, and
Q is
a negatively charged group $Q^-$ and a counter ion $Z^+$, or
an uncharged group Q, or
a positively charged group $Q^+$ and a counter ion $Z^-$.

14. The cathode material of claim 13, wherein
the polymer-backbone-forming unit -[A]- includes one or more of an alkylene oxide unit, a unit encompassing a carbonate group, a siloxane unit, a phosphazene unit, a methyl methacrylate unit, a methacrylate unit, a phenylene unit, a phenylene oxide unit, a benzylene unit, and an alkylene unit.

15. The cathode material of claim 13, wherein Q is the negatively charged group $Q^-$ and a counter ion $Z^+$, wherein:
$Q^-$ is one of:
(i) a group based on a lithium conducting salt anion,
(ii) a group based on an anion of an ionic liquid, a sulfonate group, a sulfonylimide group, a sulfate group, or a carboxylate group,
(iii) a group based on a phosphoric acid-based anion,
(iv) a group based on an anion of an imide,
(v) a group based on an anion of an amide, or
(vi) a group based on an anion of a carboxylic acid amide; and
$Z^+$ is a lithium ion.

16. The cathode material of claim 13, wherein the at least one inorganic ion conductor
is a sulfidic ion conductor,
has a garnet-like structure, or
is of the LISICON type, is of the NASICON type, or contains lithium phosphorus oxynitride.

17. The cathode material of claim 13, wherein Q is the uncharged group Q, wherein the uncharged group Q is one of an alkylene oxide group, an acyclic carbonate group, a cyclic carbonate group, a lactone group, a cyclic carbamate group, an acyclic carboxylic acid ester group, an acyclic carbamate group, a hydrogen, or an alkyl group.

18. The cathode material of claim 13, wherein Q is the positively charged group $Q^+$ and a counter ion $Z^-$, wherein:
$Q^+$ includes at least one of a pyridinium group, an ammonium group, an imidazolium group, a piperidinium group, a pyrrolidinium group, a phosphonium group, a guanidinium group, a morpholinium group, a uronium group, or a thiouronium group; and
$Z^-$ is a lithium conducting salt anion.

19. The cathode material of claim 13, wherein the spacer X includes at least one of the following:
(i) at least one oligoalkylene oxide group;
(ii) at least one other negatively charged group $Q^-$ that is either at least one sulfonylimide group and/or at least one sulfonate group, and a counter ion $Z^+$ that is a lithium ion;
(iii) at least one carbonyl group that is one or more of a cyclic carbonate group, a lactone group, a cyclic carbamate group, an acyclic carboxylic acid ester group, an acyclic carbamate group, and an acyclic carbonate group; and
(iv) at least one other positively charged group $Q^+$ that includes at least one of an ammonium group, a pyridinium group, an imidazolium group, a piperidinium group, a pyrrolidinium group, a phosphonium group, a guanidinium group, a morpholinium group, an uronium group, or a thiouronium group, and a counter ion $Z^-$ that is a lithium conducting salt anion.

20. The cathode material of claim 1, wherein the at least one metal sulfide is the at least one metal sulfide of at least one metal of the third, fourth, and/or fifth main group and contains a sulfide of indium, gallium, aluminum, tin, germanium, antimony, and/or bismuth.

21. A cathode material for an alkali metal/sulfur cell, comprising:
at least one sulfur-containing cathode active material; and
at least one metal sulfide, wherein the at least one metal sulfide is one of (i) at least one transition metal sulfide, or (ii) at least one metal sulfide of at least one metal of the third, fourth, and/or fifth main group,
wherein the at least one metal sulfide contains electrochemically active sulfur and/or more than one sulfur atom per metal atom, wherein the at least one metal sulfide has at least one disulfide anion and/or polysulfide anion and/or a hyperstoichiometric sulfur proportion.

22. A cathode material for an alkali metal/sulfur cell, comprising:
at least one sulfur-containing cathode active material; and
at least one metal sulfide, wherein the at least one metal sulfide is one of (i) at least one transition metal sulfide, or (ii) at least one metal sulfide of at least one metal of the third, fourth, and/or fifth main group,
wherein the at least one metal sulfide contains at least two metals selected from the group consisting of titanium, vanadium, chromium, manganese, iron, cobalt, nickel, copper, zinc, niobium, tantalum, molybdenum, and tungsten.

* * * * *